US 6,608,459 B2

(12) United States Patent
Kasagami et al.

(10) Patent No.: US 6,608,459 B2
(45) Date of Patent: Aug. 19, 2003

(54) METHOD AND DEVICE FOR SERVO-CONTROLLING DC MOTOR

(75) Inventors: Fumio Kasagami, Osaka (JP); Toshikazu Noda, Osaka (JP)

(73) Assignee: Daihen Corp., Osaka (JP)

( * ) Notice: Subject to any disclaimer, the term of this patent is extended or adjusted under 35 U.S.C. 154(b) by 86 days.

(21) Appl. No.: 10/016,553

(22) Filed: Dec. 10, 2001

(65) Prior Publication Data

US 2002/0177920 A1 Nov. 28, 2002

(30) Foreign Application Priority Data

Dec. 11, 2000 (JP) ........................... 2000/376593

(51) Int. Cl.[7] .............................................. H02P 5/06
(52) U.S. Cl. ...................... 318/560; 318/561; 318/802; 388/804; 388/811
(58) Field of Search ................. 318/560, 561, 318/802; 388/804, 811

(56) References Cited

U.S. PATENT DOCUMENTS

| | | | |
|---|---|---|---|
| 4,323,832 A | 4/1982 | Okamura | 318/341 |
| 4,644,232 A * | 2/1987 | Nojiri et al. | 318/66 |
| 4,713,596 A * | 12/1987 | Bose | 318/802 |
| 5,051,675 A * | 9/1991 | Okumura et al. | 318/568.1 |
| 5,218,276 A | 6/1993 | Yeom et al. | 318/16 |
| 5,321,342 A * | 6/1994 | Kruse | 318/254 |
| 5,341,078 A * | 8/1994 | Torii et al. | 318/568.22 |
| 5,404,960 A * | 4/1995 | Wada et al. | 180/446 |

FOREIGN PATENT DOCUMENTS

JP        10-84686        3/1998

* cited by examiner

*Primary Examiner*—Rita Leykin
(74) *Attorney, Agent, or Firm*—William J. Sapone; Coleman Sudol Sapone, P.C.

(57) ABSTRACT

PWM controlling means (4) for inputting PWM signals corresponding to PWM target values to electric power supplier (3) in order to servo-controlling DC motor (2) comprises synchronizing control part (41), PWM computing part (50), selecting part of PWM target value (45) and PWM commanding part (46). The synchronizing control part (41) instructs the commencement of the PWM computation, selection of PWM target value and PWM command allotted to some of the infinitesimal intervals obtained by dividing processing term, on which PWM signals regulating the electric power supplied to the motor (2) are allotted, into n equal parts, and terminates one cycle for a series of the process and/or computation predetermined within one processing term. PWM target values corresponding to plural control target values ($DP_0$, $DV_0$, $DT_0$) are computed in parallel so that the servo-control of motor can be operated in quick response to the change of control mode.

43 Claims, 62 Drawing Sheets

FIG. 46

| | $\Omega_{11}$ | $\Omega_{12}$ | $\Omega_{13}$ | $\Omega_{14}$ | $\Omega_{15}$ | $\Omega_{16}$ | $\Omega_{17-21}$ |
|---|---|---|---|---|---|---|---|
| Synchronizing control part 41 | $n,l$ $i$ | $n,l$ $i$ | $n,l$ $i$ | $n,l$ $i$ | $n,l$ $i$ | $n,l$ $i$ | $n,l$ $i$ $n,$ |
| Designated values of control mode ($F_N$ of 451a) | 1 | 1 | 2 | 2 | 2 | 2 | 2 |
| Values of computing part for position 441 (Pr-P) | — | — | — | — | — | — | — |
| Values of computing part for velocity 442 (Pr-V) | 26 | 26 | 18 | 18 | 18 | 18 | 18 |
| Values of computing part for torque 443 (Pr-T) | 25 | 25 | 25 | 25 | 25 | 25 | 25 |
| PWM selection values at selecting part 45 (Pr-SL) | 25 | 25 | 18 | 18 | 18 | 18 | 18 |
| Process of calculation of gradual values 452 Re-1 | 7 | 7 | 6 | 6 | 6 | 6 | 6 |
| Re-2 | 7+6 | 7+6 | 7+4 | 6+4 | 6+4 | 6+4 | 6+4 |
| Re-3 | 7+6+6 | 7+6+6 | 7+6+4 | 7+4+4 | 6+4+4 | 6+4+4 | 6+4+4 |
| Re-4 | 7+6+6+6 | 7+6+6+6 | 7+6+6+4 | 7+6+4+4 | 7+4+4+4 | 6+4+4+4 | 6+4+4+4 |
| PWM gradual values (Pr-GR Pr-SM) | 25 | 25 | 23 | 21 | 19 | 18 | 18 |

FIG. 48

| Synchronizing control part 41 | $Q_{31}$ | $Q_{32}$ | $Q_{33}$ | $Q_{34}$ | $Q_{35}$ | $Q_{36}$ | $Q_{37}$ | $Q_{38}$ | $Q_{39}$ | $Q_{40}$ |
|---|---|---|---|---|---|---|---|---|---|---|
| Designated values of control mode ($F_N$ of 451a) | 2 | 2 | 3 | 3 | 3 | 3 | 3 | 3 | 3 | 3 |
| Values of computing part for position 441 ($Pr_P$) | — | — | 23 | 23 | 14 | 5 | 0 | 0 | 0 | 0 |
| Values of computing part for velocity 442 ($Pr_V$) | 15 | 15 | 15 | 15 | 15 | 15 | 15 | 15 | 15 | 15 |
| Values of computing part for torque 443 ($Pr_T$) | 25 | 25 | 25 | 25 | 25 | 25 | 25 | 25 | 25 | 25 |
| PWM selection values at selecting part 45 ($Pr_{SL}$) | 15 | 15 | 23 | 23 | 14 | 5 | 0 | 0 | 0 | 0 |
| Process of calculation Re-1 | 6 | 6 | 8 | 8 | 5 | 2 | 0 | 0 | 0 | 0 |
| Re-2 | 6+3 | 6+3 | 6+5 | 8+5 | 8+3 | 5+1 | 2+0 | 0+0 | 0+0 | 0+0 |
| of gradual values 451 Re-3 | 6+3+3 | 6+3+3 | 6+3+5 | 6+5+5 | 8+5+3 | 8+3+1 | 5+1+0 | 2+0+0 | 0+0+0 | 0+0+0 |
| Re-4 | 6+3+3+3 | 6+3+3+3 | 6+3+3+5 | 6+3+5+5 | 6+5+5+3 | 8+5+5+3 | 8+3+1+0 | 5+1+0+0 | 2+0+0+0 | 0+0+0+0 |
| PWM gradual values ($Pr_{GR}$ $Pr_{SM}$) | 15 | 15 | 17 | 19 | 19 | 17 | 12 | 6 | 2 | 0 |

FIG. 57
(a)
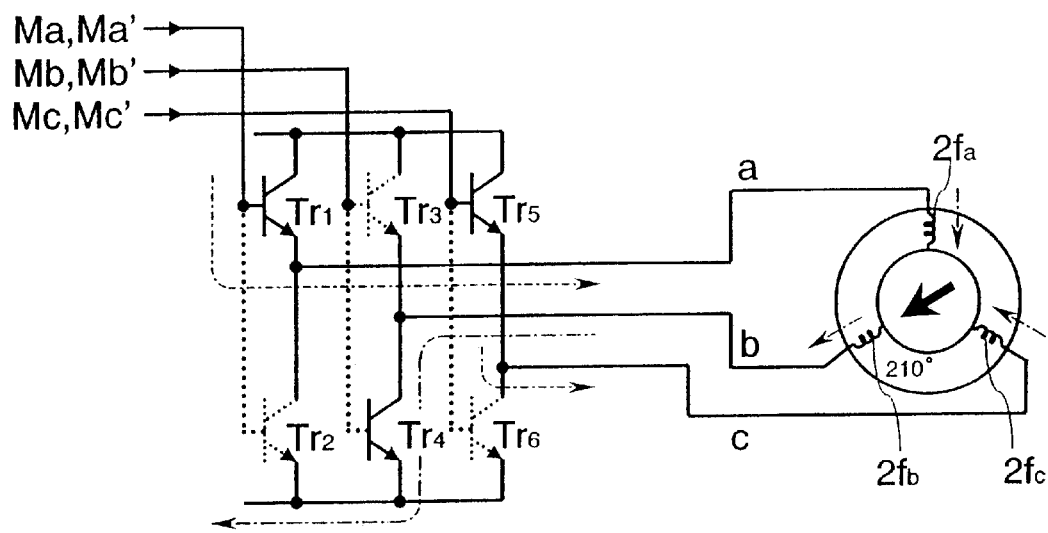
(b)
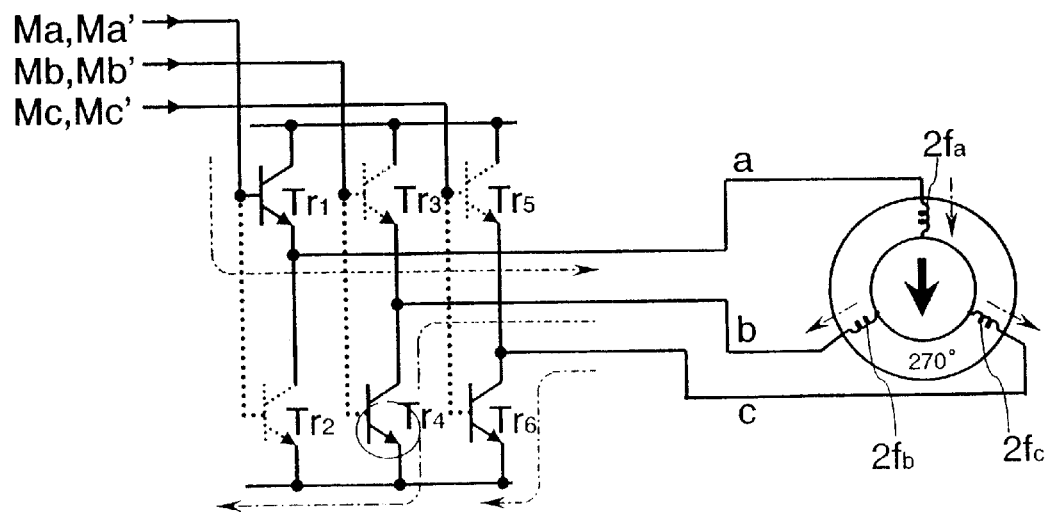

METHOD AND DEVICE FOR SERVO-CONTROLLING DC MOTOR

TECHNICAL FIELD

The present invention relates to a method and a device for servo-controlling DC motor and, more particularly, to the servo-control of a motor enabling quick change of the control mode among position control, velocity control and torque control.

BACKGROUND ART

A servo-controlling device supplying electric power to control position, velocity and torque to a direct current motor by the change of duty ratio on the basis of the supply of PWM (Pulse Width Modulation) signals to the electric power supplier equipped in a power line is known well. FIG. 59 shows a block diagram comprising a typical PWM servo controller for DC motor, which computes PWM target values based on target value of position $DP_0$ as a control input information, current Cm of motor 2 and positional signal Ea, Eb of motor output shaft, and drives DC motor 2 under the control of electric power supplied in response to the PWM signals Ma, Mb corresponding to the PWM target values.

Numeral 90 in FIG. 59 is a PWM servo controller for DC motor 2. 7 is a superior controller supplying a target value for controlling position $DP_0$ to PWM servo controller 90 according to the instructions of main controller in order to operate a not-shown mobile like a travelling truck. Of course, DC motor 2 is a power generator for operating movable parts like a robotic arms, and PWM signals transmitted from PWM servo controller 90 are supplied to the electric power supplier 3 equipped in a power line 62 for PWM servo-control. 31 is an ammeter for measuring current of motor 2, 1 is a position detector like an encoder and 46 is PWM commanding part for outputting PWM signals Ma, Mb to the electric power supplier 3.

The position of output shaft of motor 2 is controlled based on counting the number of pulses generated by encoder 1, therefore, feedback system for current equipped with current detecting part 43 is used to servo-control the position of output shaft in general as shown in FIG. 59. In this system, target values for controlling current are assigned to the values computed through the feedback control loop for velocity formed outside the feedback control loop for current, target values for controlling velocity are assigned to the values computed through the feedback control loop for position formed outside the feedback control loop for velocity, and target values for controlling position are assigned to the values transmitted from superior controller 7.

Not only the feedback control loop for current but the feedback control loop for velocity are also used for servo-controlling velocity of output shaft. The target values of velocity are given by superior controller 7. The feedback control loop for current is also used for servo-controlling torque. The target values of torque are given by superior controller 7.

DC motor theoretically generates torque $T_M$ in proportion to current Cm. This relation is formulated to $T_M = Cm \times Kt$ by using proper torque constant Kt for DC motor. An acceleration corresponding to the inertia J of load including motor is produced by the torque $T_M$ generated, rotational velocity obtained through integrating the acceleration by time changes, moreover, position θ obtained through integrating the velocity by time also changes. The equation of motion on which resistance of viscosity Cv in proportion to rotational velocity, spring constant K and frictional force M are reflected is formulated as follows;

$$T_M = \theta \times J + \theta \times Cv + \theta \times K + M$$

The existing control inevitably uses a multi-loop control system as shown in FIG. 59 because it controls DC motor according to such an equation of motion.

Since current loop, velocity loop and position loop are related to the integration with respect to time as mentioned above, their transient characteristics are largely different from each other. The response of current loop is highly more than 100 Hz, that of velocity loop 20–90 Hz and that of position loop only 10–20 Hz. Such difference among loops results in shocking a motor when the control mode is changed. In order to avoid such a shock high level computation is required. Though it is possible to directly compute target values for motor current based on a positional information, the rotational velocity for transferring to target position tends to become unstable. Such technology alone does not enable to stably rotate a DC motor and is of no practical use.

The free change of control mode of a motor is required to control the movement of mobile flexibly under the operation of DC motor. For example, making a truck travel slowly on a plane surface and stopping it at a target position with high accuracy can be achieved by position control only of a motor for driving wheels. However, high speed operation of a truck often requires the change of control mode of a motor as follows; initially accelerating a truck by the current control generating a maximum torque of motor, secondarily making it travel at a constant speed by velocity control after getting a desired speed, and finally stopping it slowly at the target position by position control after reaching the neighborhood of the destination. There is another example in the case of a machine for lifting heavy burden; initially generating enough torque to overcome the load acted on the machine by current control of DC motor and finally stopping the burden at the target position with high accuracy by the position control changed from preceding control near the target position.

In the control of FIG. 59 the change from current control (torque control) into velocity control requires computation in velocity calculating part since all of calculating parts are arranged in series. In result, the change into velocity control is delayed because much time for the computation is spent every change. The change from current control into position control requires not only computation in position calculating part but that in velocity calculating part, resulting in delaying more the change of the control. In any case a sudden change of revolutionary speed and/or torque of output shaft of motor is unavoidable at the change of control mode, resulting in often shocking the motor strongly. For the sake of smooth change from current control into position control a position calculating part must be always in operation, therefore, the position calculating part results in computing present position being unnecessary for torque control one after another also during torque control. Accordingly, the change from current control into position control has been impracticable.

Of course, the control mainly covered with position control is not impossible if correction factors relating to position are computed on the basis of information output by the desired sensor selected from between torque sensor and velocity sensor installed. But such a control system becomes complex since the process of various information is required for the control, which leads to a lowering of motor response and also promotes to rise the price of control system.

The apparatus for servo-controlling a motor with encoder is disclosed in U.S. Pat. No. 4,644,232 (JP62-32715 B1), which is simplified by providing with a counter serving both to detect rotational velocity and to detect position. However, even one counter hinders to make the apparatus small.

U.S. Pat. No. 4,323,832 (JP59-27013 B1) teaches a method for controlling the speed of a magnetic tape transport motor, which supplies an interrupting signal against the main program in response to the velocity signal output from velocity detector and carries out the program for controlling speed of a magnetic tape transport motor in response to the interrupting signal. The adoption of interrupting signals, however, delays the predetermined computation so that the servo-control with high managing capacity, e.g., terminating all of process within predetermined time, becomes impossible. In addition, in the case of using such an interruption keeping the time for acceptance of interruption in the control procedure results in lowering of motor response.

Further, an integrated circuit device of remote control type driving DC motor is disclosed in U.S. Pat. No. 5,218,276 (JP2,542,141). In this invention, the signal having a proper number sent by wireless is caught by a receiver only having the same number as the signal has, so that DC motor only corresponding to the number can be controlled in response to the signal output from the receiver. The device providing with a wireless unit is expensive, moreover, its reliability tends to be lowered as a result of being sensitive against the unwanted signals of the outside of system.

The invention solving the problem of giving a big shock to a motor at the change from current control into velocity control is disclosed in JP10-84686 A1 as a switching method for servo controller. The purpose of the invention is to weaken shock at the change of control mode by adding correction signals, which are generated by a calculator having a transmitting characteristics specified every loop, to control target value. Therefore, a means for correcting signals is prepared upstream of current feedback loop. But generating correction signals and processing for addition of them spend much time so that the transfer from present control to velocity control tends to being delayed and the movement of mobile will not respond quickly.

The first object of the present invention is to enable carrying out torque control, velocity control and position control of DC motor in one control unit to quickly and smoothly introduce a DC motor into the operation according to a new control mode in response to the change of mode. The second object is to enable the change of control mode without time lag and not to cause the shock based on the generation of sudden difference of revolutionary speed and/or torque of motor at the change of control mode. The third object is to promote making the control device small by using MPU only, further, to keep high reliability of control device by simplifying the line connection between an superior controller and a mobile equipped with plural DC motors.

DISCLOSURE OF INVENTION

The present invention is applied to a method for servo-controlling DC motor, controlling the electric power supplied to the motor according to PWM signals corresponding to PWM target values computed on the basis of both the motor information detected at the present time and the control input information including control target values, the method comprises following steps; first step is to compute PWM target values corresponding to the control modes designated by the control input information without lapping the computation of PWM target value corresponding to other control modes, spending one or plural infinitesimal intervals obtained by dividing a processing term of period T, when PWM signals regulating the electric power supplied to the motor are allotted, into n equal parts. Second step is to select one PWM target value according to the control mode designated by said control input information from among PWM target values computed every control mode during the present processing term. Third step is to output PWM signals corresponding to FWM selection values, which are selected at the processing term shortly previous to the present term, every infinitesimal interval of the present processing term, and final step is to carry out the process and/or computation allotted every infinitesimal interval at the timing scheduled in one processing term and to terminate the process and/or computation within the present processing term.

According to the present invention all of process and/or computation are carried out within one processing term by subdividing all of the computation in association with control of position, velocity and torque so that the output power of DC motor corresponding to a desired control mode can be quickly generated in response to the change of control mode. Since any PWM target value is always computed, interrupting procedure in association with the change of control mode and/or control target value is not required. The irregular interruption procedure is not used so that the predetermined process and/or computation can be allotted every infinitesimal interval, and the control with high response can be carried out because it is not required to keep intervals for accommodating the interrupting procedure in one processing term.

BRIEF DESCRIPTION OF DRAWINGS

FIG. 46 is a list showing the gradual values at the change from torque control to velocity control.

FIG. 48 is a list showing the gradual values at the change from velocity control to position control.

FIG. 57 shows the operation of switching elements assembled into the voltage-type inverter; (a) is a circuit diagram during the switching mode of I, and (b) a diagram during the mode of II.

BEST MODE FOR CARRYING OUT THE INVENTION

Figure 3:
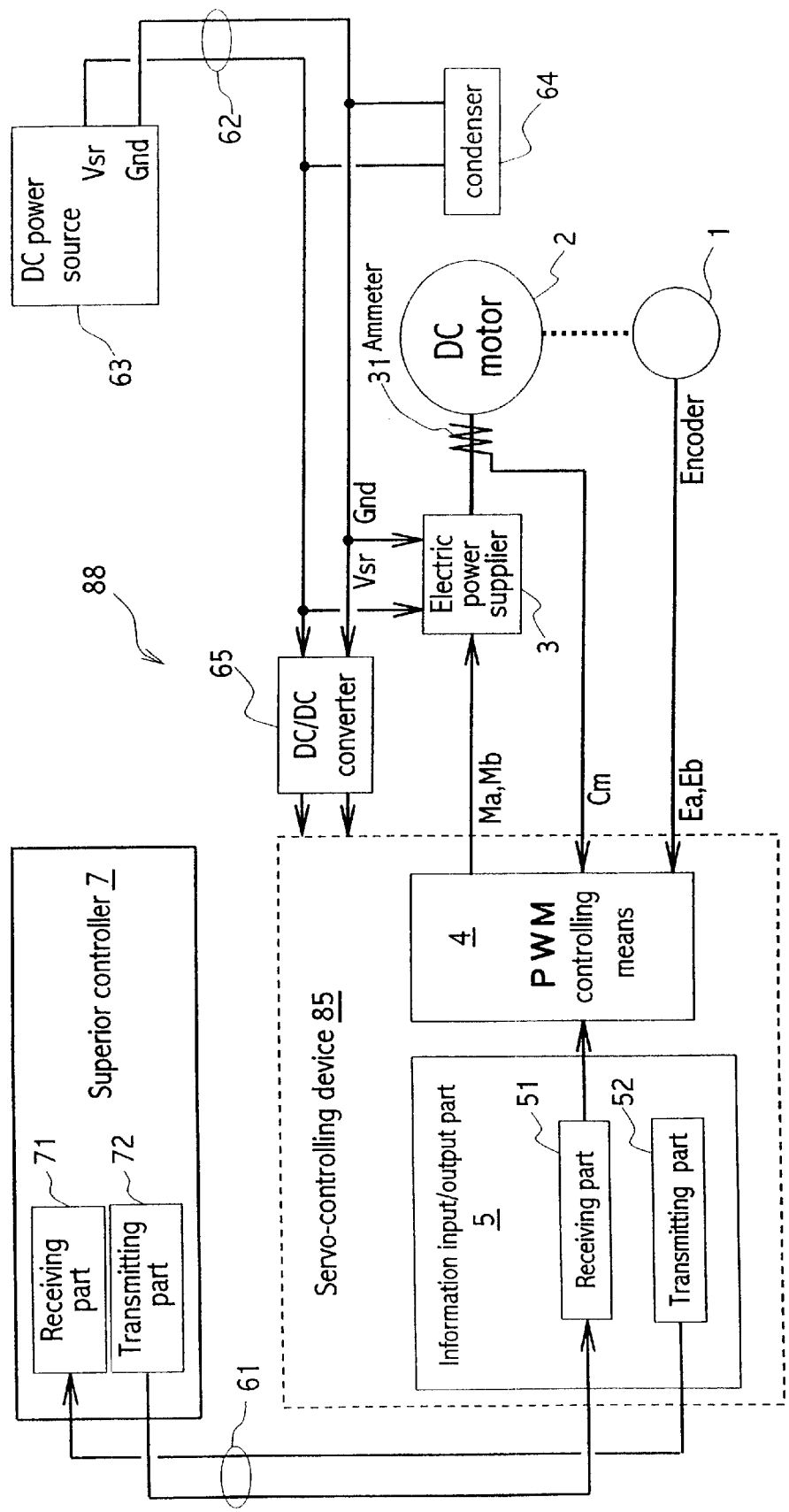
FIG. 3 is a schematic block diagram showing the whole of motor driving device.

The device for servo-controlling DC motor according to the present invention is described below in detail. FIG. 3 is a schematic block diagram showing the whole of motor driving device 88 including servo-controlling device 85, which drives DC motor 2 on direct current supplied from power source 63 and controls it by PWM signals Ma and Mb output to electric power supplier 3 while control information is exchanged between servo-controlling device 85 and superior controller 7.

Figure 2:
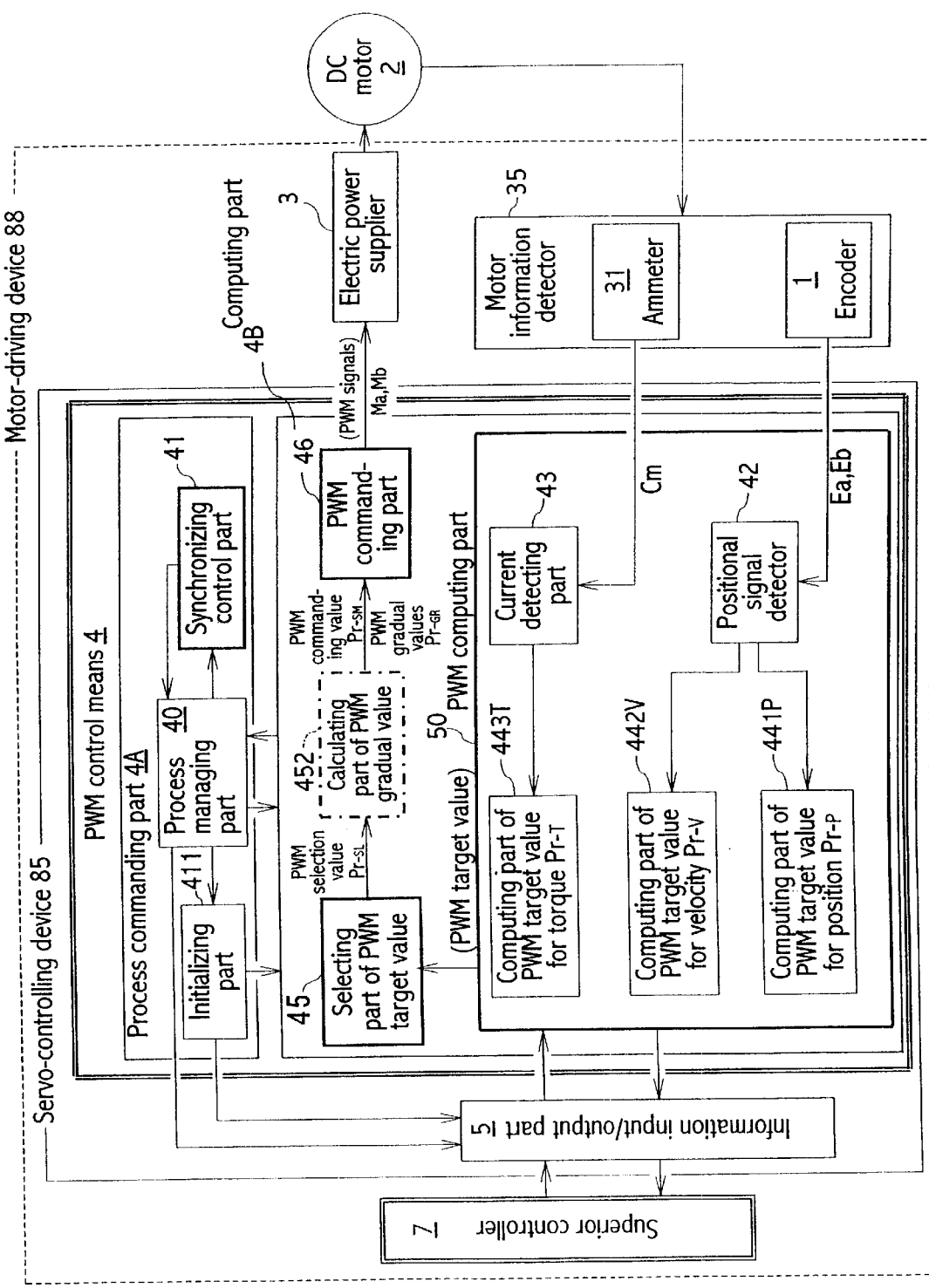
FIG. 2 is a block diagram showing the device for servo-controlling DC motor.

The servo-controlling device 85 is provided with PWM control means 4 as shown in FIG. 2 as a main component. The PWM control means computes PWM target values on the basis of both the motor present information detected by motor information detector 35 and the control input information including control target values instructed by superior controller 7, and outputs PWM signals Ma and Mb corresponding to the PWM target values to electric power supplier 3.

The PWM control means 4 consists of process commanding part 4A and computing part 4B. The process commanding part 4A comprises process managing part 40, initializing part 411 and synchronizing control part 41 to regulate the process of computing part 4B based on control input information. The computing part 4B is mainly provided with PWM computing part 50, selecting part of PWM target value 45 and PWM commanding part 46 to compute PWM target values and to generate PWM signals Ma and Mb corresponding to the target values.

Figure 7:
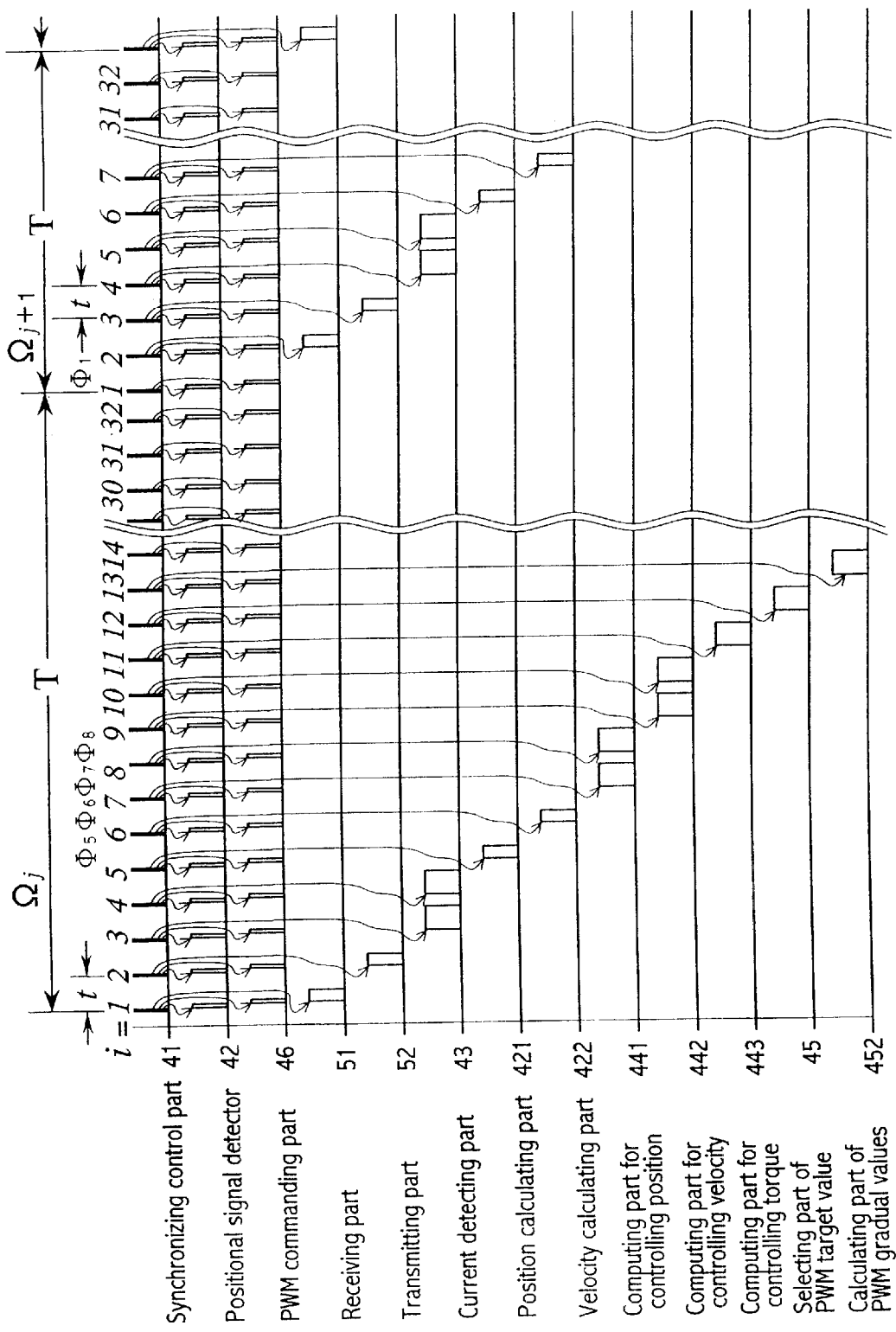
FIG. 7 is a timing chart showing process and/or computation scheduled every infinitesimal interval in response to the command of synchronizing control part.

The characteristic of the basic concept for the control according to the present invention is to introduce a concept of processing term $\Omega$ for carrying out some computation predetermined within a short time T, e.g., 400 $\mu$S, as shown in FIG. 7 explained later into the process of control for DC motor. Accordingly, the computation predetermined can be repeated every processing term $\Omega$ during the control of DC motor. In addition, a concept of infinitesimal interval $\Phi$ obtained by dividing the processing term Q into n equal parts has been also introduced into the present control. Each of infinitesimal intervals $\Phi$ is allotted process and/or computation performable within the time, t=T/n, as a result, individual computation for the control mode of torque, velocity and position is carried out in parallel each other every processing term $\Omega$ as long as watching a series of terms. Therefore, once the change of control mode has been instructed, the transfer toward the desired control mode can be performed without time delay.

In order to carry out the control mentioned above synchronizing control part 41 (see FIG. 2) having following function is indispensable to the present invention. The synchronizing control part 41 generates synchronizing trigger every time t. This trigger signal teaches a timing for commencing the process and/or computation allotted every infinitesimal interval, $\Phi_1, \Phi_2, \Phi_3, \ldots, \Phi_{n-1}, \Phi_n$, obtained by dividing a processing term $\Omega$ of period T, on which PWM signals Ma and Mb with duty ratio regulating the electric power supplied to the motor are allotted, into n equal parts to carry out one cycle for a series of the process and/or computation predetermined within the present term $\Omega$ (see FIG. 7).

One processing term $\Omega$ can generate PWM signals which has theoretically 32 kinds in pulse width if n=32. Moreover, the control which computes PWM target value, being required every control mode, corresponding to control target value by using current signal of motor and positional signals of motor output shaft, then, spending one or plural of 32 infinitesimal intervals $\Phi$, is realized, too. For example, two intervals $\Phi_7$ and $\Phi_8$ are used for the process at computing part for controlling position 441 as explained after in FIG. 7.

Since synchronizing control part 41, as mentioned above, instructs the commencement of the process and/or computation allotted to every infinitesimal interval $\Phi$ in the timing scheduled, one cycle for a series of the process and/or computation is terminated within one processing term $\Omega$. Any process is always carried out without any time delay because not only interruption but prolongation of computation are unnecessary. The process and/or computation in the term $\Omega$ in response to the trigger signal sent forth from the synchronizing control part 41 are shown in a timing chart and a flow chart of FIGS. 7 and 22. Needless to say, the larger n is, the higher the accuracy of effective current supplied to motor is. However, if n is e.g., 64, time required for process in positional signal detector 42 and PWM commanding part 46 shown in FIG. 7 becomes twice in one processing term $\Omega$, resulting in remarkable decrease of time for other process and/or computation predetermined.

Referring to FIG. 2, PWM computing part 50 mentioned above computes PWM target value corresponding to control target value of each control mode by using motor information detected by motor information detector 35 at the present time without lapping infinitesimal intervals $\Phi$ used. The kind of computation carried out in PWM computing part 50 is three at most, i.e., computation of PWM target value for position, that of PWM target value for velocity and that of PWM target value for torque. FIG. 2 shows computing part of PWM target value for position 441P, computing part of PWM target value for velocity 442V and computing part of PWM target value for torque 443T. But the present invention is applicable to PWM computing part which is provided with at least two because one of objects of the invention is to carry out smooth change of control mode. If the change of control mode is not necessary for a device for servo-controlling DC motor, the device may possess, e.g., computing part of PWM target value for position 441P only. The detail of each computing part of PWM target value are described after.

The selecting part of PWM target value 45 mentioned above selects one PWM target value from among the PWM target values computed by PWM computing part 50 according to the control mode designated by control input information and outputs it as a PWM selection value $Pr_{-sL}$. If calculating part of FWM gradual values 452 drawn in Figure is not provided, the PWM selection value $Pr_{-SL}$ is directly input to PWM commanding part 46 as a PWM commanding value $Pr_{-SM}$. The selecting part of PWM target value 45 is provided with storing part of designated control mode 451a and selecting part of target value for designated mode 451 as shown in FIG. 4(a). The selecting part of target value for designated mode 451 may be replaced with selecting part of target value for automatically changing control mode 451b described later. The selecting part of target value for designated mode, see 451 being visually comprehensively drawn in FIG. 1, selects one PWM target value from among the FWM target values $Pr_{-P}$, $Pr_{-V}$, $Pr_{-T}$ computed in each computing part of PWM target value according to control mode $F_{-N}$ designated by control input information stored in storing part of designated control mode 451a.

Figure 59:
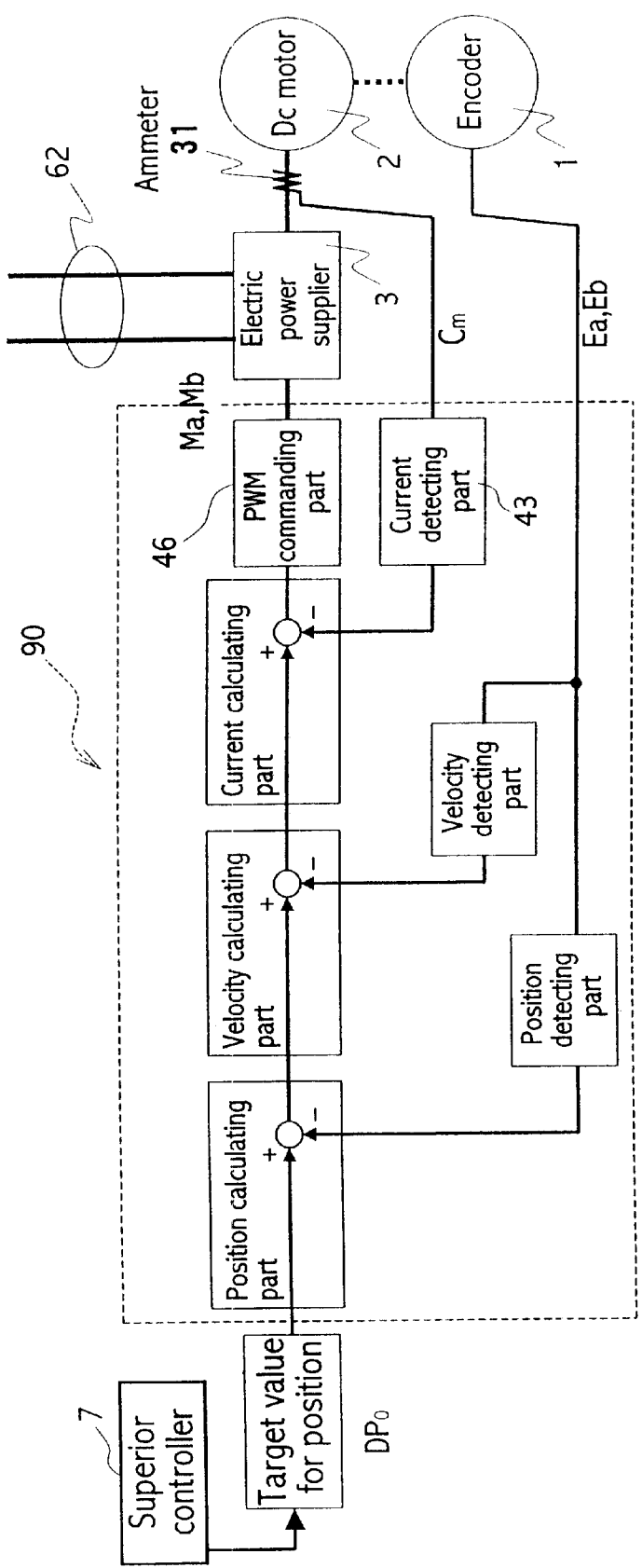
FIG. 59 is a block diagram showing a typical PWM servo-controller of prior art.

PWM commanding part 46 mentioned above has the same function as that drawn in FIG. 59 explained in the paragraph of prior art has. But as described in detail later, it receives PWM selection value $Pr_{-SL}$ selected on the processing term $\Omega_{j-1}$ shortly previous to the present term as a PWM commanding value $Pr_{-SM}$, and outputs the PWM signals Ma and Mb corresponding to the PWM commanding value every infinitesimal interval $\Phi$ of present term $\Omega$, as on-off signals.

Figure 1:
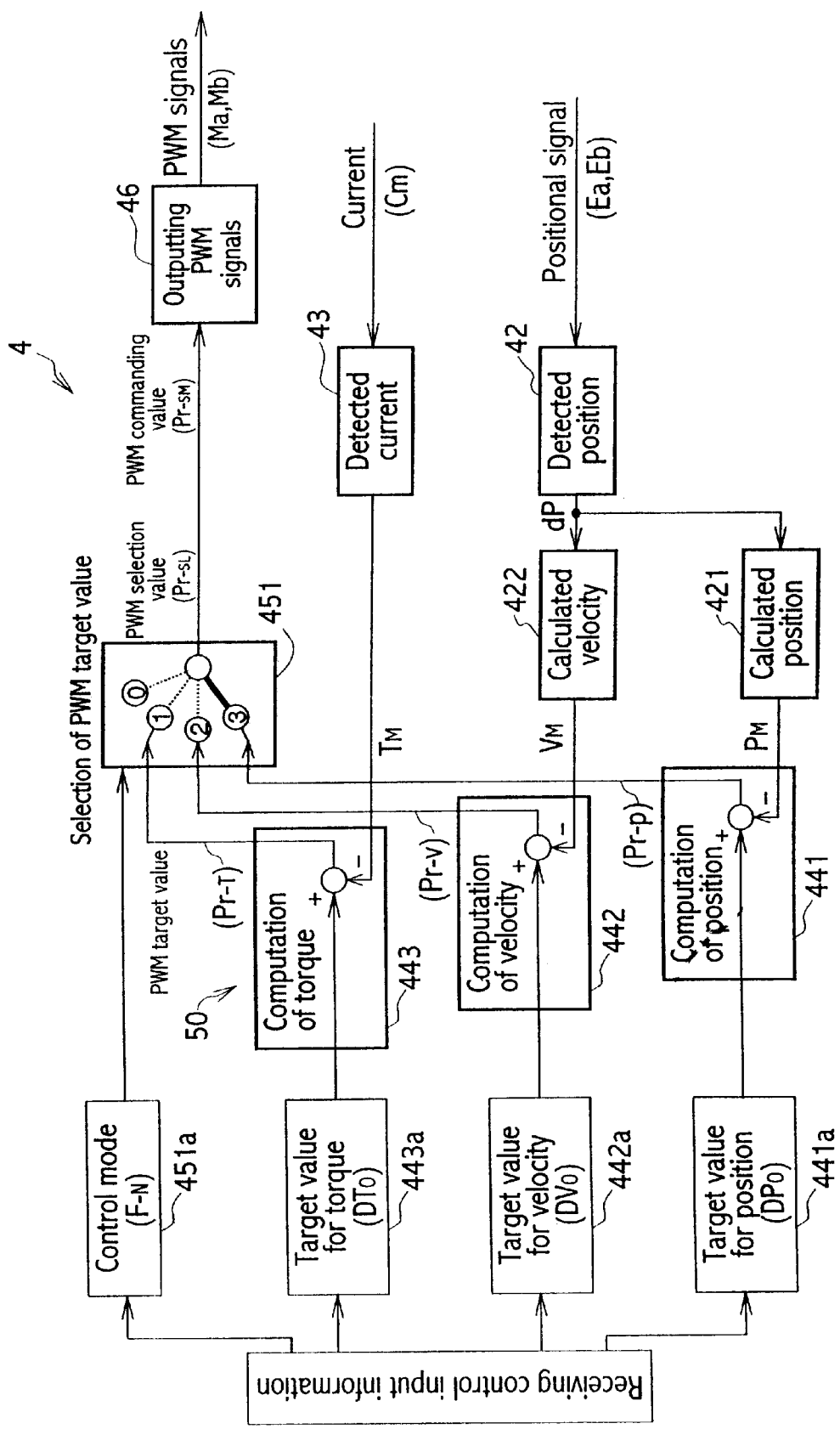
FIG. 1 is a block diagram showing the process of PWM control part in the device for servo-controlling DC motor according to the present invention.

Since the PWM control means 4 in FIG. 2 is provided with at least synchronizing control part 41, PWM computing part 50, selecting part of PWM target value 45 and PWM commanding part 46, the following operation is performed; first, PWM target values $Pr_{-P}$, $Pr_{-V}$, $Pr_{-T}$ are computed corresponding to control target values $DP_0$, $DV_0$ and $DT_0$ as shown in FIG. 1 against control mode $F_{-N}=1$, 2 and 3 by using motor information Cm detected at the present time without lapping infinitesimal intervals $\Phi$. These are processed and computed during the white boxes on the sections corresponding to the numbers of 43, 421, 422, 441, 442 and 443 in FIG. 7. One PWM target value is selected from among the PWM target values $Pr_{-P}$, $Pr_{-V}$, $Pr_{-T}$ as a PWM selection value $Pr_{-SL}$ within the present processing term $\Omega$, according to the control mode $F_{-N}$ designated by control input information, the process of which is performed during the white box on the section indicated by 45 in FIG. 7. On the other hand, PWM signals Ma and Mb corresponding to PWM selection value $Pr_{-SL}$ selected on the processing term $\Omega_{j-1}$ shortly previous to the present term are output every infinitesimal interval, $\Phi_1$, $\Phi_2$, $\Phi_3$, ..., $\Phi_{31}$, $\Phi_{32}$ (in the case of n=32), of present term $\Omega_j$, the process of which is performed during the white box on the section indicated by 46 in FIG. 7. The detail on these process and/or computation is explained after.

The process and/or computation allotted every infinitesimal interval, $\Phi_1$, $\Phi_2$, ..., $\Phi_{31}$, $\Phi_{32}$, e.g., the computation of PWM target values for position, velocity and torque is commenced after the process in positional signal detector 42 and PWM commanding part 46 described later. Since the process of positional signal detector 42 and PWM commanding part 46 are commenced in a timing indicated by black tips (see FIG. 7) on the section of synchronizing control part 41, the computation and selection of PWM target values are carried out during the rest of infinitesimal intervals $\Phi$. Needless to say, the amount of computation for PWM target values is limited in principle so as to accommodate it within one infinitesimal interval. However, in the case that the amount can not be accommodated within one infinitesimal interval plural intervals $\Phi$ are allotted the computation, thus, one cycle of a series of process and/or computation are carried out within one processing term $\Omega$.

Figure 9:
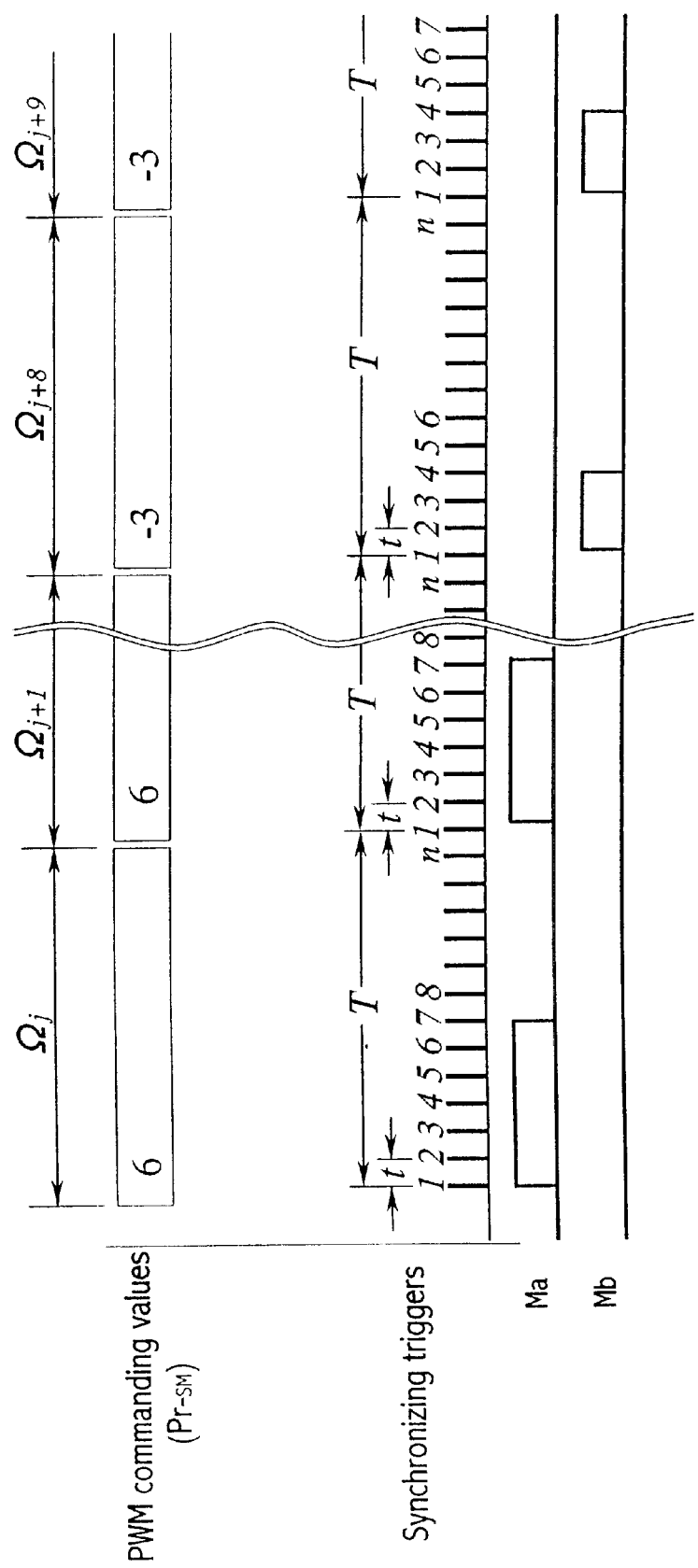
FIG. 9 is a timing chart showing the relation between PWM commanding value given every processing term and PWM signals Ma and Mb sent forth in response to synchronizing triggers.

As mentioned above, each processing term $\Omega$ possesses 32 infinitesimal intervals $\Phi_1$, $\Phi_2$, ..., $\Phi_{32}$ and PWM signal consisting of on and off is output every infinitesimal interval, therefore, signal with any of duty ratio of 1/32 to 32/32, i.e., pulse having any width of 1 to 32 is transmitted to electric power supplier 3 in one control period T. FIG. 9 described after shows PWM signals Ma for forward rotation with 6 in pulse width in processing term $\Omega_j$ and $\Omega_{j+1}$ shown on the left side and PWM signals Mb for backward rotation with 3 in pulse width in term $\Omega_{j+8}$ and $\Omega_{j+9}$ shown on the right side. The reason why the left is different from the right with regard to the pulse width and the direction of rotation is that PWM target values and/or control mode has been changed in any processing term, e.g., not-shown $\Omega_{j+5}$, in the part equivalent to the middle of the drawing.

The concrete disclosure of each element used in the present invention having the basic concept described above is as follows; The motor information detector 35 for detecting information of motor 2 at the present time consists of a position detector 1, as shown in FIG. 2, for detecting the positional signals Ea and Eb (see FIG. 3) of motor output shaft and/or an ammeter 31 for detecting current Cm supplied to motor. Since no velocity detector is provided, the velocity of motor is assigned to the variate dP of position detected by encoder 1 during the term equivalent to T as described later (see step 5502 of FIG. 26(a)).

FIG. 5(a) shows an example of position detector 1, which consists of a rotary disk 11 generating positional signals Ea and Eb of N, e.g., 100, per revolution and encoder comprising two pairs of sensors 12 and 13 facing each other. The rotary disk 11 is fixed to the motor output shaft 2s on which slits 11a of N are formed at pitch $\alpha=360°/N$ Each pair of sensors consists of light emitting elements 12a and 13a and light sensitive elements 12b and 13b, which are arranged at a quarter pitch ($\alpha/4$) of slits. In result, positional signals Ea and Eb generate every 90 degrees in phase. Signal Ea run before Eb as shown in FIG. 5(b) when the output shaft 2s rotates forward and signals Ea run after Eb as shown in FIG. 5(c) when the output shaft 2s rotates backward. In FIGS. 5(b) and (c) white arrows teach the condition corresponding to FIG. 5(a). Output signals of encoder 1 are processed in positional signal detector 42 (see FIG. 2) explained later.

Figure 31:
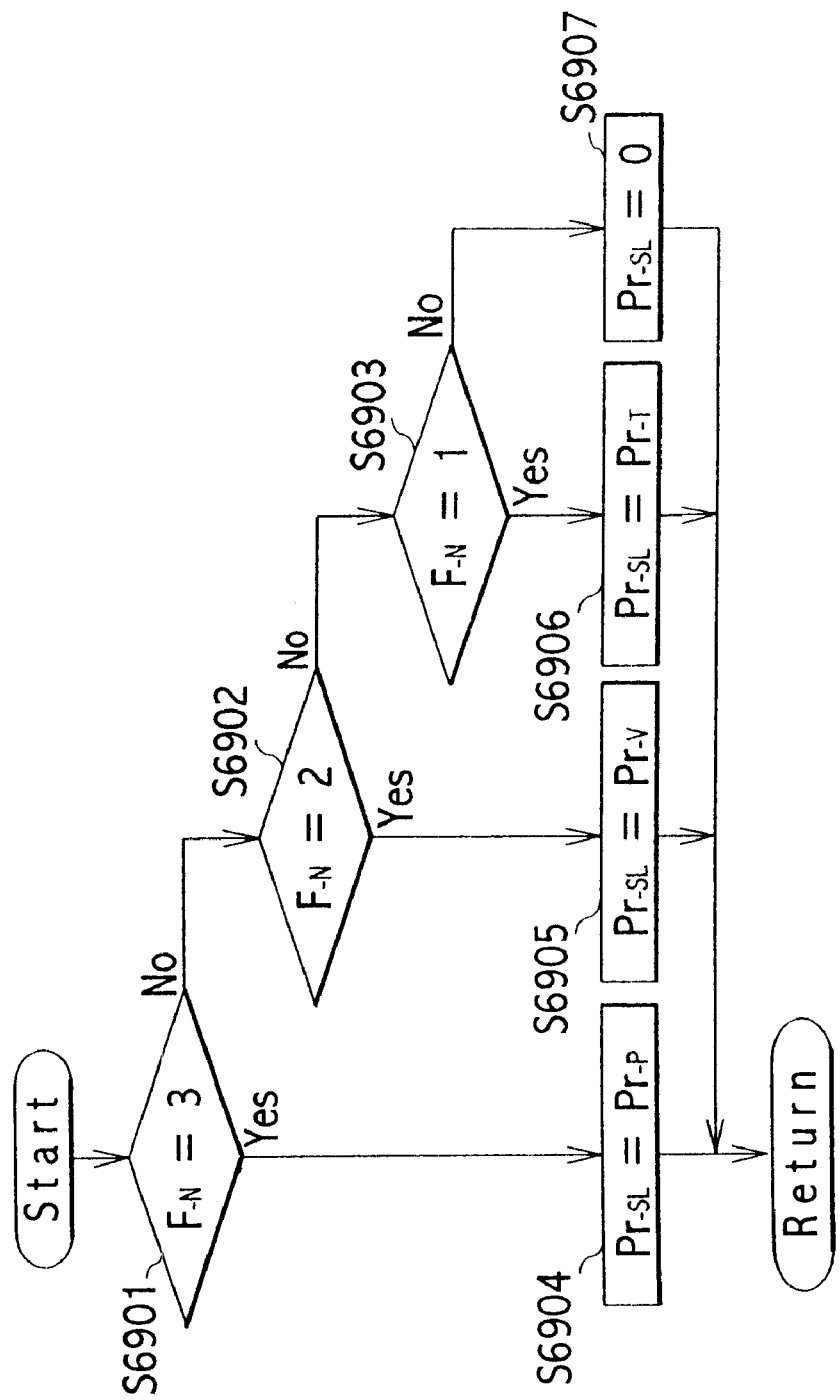
FIG. 31 is a flow chart showing the selecting procedure of selecting part of target value for designated mode.

Ammeter 31 shown in FIG. 31 is, of course, measures current Cm flowed through DC motor 2. The signals detected by ammeter 31 is converted to digital values through A/D converter (not-shown) installed on current detecting part 43. The counted values corresponding to the current are used for computation of PWM target values for torque.

Figure 6:
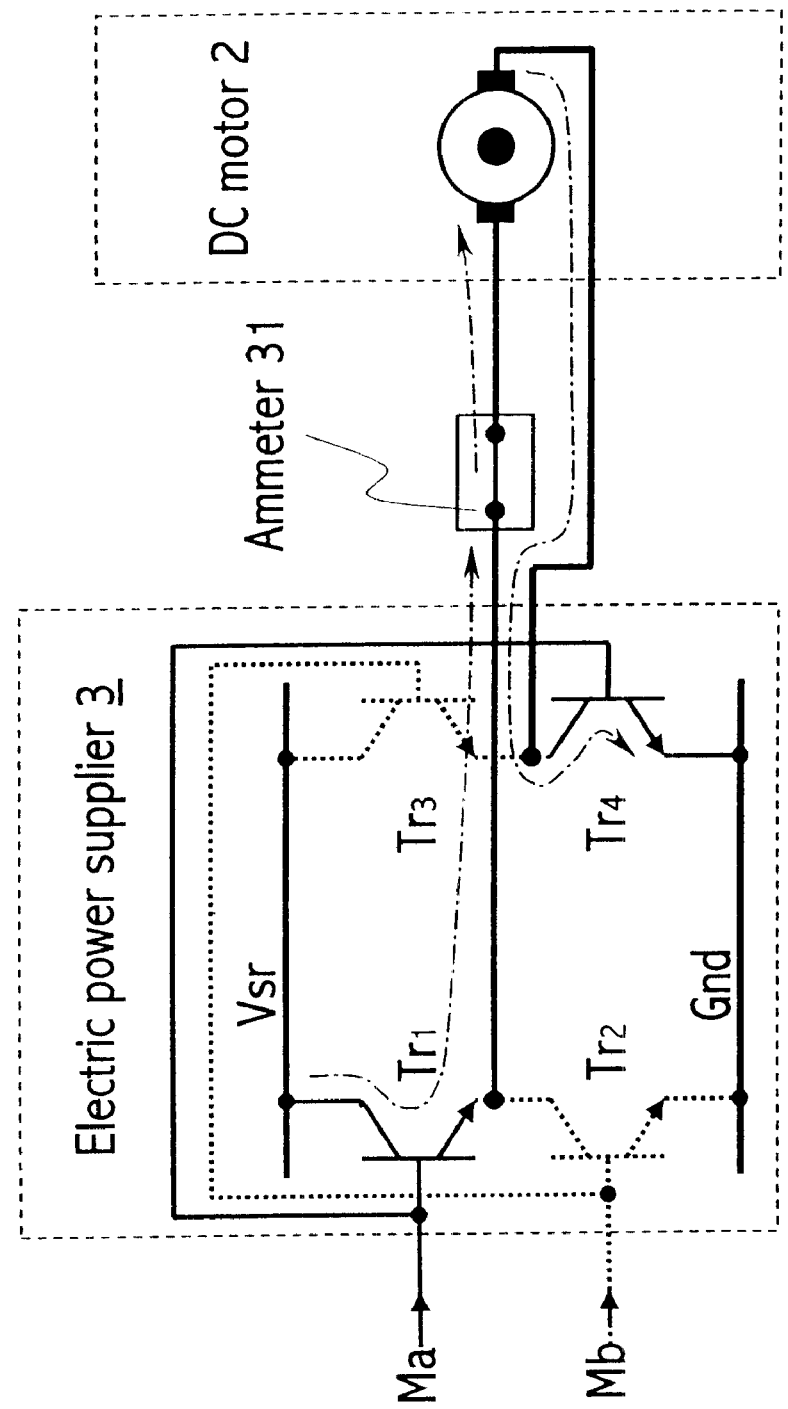
FIG. 6 is a circuit diagram of electric power supplier consisting of transistors.

Not only motor information detector 35 but electric power supplier 3 are provided between servo-controlling drive 85 and DC motor 2. The electric power supplier 3 also has the same function as that drawn in FIG. 59 explained in a paragraph of prior art has. FIG. 6 shows an example of electric power supplier 3, in which four transistors are used in the case of brush-type DC motor. Transistors $T_{r^1}$ and $T_{r^4}$ are switched on when PWM signal Ma is on, thereby, servo-voltage V sr is charged against the earth Gnd. The current flowing in the direction shown by one dotted-chain lines rotates DC motor 2. Transistors $T_{r^2}$ and $T_{r^3}$ are switched on when PWM signal Mb is on, thereby, DC motor 2 rotates backward. The larger the duty ratio is in one processing term mentioned above, the longer on-signal of PWM is, therefore, effective current supplied to DC motor 2 increases.

It is well known that the function of electric power supplier 3 is lowered when the heat-radiation of transistors is not good. Therefore, fixing transistors to the movable member of mobile 75 (see FIG. 52 described after) equipped with DC motor 2 is preferable. The movable member means, e.g., a robotic arm 75a driven by motors or travelling truck itself. Transistors can be air-cooled by natural ventilation when the member moves.

Figure 51:
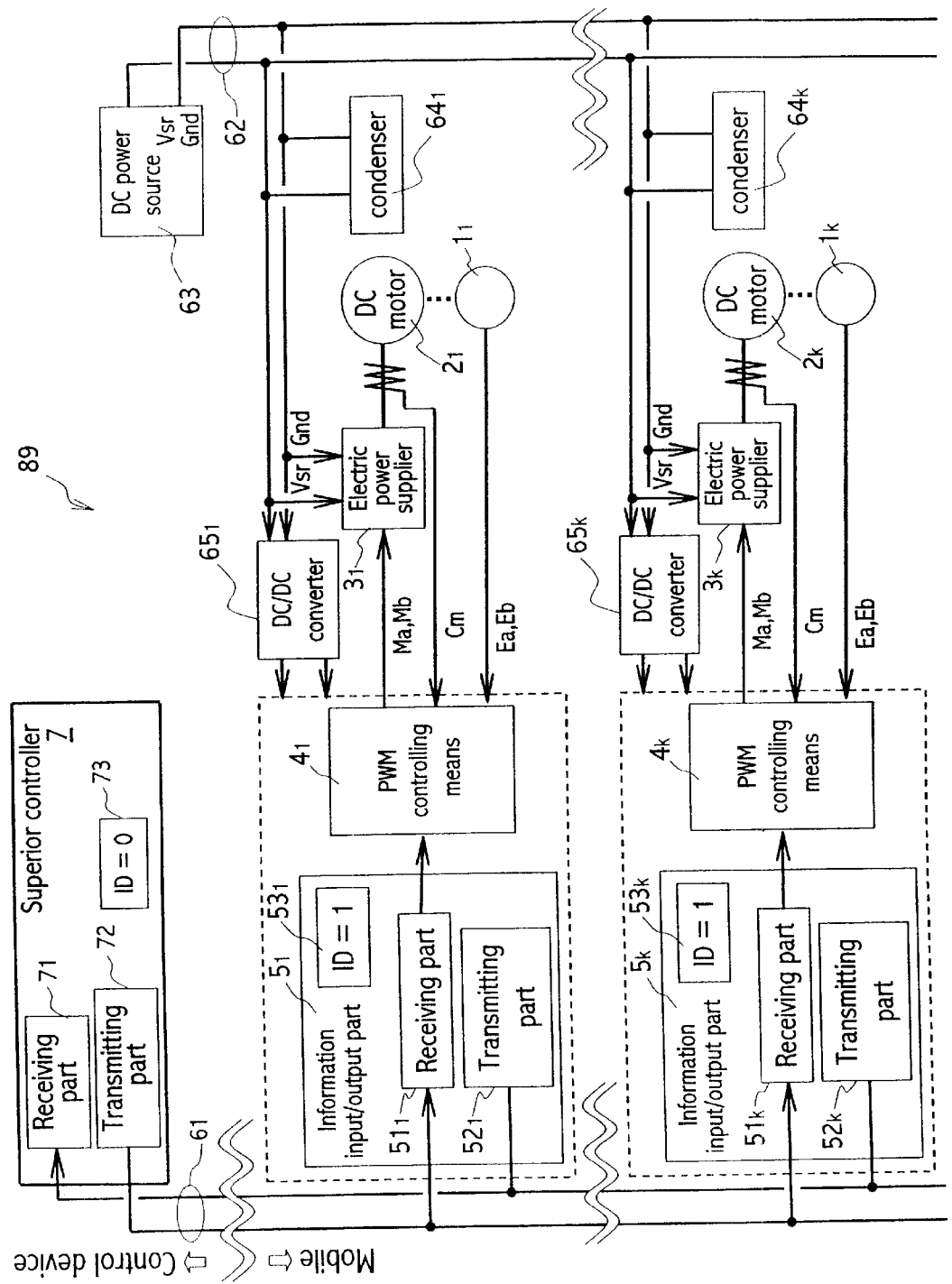
FIG. 51 is a schematic block diagram showing the servo-controlling device according to the present invention providing plural DC motors and the serial communication line connected thereto.
Figure 52:
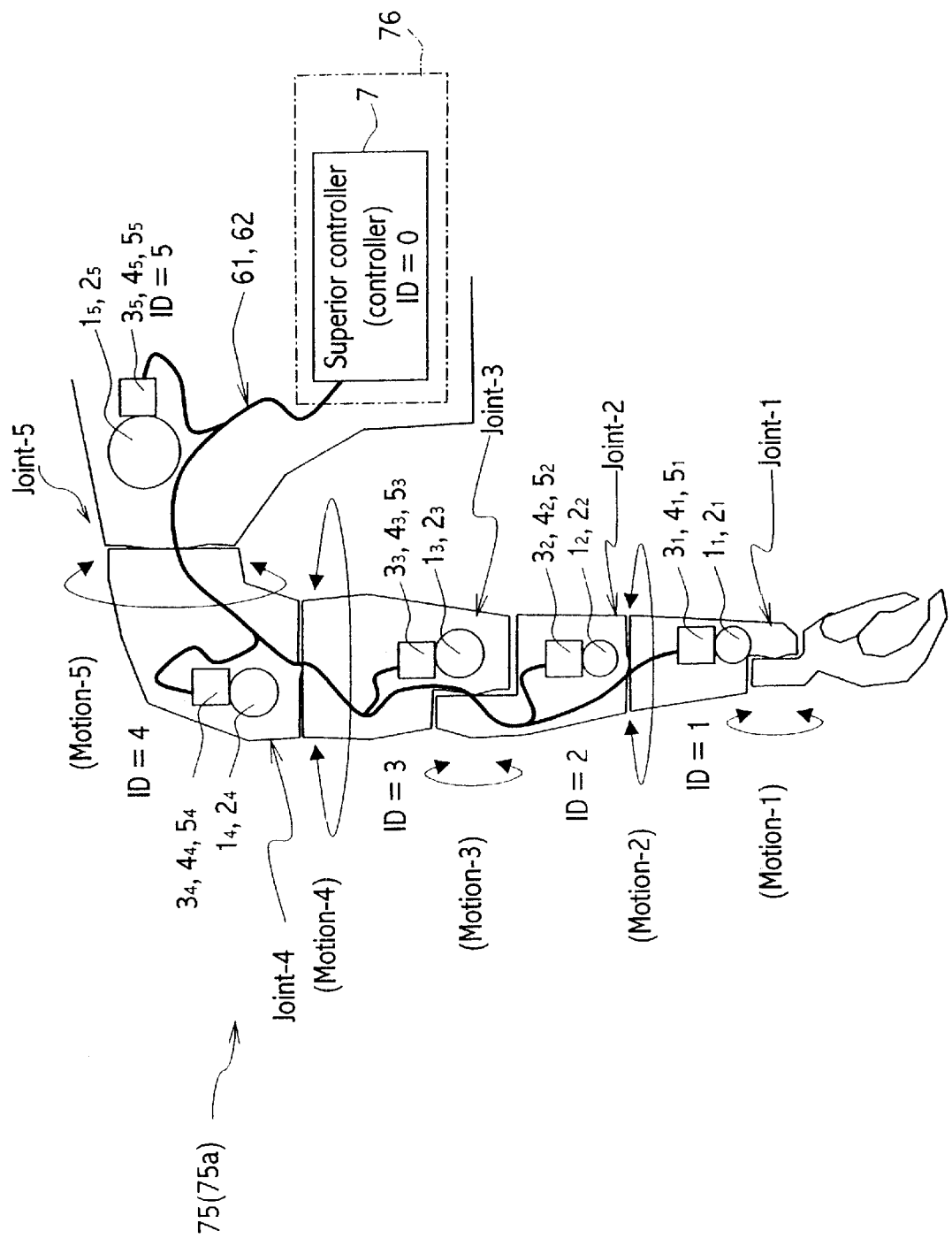
FIG. 52 shows a driving system for robotic arm equipped with plural DC motors connected to serial communication line.
Figure 53:
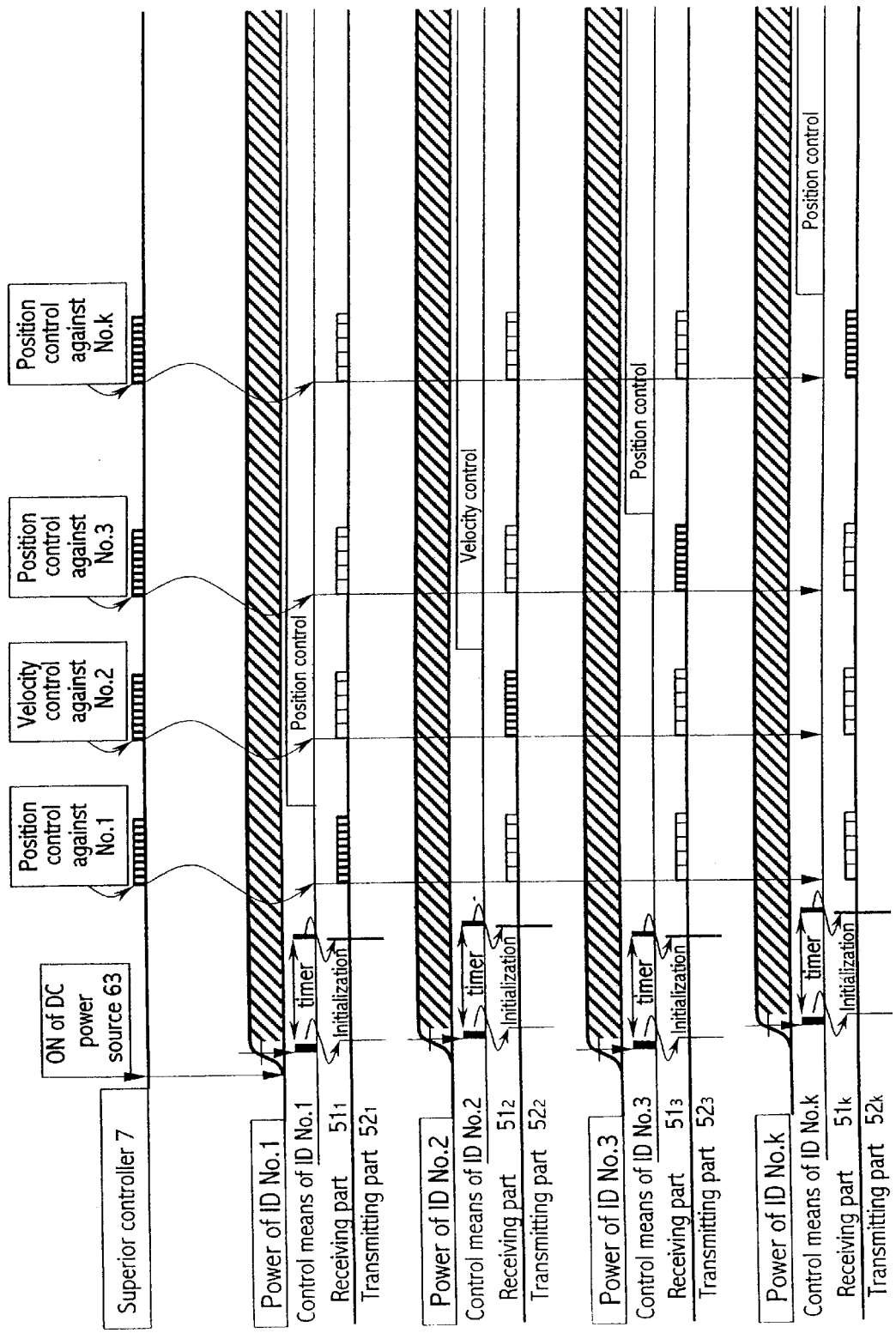
FIG. 53 is a timing chart showing the transmission of control input information with ID number from superior controller to information input/output part belong to each motor.

Before the present invention transistors fixed to immovable superior controller were air-cooled through fins covering electric power supplier. Fixing transistors to a movable member, as mentioned above, need not fins for cooling, promoting to make a control device small. In the case that plural motors are driven by one superior controller, fixing electric power supplier to superior controller requires the line connecting electric power supplier to motor on the mobile every motor. In result, the number of wires increases and/or wire harness becomes thick. However, as shown in FIGS. 51 and 52, arranging electric power supplier 3 near motor 2 by fixing it to movable member 75a not only decreases the number of wires but enables a serial communication.

PWM control means 4 is explained as follows; the time t allotted one infinitesimal interval $\Phi$ is T/n if the period of processing term $\Omega$ is T and the number of its division is n. FIG. 7 is a timing chart relating to process and/or computation carried out every infinitesimal interval $\Phi$ of t seconds one after another in the processing term $\Omega$ of period T in response to the instructions of synchronizing control part 41.

Figure 8:
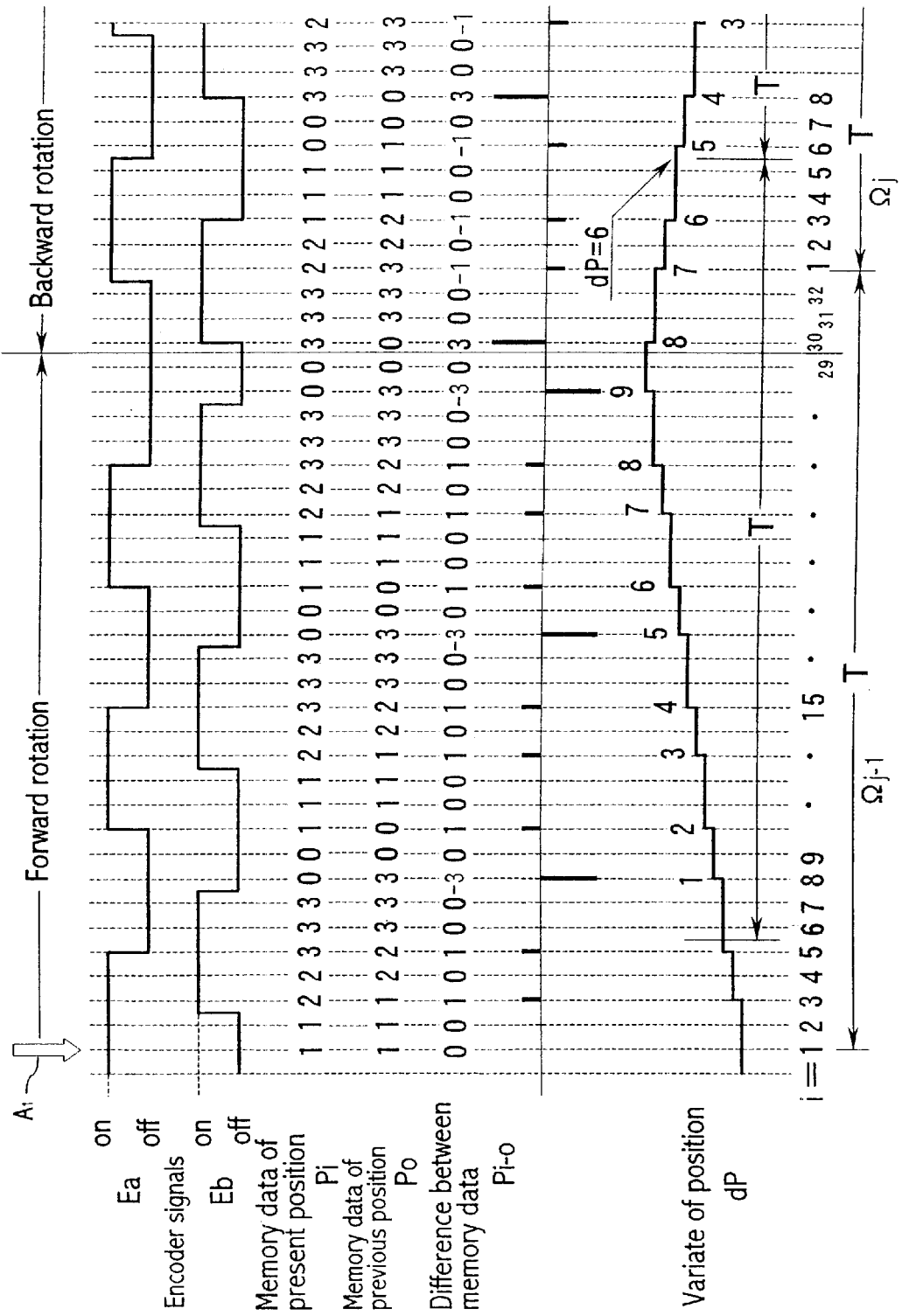
FIG. 8 is a timing chart showing the signals detected by encoder and the procedure for counting the variate of position of motor output shaft based thereon.
Figure 23:
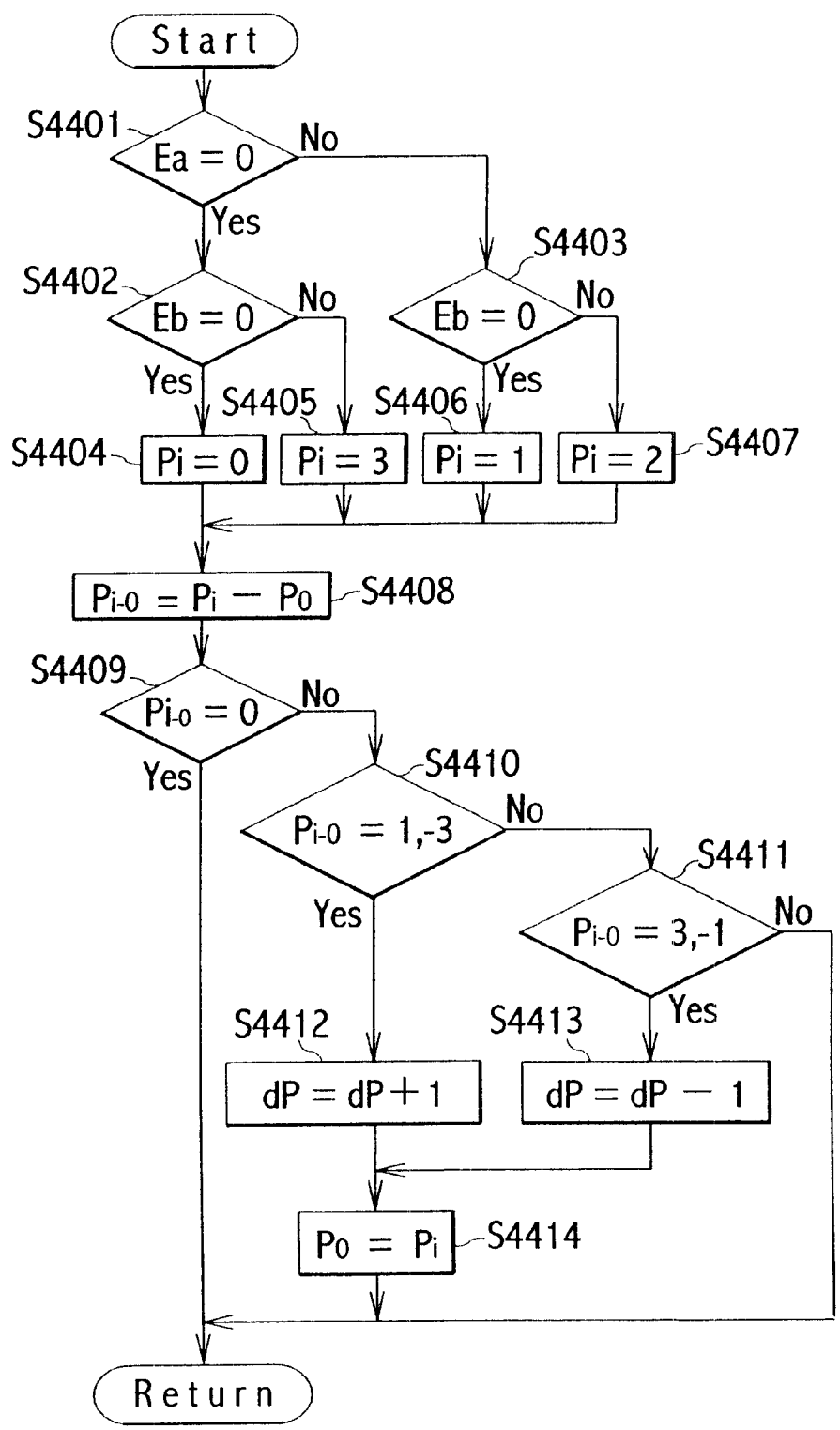
FIG. 23 is a flow chart showing the process of positional signal detector.

The process in positional signal detector 42 shown in FIG. 2 is carried out every infinitesimal interval, $\Phi_1, \Phi_2, \Phi_3, \ldots, \Phi_{31}, \Phi_{32}$, of one processing term $\Omega$ (see the section of positional signal detector 42 in FIG. 7), i.e., detection of positional signals of output shaft is commenced as soon as receiving synchronizing trigger instructed every t seconds. A flow chart for such process is shown in FIG. 23 and FIG. 8 described later teaches the procedure for measuring variate of position. Referring to FIG. 23, if positional signals both Ea and Eb generated by a position detector (encoder) are zero, a memorized value $P_i$ is replaced with 0. $P_i=1$ if Ea=1 and Eb=0. $P_i=2$ if Ea=1 and Eb=1. $P_i=3$ if Ea=0 and Eb=1. The variate dP, i.e., increment or decrement, of position is calculated based on these memorized values.

As shown in FIG. 7, position calculating part 421 described after is carried out once during one processing term $\Omega$ of period T. In the fifth infinitesimal interval $\Phi_5$ present position $P_M$ of motor output shaft is calculated based on the variate dP of the position counted for the segmented term, equal to T, from the interval $\Phi_6$ of previous term $\Omega_{j-1}$ (not-shown) to the interval $\Psi_5$ of present term $\Omega_j$, Such a variate dP is substantially equivalent to the number counted by encoder. The calculation of present position $P_M$ is subjected to the procedure of a flow chart in FIG. 26(a). Needless to say, the number of the kind of encoder count is four, i.e., $P_i=0$, $P_i=1$, $P_i=2$ and $P_i=3$ mentioned above appear during one pitch of slit. Accordingly, measurement accuracy $\lambda$p is 360 degrees/(N×4)=90/N [degree], resulting in measurement error being within 0.9 degree only if N=100.

Figure 27:
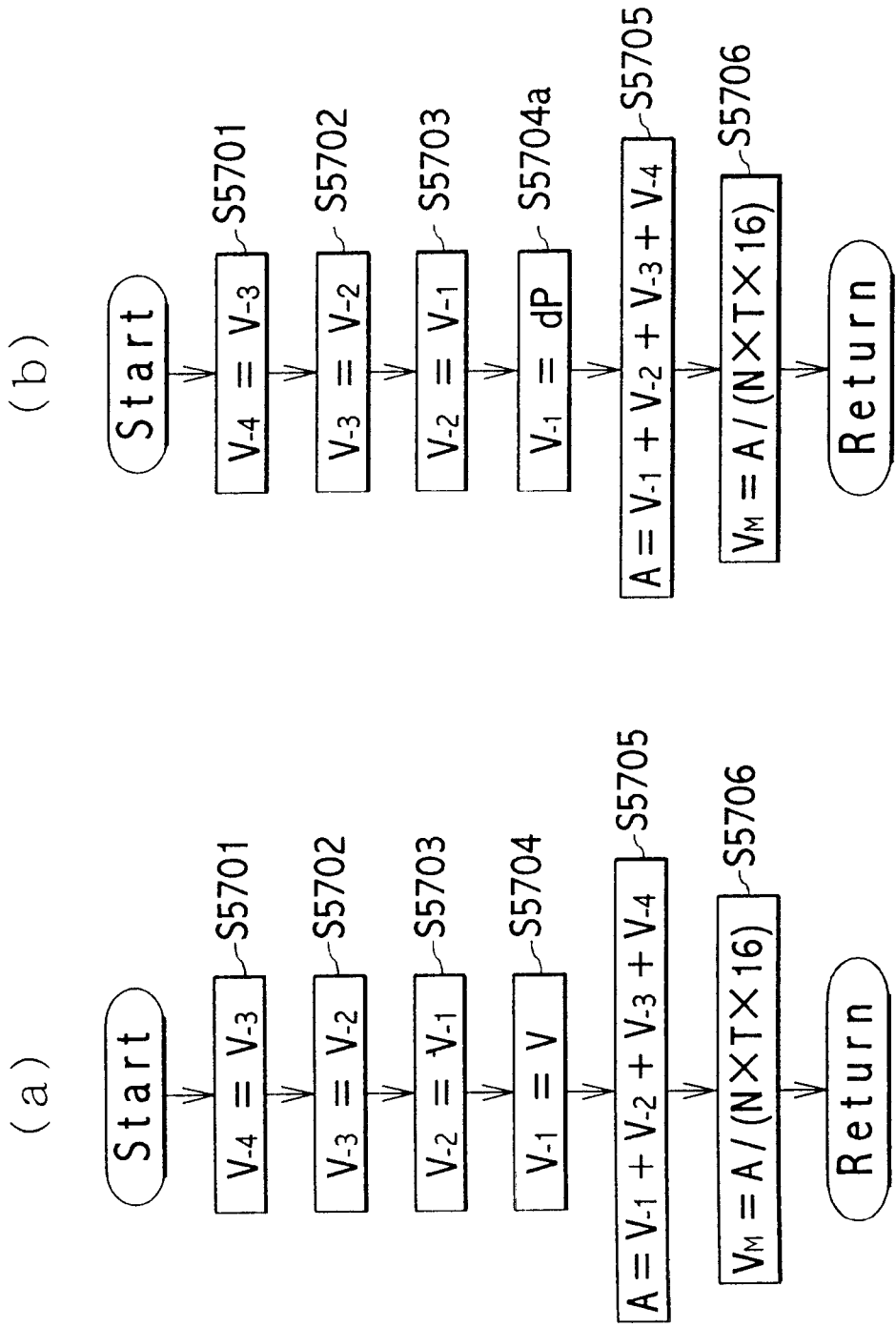
FIG. 27 is a flow chart showing the process of velocity calculating part; (a) is a chart for computing velocity according to the variate cumulated during four continuous segmented terms of T in time, individually, shortly previous to the present infinitesimal interval, and (b) is a chart for computing velocity according to the variate cumulated during four continuous processing term shortly previous to the present term.

The computation of velocity calculating part 422 carried out in an interval $\Phi_6$ (i=6) shown in FIG. 7 is referred to a flow chart of FIG. 27(a). The rotational velocity of DC motor is assigned to a mean value $V_M$ of the velocity V based on latest variate dP calculated in an interval $\Phi_5$ of present processing term $\Omega$, and the velocities based on each variate during three preceding segmented terms, equal to T individually (the first is the segmented term from $\Phi_6$ of term $\Phi_{j-4}$ to $\Phi_5$ of $\Omega_{j-3}$, the second from $\Phi_6$ of $\Omega_{j-3}$ to $\Phi_5$ of $\Omega_{j-2}$, the third from $\Phi_6$ of $\Omega_{j-2}$ to $\Phi_5$ of $\Omega_{j-1}$). The number So of change of signals under 1 rpm of motor is (N×4)×60 [changing numbers/rpm], therefore, the rotational speed $N_r$ of DC motor 2 is given by $V_M$/So in consideration of the rotational velocity $V_M$ measured for (T×4) seconds.

$$Nr=V_M/\{(N\times4\times60)/(T\times4)\} \text{ [rpm]}$$

Measurement accuracy $\lambda$p is formulated by substituting 1 into $V_M$ as follows;

$$\lambda v=1/\{(N\times4\times60)/(T\times4)\} \text{ [rpm]}$$

Maximum rotational speed $Nr_{max}$ being measurable is expressed by substituting n×4 into $V_M$ as follows;

$$Nr_{max}=(4\times n)/\{(N\times4\times60)/(T\times4)\} \text{ [rpm]}$$

The measurable range of speed is 1: (4×n).

The process of PWM commanding part 46 shown in FIG. 7 is commenced just after that of positional signal detector 42, outputting PWM signals Ma and Mb of on or off. Outputting them is also carried out every infinitesimal interval, $\Phi_1, \Phi_2, \Phi_3, \ldots, \Phi_{31}, \Phi_{32}$, of one processing term Q. The timing chart of the process is shown in FIG. 9 and its flow chart shown in FIG. 24. The range of commanding current is 1 to n. Minimum current $I_{min}$ is formulated to $I_{max}/n$ [A] by using maximum current $I_{max}$. The control frequency H is 1/T/1,000 [KHz].

A numerical example is shown for confirming the practical performance of control. It is assumed that the period T of control is 400 $\mu$S, the number n of divisions for control is 32, the number of slits 11a of encoder 1 is 100 and the maximum current supplied to motor is 3A (three ampere). The period of control is as follows;

$$1/T/1,000=1/(400\times10^{-6})/10^3=2.5 \text{ KHz}$$

The minimum generating time t of synchronizing commanding signals is as follows;

$$t=T/n=400/32=12.5 \; \mu S$$

The measurement accuracy $\lambda$p of velocity is as follows;

$$\lambda_V = 1\times60/(100\times4\times400\times10^{-6}\times4) = 93.75 \approx 94 \text{ rpm}$$

The measurable maximum speed $Nr_{max}$ is as follows;

$$Nr_{max} = (4\times32)\times60/(100\times4\times400\times10^{-6}\times4) = 12,000 \text{ rpm}$$

The minimum current $I_{min}$ is 3/32=0.094, i.e., approximately 0.1 A is practicable.

Figure 30:
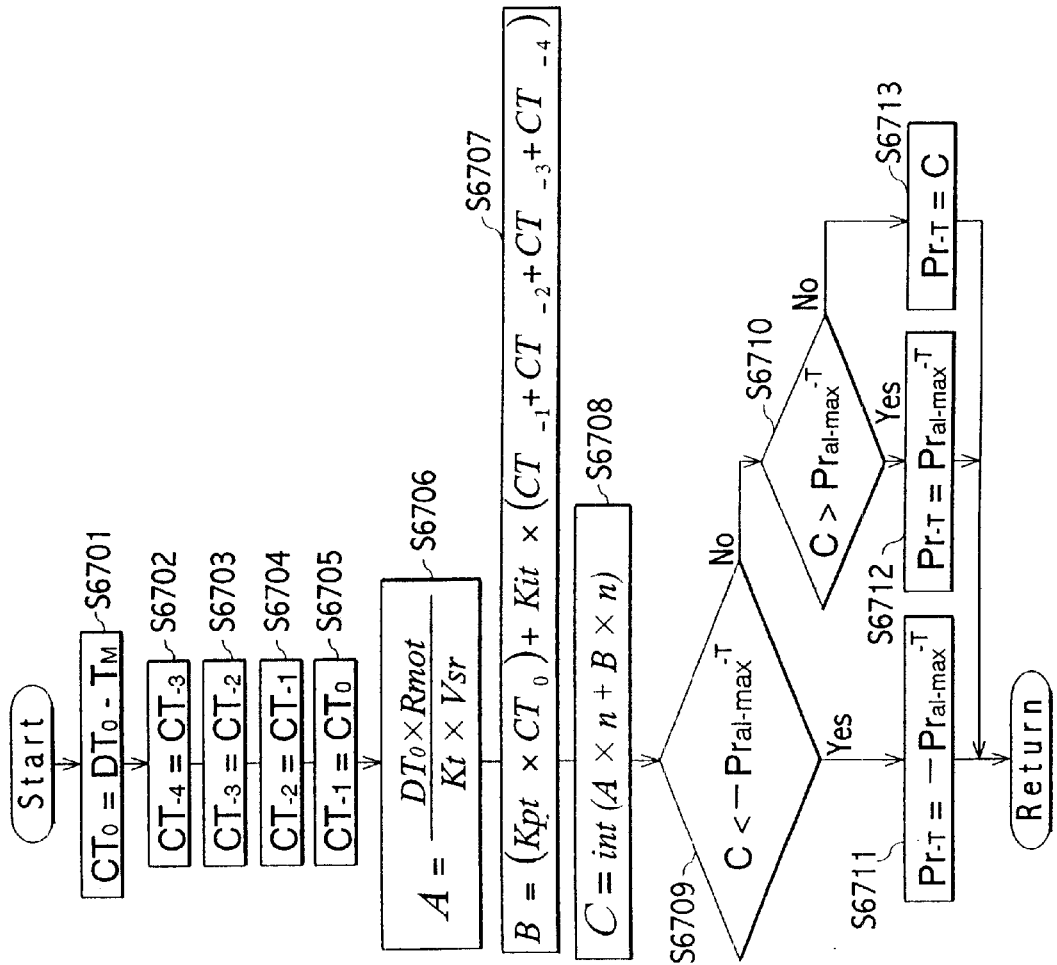
FIG. 30 is a flow chart showing the computation procedure of computing part of PWM target value for torque.

Referring to FIG. 2, the elements of PWM control means 4 except what are already mentioned are as follows; The computing part of FWM target value for torque 443T shown in FIG. 2 is provided with storing part of the target value for torque 443a, computing part for controlling torque 443 and data memory for computing torque 443b shown in FIG. 4(b). The computing part for controlling torque 443 computes the torque Td to be achieved through PI computing (proportional and integral computing) based on both the information given by current detecting part 43 and the target value for controlling torque $DT_0$ stored in storing part of the target value for torque 443a. Thereby, PWM target value $Pr_{-T}$ corresponding the torque Td can be computed and is output to selecting part of target value for designated mode 451. The process of current detecting part 43 is shown in a flow chart of FIG. 25 explained below and a flow chart for generating PWM target value through PI computing in computing part for controlling torque 443 is shown in FIG. 30.

Figure 22:
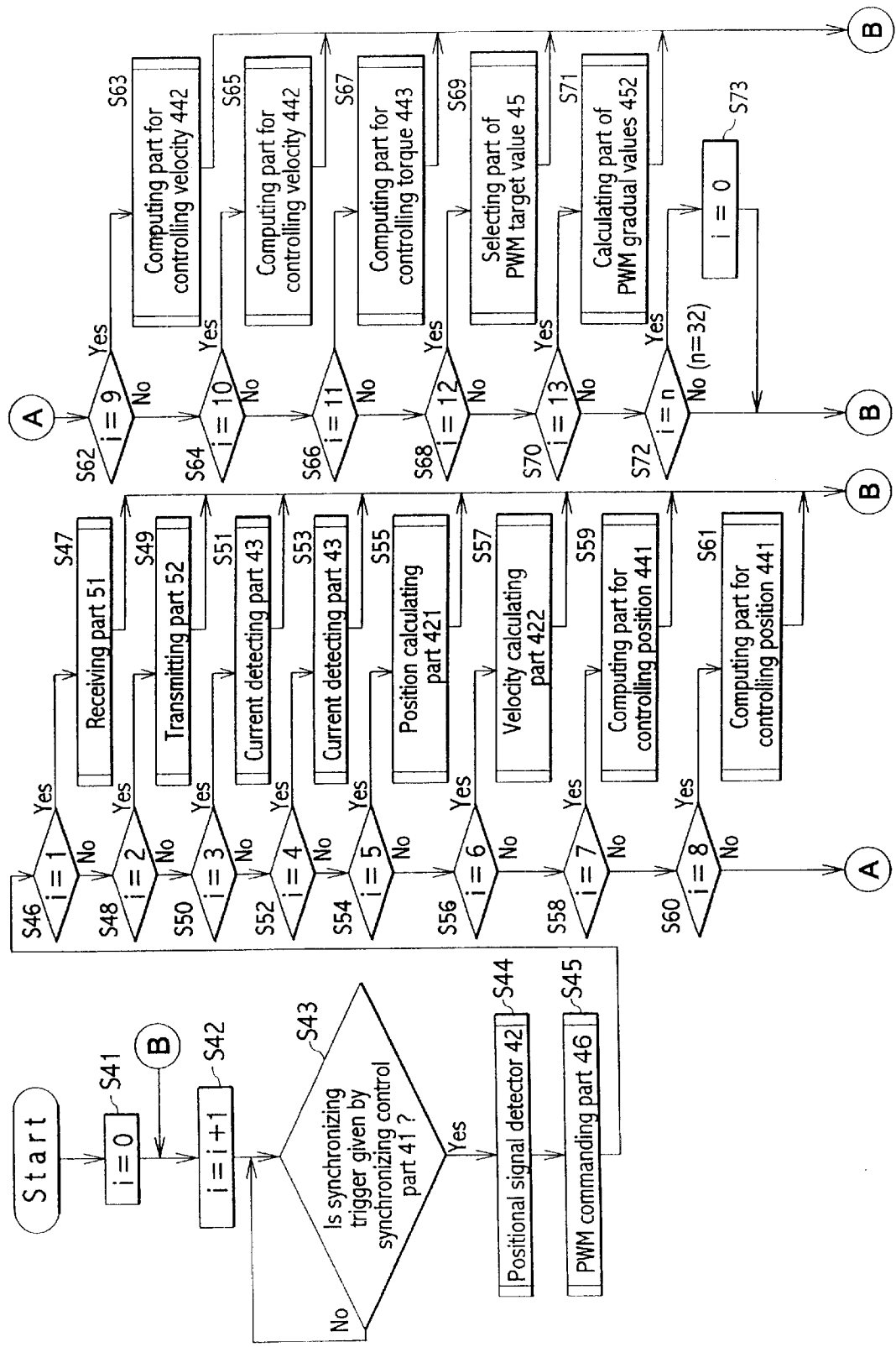
FIG. 22 is a flow chart showing the process and/or computation performed during one processing term Ω in response to synchronizing triggers and the timing for their commencement.

Referring to FIG. 22, two infinitesimal intervals $\Phi$ are assigned to the process of current detecting part 43 because it takes long time therefor. The interval $\Phi_3$ (i=3) is used for preparing the measurement by means of A/D converter at step 5102 in FIG. 25. The data of A/D converter are read at succeeding interval $\Phi_4$ (S5301) and the present torque $T_M$ is computed (S5302), which will be used for PI computing in equation (7) described after.

Defining that the servo voltage of DC power source supplied to electric power supplier 3 is Vsr, this Vsr is set to a value being much larger than the rated voltage $V_{rated}$ of DC motor. The state that current Cm flows through motor under the DC voltage of Vsr is expressed as a following equation by using motor resistance Rmot, inductance Lmot, induced voltage constant Ke and angular velocity ω of DC motor.

$$Vsr = Rmot \times Cm + Lmot \times \frac{dCm}{dt} + Ke \times \omega \quad (1)$$

The current Cm becomes a maximum value $Cm_{-max}$ when the rotational velocity ω of DC motor is 0, being formulated to a following equation.

$$Cm_{-max} = \frac{Vsr}{Rmot} \times (1 - e^{(-R/L)t}) \quad (2)$$

A maximum allowable current $Cm_{a1-max}$ less than a maximum current $Cm_{-max}$ is generally defined in a specification of DC motor. The maximum allowable current is, of course, different every kind of motors. If the motor current comes to more than the maximum allowable current $Cm_{a1-max}$ itself, the deterioration of motor performance and/or the damage of motor are often induced. It is important that PWM target value $Pr_{-T}$ computed at computing part for controlling torque 443 is limited up to PWM maximum allowable value $Pr_{a1-max}^{-T}$ being less than PWM maximum value $Pr_{-max}^{-T}$ corresponding to maximum current $Cm_{-max}$ before it selected as a PWM commanding value $Pr_{-SM}$. Maximum allowable value $Pr_{a1-max}^{-T}$ is given by a following equation.

$$Pr_{a1-max}^{-T} = \quad (3)$$
$$int\left[\frac{Cm_{a1-max}}{Cm_{-max}} \times n\right] \approx int\left[\frac{Cm_{a1-max}}{Vsr/Rmot} \times n\right] \approx int\left[\frac{Cm_{a1-max} \times Rmot \times n}{Vsr}\right]$$

n shows a divisional number of one processing term Ω and "int" means an integer obtained by omitting fractions. The maximum torque $T_{M-max}$ generated by maximum allowable current $Cm_{-max}$ flowed through DC motor 2 is dependent on torque constant Kt of DC motor and is formulated as follows;

$$T_{M-max} = Kt \times Cm_{-max} \quad (4)$$

The superior controller 7 naturally instructs a target value $DT_0$ for controlling motor in consideration of such conditions, therefore, $DT_0$ fulfilling a following equation is given in general.

$$|DT_0| < T_{M-max} \quad (5)$$

The value of torque computed in the case that target value for torque is $DT_0$ in the processing term $\Omega_j$ gives the duty ratio for PWM control in the term $Q_{j+1}$. The control range of $Pr_{-T}$ obtained by such a duty ratio possesses the symbols of positive and negative, and its absolute values are given within the range from 0 to $Pr_{a1-max}^{-T}$ mentioned above. The equation is statically given as follows;

$$Pr_{-T} = int\left[DT_0 \times \frac{Rmot \times n}{Kt \times Vsr}\right] \quad (6)$$

However, PWM target value for torque $Pr_{-T}$ is dynamically computed through PI computing shown in following equation in consideration of the responsibility and stability of control since equation (1) includes an angular velocity ω.

$$Pr_{-T} = int\left[DT_0 \times \frac{Rmot \times n}{Kt \times Vsr} + \quad (7)\right.$$
$$\left. Kpt \times (DT_0 - T_M) \times n + Kit \times \int (DT_0 - T_M) dt \times n\right]$$

Where, KPt is a proportion constant for PI computing, and K it is an integration constant.

The control value of $Pr_{-T}$ in equation (7) means PWM target value of torque control and is almost proportional to the computed value of torque Td, which is shown in FIG. 10(c). The maximum value of duty ratio is 32/32 because of n=32. But the maximum value of $Pr_{a1-max}^{-T}$ is assigned to PWM target value corresponding to, e.g., duty ratio of 28/32 since duty ratio in full tends to deteriorate motor performance and/or fail a motor. Therefore, $Pr_{-T}$ must be kept just 28 if it was calculated over 28, then, PWM target value computed concerning torque is limited up to PWM maximum allowable value $Pr_{a1-max}^{-T}$ corresponding to maximum allowable current of motor 2.

The computation of computing part for torque 443 described above is shown in a flow chart of FIG. 30. The use of data of $CT_{-1}$ to $CT_{-4}$ teaches that the computation of the flow chart is an example which integrates the errors generated in four processing terms $\Omega_{j-4}$, $\Omega_{j-3}$, $\Omega_{j-2}$ and $\Omega_{j-1}$ shortly previous to the present term. Two comparators (see steps 6709 and 6710) described in the flow chart ascertain whether FWM target value for torque is less than that corresponding to maximum allowable current. If it is larger than the maximum value, it is limited to the maximum allowable value $Pr_{a1-max}^{-T}$ as mentioned above (refer to steps 6711 and 6712).

Figure 26:
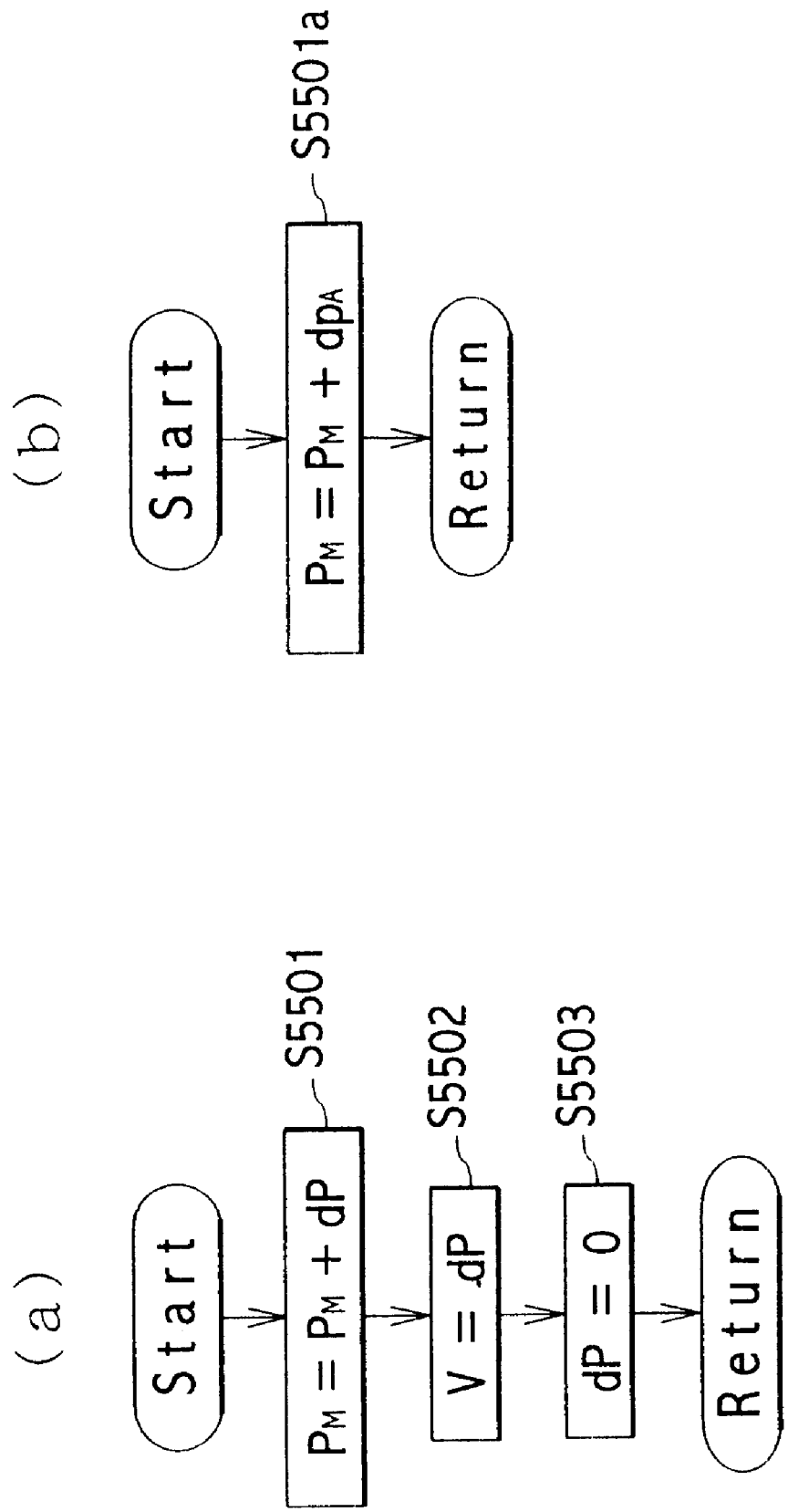
FIG. 26 is a flow chart showing the process of position calculating part; (a) is a chart for counting variate detected during the segmented term including n infinitesimal intervals shortly previous to the present interval, and (b) is a chart for counting variate detected during the processing term shortly previous to the present term.

Next, the computing part of PWM target value for position 441P shown in FIG. 2 is described below; The computing part of PWM target value for position 441P is provided with storing part of target value for position 441a, position calculating part 421, computing part for controlling position 441 and data memory for calculating position 421b as shown in FIG. 4(d). The position calculating part 421 calculates present position of motor 2 based on the information of positional signal detector 42, the flow chart of its process is shown in FIG. 26 (a). The flow chart of process in positional signal detector 42 is shown in FIG. 23. The computing part for controlling position 441 computes the position to be achieved P d through PI computing based on both information of position calculating part 421 and target value for controlling position $DP_0$ stored in storing part of target value for position 441a. And PWM target value $Pr_{-P}$ corresponding to the computed position is computed and is output to selecting part of target value for designated mode 451.

Figure 28:
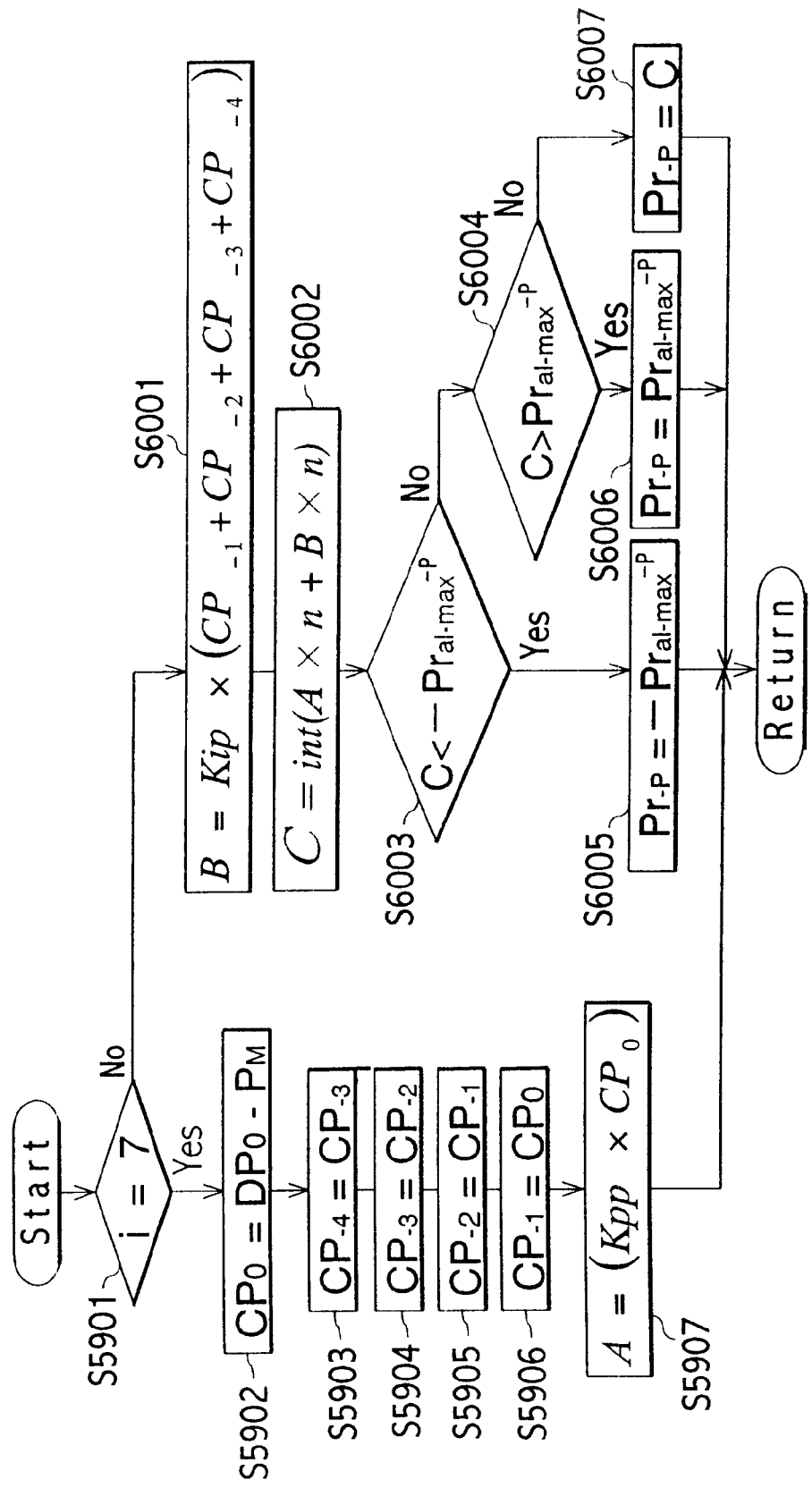
FIG. 28 is a flow chart showing the computation procedure of computing part of PWM target value for position.

Such process is shown in a flow chart of FIG. 28. First, $DP_0$ is instructed as a target value for controlling position, and the position $P_M$ of motor output shaft in consideration of variate dP counted up through intervals included in the segmented term of T just before the present interval is applied to the computation in position calculating part 421 (see step 5501 in FIG. 26(a)). PWM target values $Pr_{-P}$ is computed according to a following equation by using both a proportional term showing difference from the target position and integral term integrating errors generated in four groups consisting of intervals included in the segmented term of T just before the present interval.

$$Pr_{-P} = int\left[Kpp \times (DP_0 - P_M) \times n + Kip \times \int (DP_0 - P_M) dt \times n\right] \quad (8)$$

Where, Kpp is a proportion constant for PI computing, and Kip is an integration constant.

$Pr_{-P}$ in equation (8) means PWM target value of position control, which is almost proportional to the computed value of position Pd as shown in FIG. 10(a). In spite that maximum value of duty ratio is 32/32, $Pr_{a1-max}^{-P}$ is assigned to, e.g., 28/32 less than PWM maximum value $Pr_{-max}^{-P}$. Accordingly, $Pr_{-P}$ does not come to more than 28 so that PWM target values computed concerning position is limited up to PWM maximum allowable value $Pr_{a1-max}^{-P}$ corresponding to maximum allowable current of motor 2.

The computation in computing part for controlling position 441 described above is shown in a flow chart of FIG. 28. An example of integration in the flow chart is given by the summation of errors generated in four continuous processing terms $\Omega_{j-4}$, $\Omega_{j-3}$, $\Omega_{j-2}$ and $\Omega_{j-1}$, of period T each, shortly previous to the present term, as shown by data of $CP_{-1}$ to $CP_{-4}$. Two comparators (see steps 6003 and 6004) in the flow chart ascertain whether PWM target value for position is less than that corresponding to maximum allowable current. If it is larger than the maximum value, it is limited to the maximum allowable value $Pr_{a1-max}^{-P}$ (refer to steps 6005 and 6006).

The positional information of a motor output shaft, being described later in a flow chart of FIG. 26(a), is generated by adding the increment or the decrement obtained by cumulating the positional signals Ea and Eb of motor output shaft, which are detected during n infinitesimal intervals $\Phi$ shortly previous to the interval $\Phi_h$ of processing term $\Omega_j$, computing the present position of output shaft, to the positional information $P_M$ obtained in the interval $\Phi$ of T in time before, i.e., in the interval $\Phi_h$ of term $\Omega_{j-1}$ shortly previous to the present one. Referring to FIG. 22, the calculation of position calculating part 421 is scheduled for interval $\Phi_5$, i.e., during i=5. On the other hand, the process of positional signal detector 42 is charged to every interval $\Phi_i$ (see step 44). The position calculating part 421, therefore, may calculate the variate dP in consideration of the signal detected by positional signal detector 42 scheduled prior to position calculating part 421 during i=5. Signals detected in the infinitesimal intervals $\Phi_6$, $\Phi_7$, ..., $\Phi_{31}$, $\Phi_{32}$ of previous processing term $\Omega_{j-1}$ and intervals $\Phi_1$, $\Phi_2$, ..., $\Phi_5$ of present term $\Omega_j$ are used for counting the variate dP to calculate present position.

Referring to FIGS. 8 and 23, the process for counting the variate d P according to positional signals Ea and Eb is explained as follows; The infinitesimal interval $\Phi_6$ at i=6 of processing term $\Omega_{j-1}$ shows that the memory data of present position P, is equal to 3 because Ea=0 and Eb=1 in consideration that encoder signal Ea is off and signal Eb on. $P_0$ is replaced with 3 since previous $P_i$ is also 3 in this figure. In the case of i=7 Ea=0 and Eb=1 as well as in the case of i=6. The memory data of present position $P_i$ is 3. $P_0$ at i=7 is also replaced with 3 since $P_i$ at i=6 is 3. In the case of i=8 Ea=0 and Eb=0 in consideration that both Ea and Eb are off so that $P_i$ comes to 0. $P_0$ is replaced with 3 since previous $P_i$ is 3. In the case of i=9 Ea=0 and Eb=0 as well as in the case of i=8. The memory data of present position $P_i$ comes to 0. $P_0$ at i=9 is also replaced with 0 since $P_i$ at i=8 is 0. In the case of i=10 Ea=1 and Eb=0 in consideration that Ea is changed into on by rising and Eb is kept off so that $P_i$ comes to 1. $P_0$ at i=10 is also replaced with 0 since $P_i$ at i=9 is 0. In the case of i=11 Ea=1 and Eb=0 as well as in the case of i=10. The memory data of present position $P_i$ comes to 1. In the case of i=12 Ea=1 and Eb=0 as well as in the case of i=11 so that $P_i$ comes to 1. $P_0$ at i=12 is also replaced with 1 since $P_i$ at i=11 is 1. In the case of i=13 Ea=1 and Eb=1 in consideration that Ea is kept on and Eb is changed into on by rising so that $P_i$ comes to 2. $P_0$ at i=13 is also replaced with 1 since $P_i$ at i=12 is 1. In the case of i=14 Ea=1 and Eb=1 as well as in the case of i=13. The memory data of present position $P_i$ comes to 2. $P_0$ at i=14 is also replaced with 2 since $P_i$ at i=13 is 2. In the case of i=15 Ea=0 and Eb=1 in consideration that Ea is changed into off by dropping and Eb is kept on. The memory data of present position $P_i$ comes to 3. $P_0$ at i=15 is also replaced with 2 since $P_i$ at i=14 is 2.

In any infinitesimal interval $\Phi$ the difference $P_{i-0}$ between the memory data of present position $P_i$ and the memory data of previous position $P_0$ is calculated. The difference is 0 except 1, −3 and 3. Variant dP of position is obtained by counting the number of "on" assuming that 0 is "on" and not-0 "off". FIG. 8 showing $P_i$ and $P_0$ in one cycle of signal Ea or Eb generated for the time from i=6 to i=15 teaches that the number of change from "on" to "off", and vice versa is 4. Signal Ea runs before signal Eb till i=29 (infinitesimal interval $\Phi_{29}$) of processing term $\Omega_{j-1}$ in FIG. 8, which means that the motor rotates forward. Signal Ea runs after signal Eb from i=30 (interval $\Phi_{30}$), which means that the motor rotates backward. The variate dP results in 9−3=6 during 32 infinitesimal intervals $\Phi$ from i=6 of term $\Omega_{j-1}$ to i=5 of term $\Omega_j$. Needless to say, 9 is a cumulate number during forward rotation, while 3 is one during backward rotation. In the scope from i=1 to i=32 of term $\Omega_{j-1}$ the variate dP results in 11−2=9.

The computing part of FWM target value for velocity 442V shown in FIG. 2 is described below; The computing part of PWM target value for velocity 442V is provided with storing part of target value for velocity 442a, velocity calculating part 422, computing part for controlling velocity 442, data memory for calculating velocity 422b and data memory for computing velocity 442b as shown in FIG. 4(c). The velocity calculating part 422 calculates present velocity of motor 2 based on the information of positional signal detector 42 according to the flow chart shown in FIG. 27(a). Since the variate dP of positional signals Ea and Eb of motor output shaft mentioned above directly means a velocity of the output shaft, V=dP is formulated to assign dP to the velocity at step 5502 after the computation of present position in the flow chart of FIG. 26(a) showing the process of position calculating part 421. Such V is used at step 5704 in the flow chart of FIG. 27(a) showing the process of velocity calculating part 422.

The process of velocity calculating part 422 is explained in detail as follows; Rotational velocity $V_M$ of DC motor is assigned to a mean value of velocities in four continuously segmented terms equal to T individually. The process of velocity calculating part 422 is shown in FIG. 27(a). The number So of change of signals under 1 rps of DC motor is given by a following equation;

$$So = (N \times 4)[\text{Number}/rps] \quad (9)$$

Rotational velocity $V_M$ of DC motor 2 is obtained by using the summation of variate dP (=V) of position counted in the segmented term equivalent to T shortly previous to the present infinitesimal interval and velocities in three further preceding segmented terms of T individually as follows;

$$V_M = \frac{\sum_{i=1}^{i=4} V_{-1}}{So \times (T \times 4)} = \frac{\sum_{i=1}^{i=4} V_{-1}}{N \times T \times 16} \quad [\text{rps}] \quad (10)$$

The computing part for controlling velocity 442 computes the velocity to be achieved based on both information obtained by velocity calculating part 422 and target value for controlling velocity $DV_0$, and computes PWM target value corresponding to the velocity to be achieved.

The motor loaded with rated voltage $V_{rated}$ rotates in rated revolution $N_{rated}$. The rps is used later as rotational speed. In the present invention the range of FWM control is given so that the servo voltage comes equal to effective voltage $V_{rated}$ to keep the rated condition. Accordingly, the computed value of velocity $Pr_{-V_{rated}}$ is formulated to a following equation;

$$Pr_{-V\;rated} = int\left[\frac{V_{rated}}{Vsr} \times n\right] \quad (11)$$

In the case that the target velocity of DC motor is $DV_0$ the static computed value of velocity is as follows;

$$\frac{DV_0 \times V_{rated}}{N_{rated} \times Vsr} \quad (12)$$

However, PWM target values for velocity is computed through PI computing shown in following equation in consideration of the responsibility and stability of control, similarly to torque control.

$$Pr_{-V} = int\left[\frac{DV_0 \times V_{rated} \times n}{N_{rated} \times Vsr} + \right. \quad (13)$$
$$\left. Kpv(DV_0 - V_M) \times n + Kiv \times \int (DV_0 - V_M)dt \times n\right]$$

Where, $K_{pv}$ is a proportion constant for PI computing, and $K_{iv}$ is an integration constant.

Figure 10:
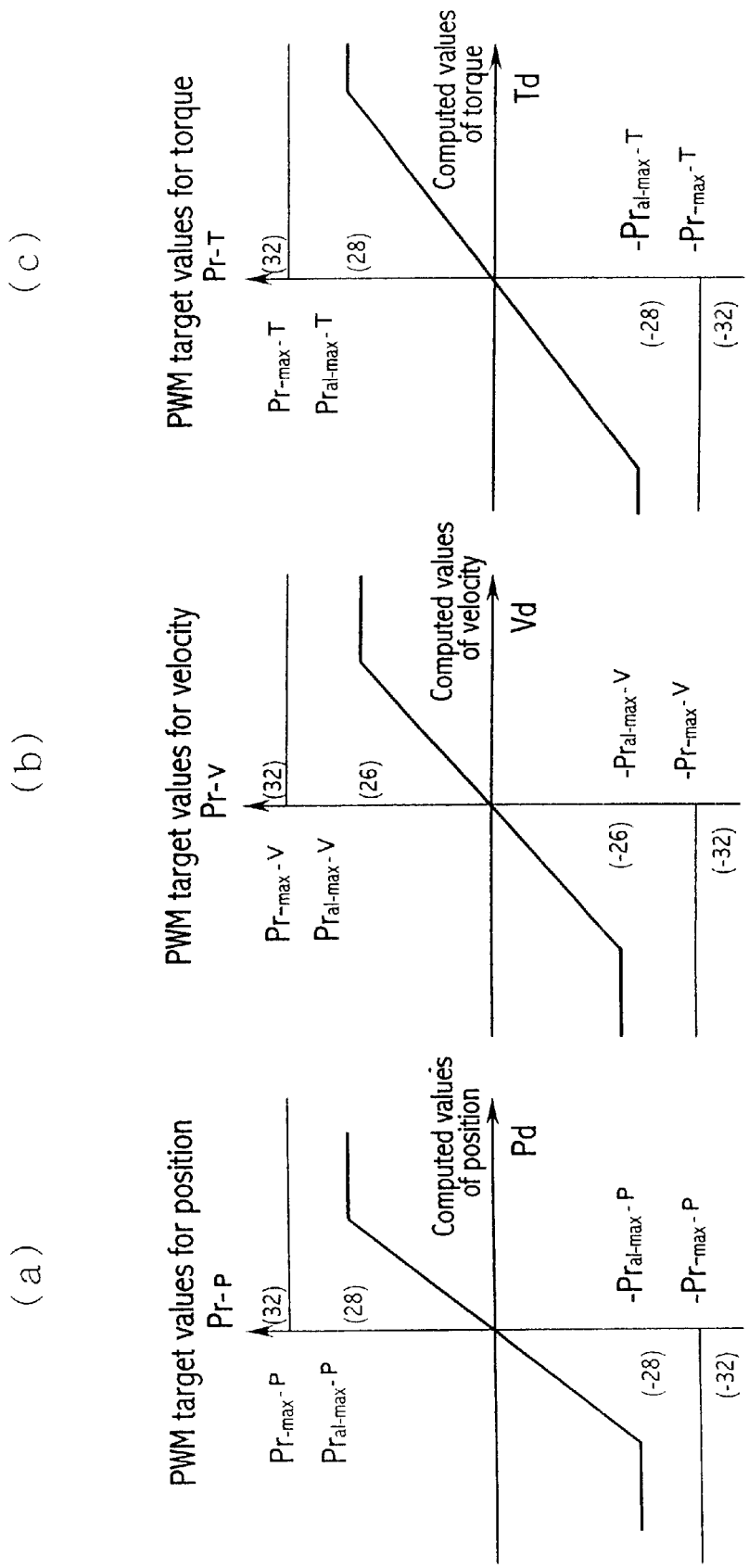
FIG. 10 shows PWM target values computed in PWM computing part and its limited values; (a) is a graph of PWM target values corresponding to computed value of position, (b) a graph of PWM target values corresponding to computed value of velocity, (c) a graph of PWM target values corresponding to computed value of torque.

$Pr_{-V}$ of equation (13) means PWM target value of velocity control and is almost proportional to the computed values of velocity Vd as shown in FIG. 10(*b*). The maximum value of $Pr_{a1-max}^{-V}$ is assigned to PWM target value corresponding to, e.g., duty ratio of 26/32 less than PWM maximum value $Pr_{-max}^{-V}$. Therefore, $Pr_{-V}$ must be kept just 26 if it was calculated more than 26, then, PWM target values computed concerning velocity is limited up to PWM maximum allowable value $Pr_{a1-max}^{-V}$ corresponding to maximum allowable current of motor 2.

The computation in computing part for controlling velocity 442 described above is shown in the flow chart of FIG. 29. An example of integration in the flow chart is given by the summation of errors $DV_0 - V_M$ generated in four continuously preceding segmented terms, equal to T individually. Two comparators (see steps 6503 and 6504) in the flow chart ascertain whether PWM target value for velocity is less than that corresponding to maximum allowable current. If it is larger than the maximum value, it is limited to the maximum allowable value $Pr_{a1-max}^{-V}$ (refer to steps 6505 and 6506).

Figure 4:
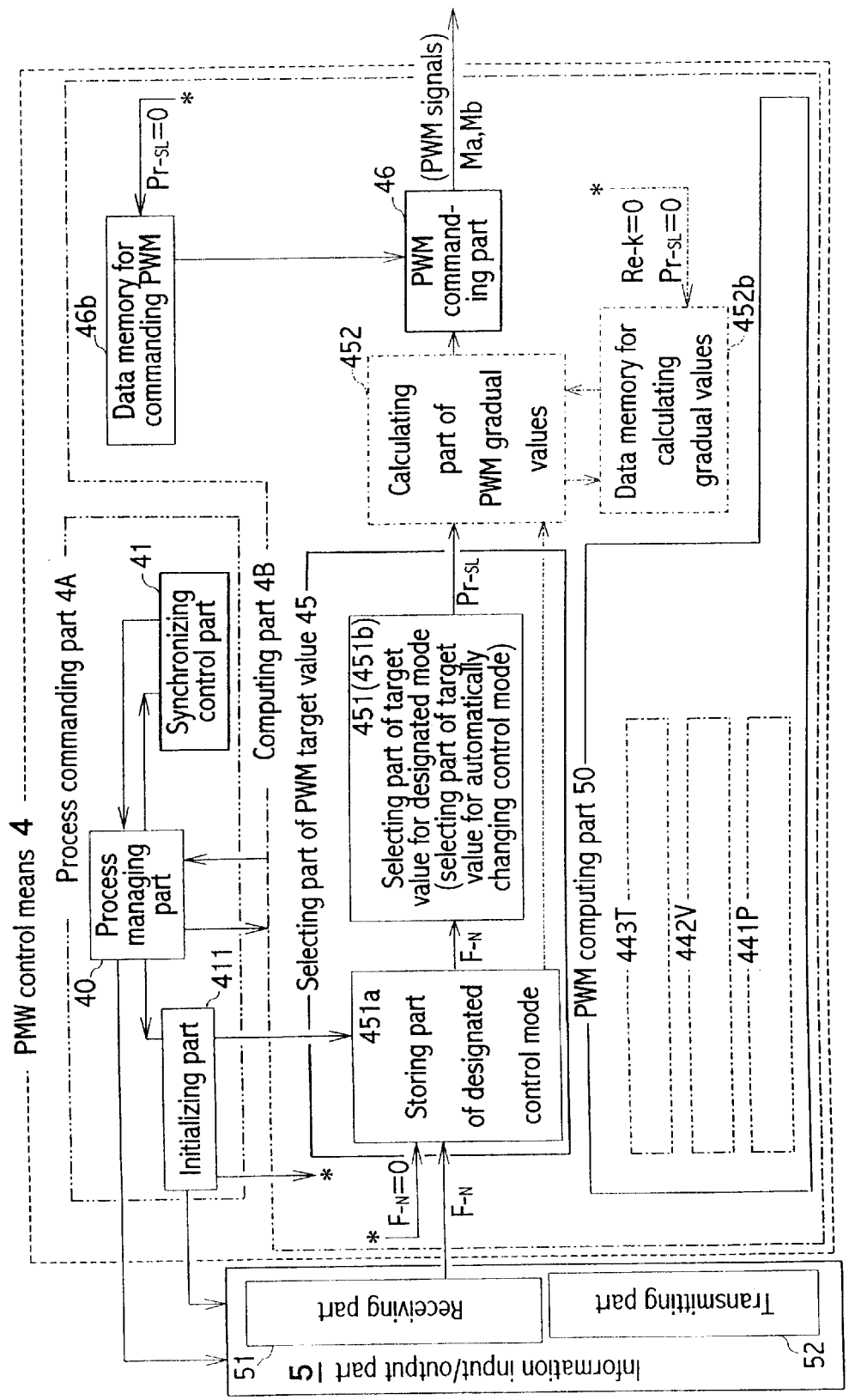
FIG. 4 is a detailed block diagram showing PWM control part; (a) is a block diagram except the detail of FWM computing part 50, (b) is a block diagram mainly showing the computing part of PWM target value for torque 443T, (c) a block diagram mainly showing the computing part of PWM target value for velocity 442V and (d) a block diagram mainly showing the computing part of PWM target value for position 441P.
Figure 4:
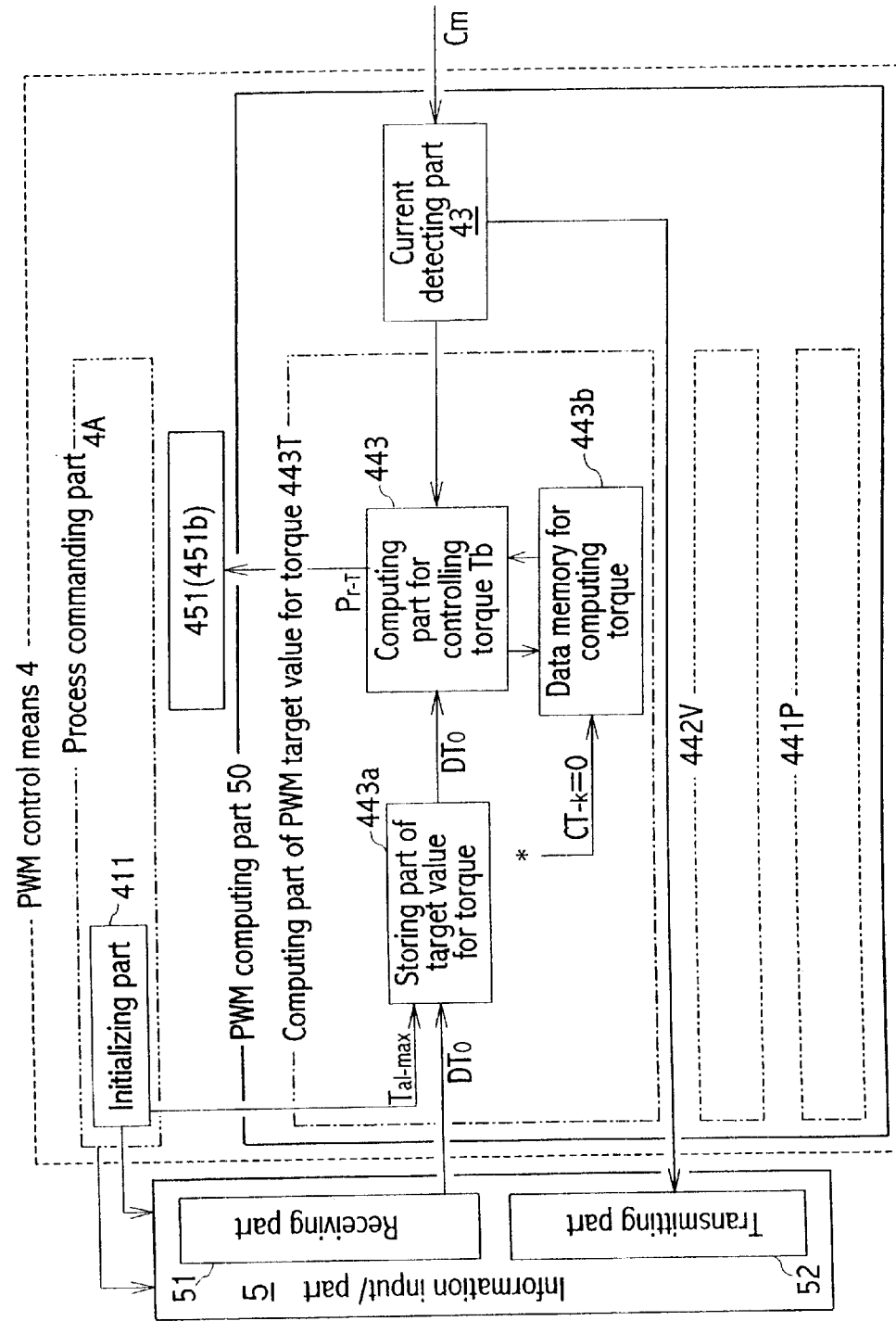
Figure 4:
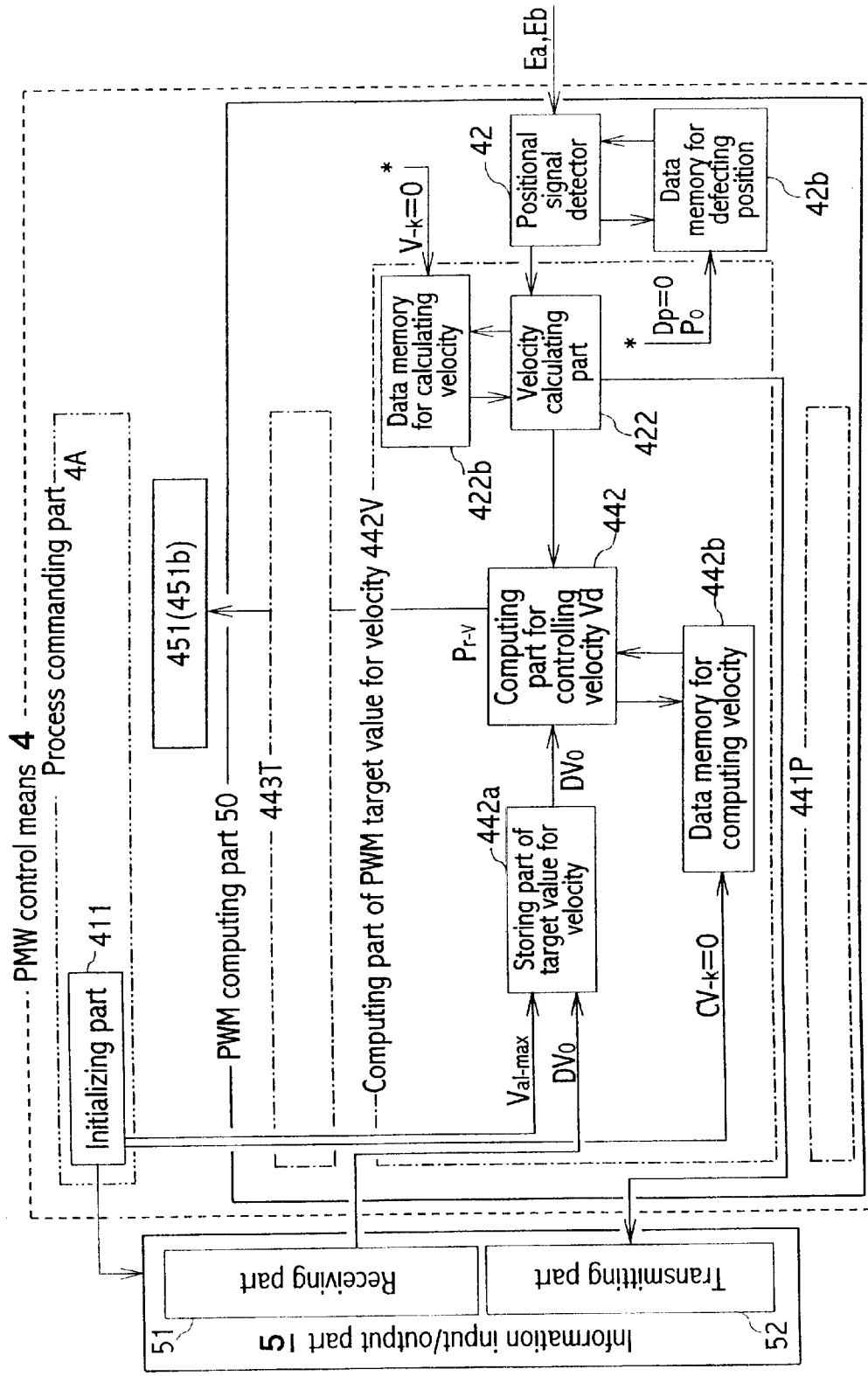
Figure 4:
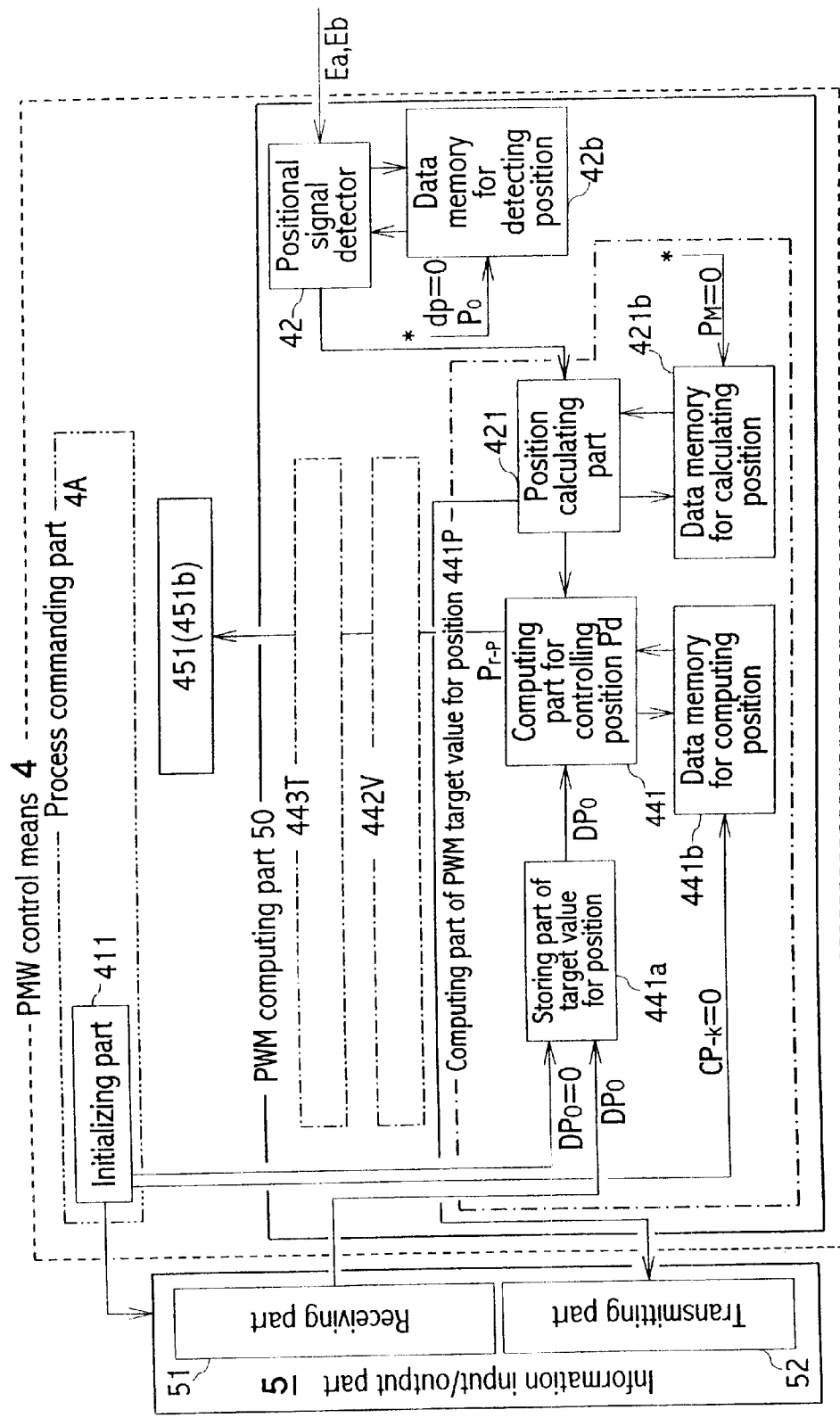

The PWM control means 4 may communicate to information input/output part 5 instead of directly communicating to superior controller 7 in the case that the information input/output part is provided in servo-controlling device 85 as shown in FIG. 2. Such an information input/output part 5 consists of receiving part 51 and transmitting part 52 as shown in FIG. 4(*a*), nevertheless, it may consist of receiving part 51 only. The receiving part 51 reads out the control input information including control target values $DP_0$, $DV_0$ and $DT_0$ and control mode $F_{-N}$ from the transmitting part 72 (refer to FIG. 3) of superior controller 7 according to the instructions of synchronizing control part 41, and stores them into storing parts of FWM computing part 50 every information. The transmitting part 52 transmits any data of present position, velocity or current inquired through receiving part 51 to the receiving part 71 (refer to FIG. 3) of superior controller 7 according to the instructions of synchronizing control part 41, the operation of which is described later in FIGS. 14, 15 and 16. The numeral 64 in FIG. 3 is a condenser which prevents the voltage from dropping so that the starting current of motor does not steeply rise up. The superior controller 7 transmits the signals of control input information into information input/output part 5 after the lapse equivalent to at least one control period since PWM control means 4 and information input/output part 5 are started by the switching on the DC power source 63.

Next, initializing part 411 equipped in process commanding part 4A is explained as follows; The servo-controlling system according to the present invention is formed by combining several software each other, which needs to reset information input/output part 5 prior to computation and to have initial values and/or temporal values required for computation. For example, control target values $DP_0$, $DV_0$ and $DT_0$ and control mode $F_{-N}$ are assigned to temporal values prior to the commencement of computation in the initial processing term $\Omega_1$ after the start of servo-control. In order to assign them the predetermined time $u_0$ (see the upper part of FIG. 13) is spent just after the commencement of servo-control, accordingly, the computation of initial processing term $\Omega_1$ is carried out after the lapse of $u_0$.

Both PWM control means 4 and information input/output part 5 described above are assembled in one micro processor unit, MFU, to which positional signals Ea and Eb output from position detector 1 and current signal Cm output from ammeter 31 are directly input, and from which PWM signals Ma and Mb can be directly output to electric power supplier 3. Since MPU can directly communicate with superior controller 7, servo-controlling motor becomes practicable by using a small tip without counter for detecting position and/or velocity, resulting in a very small control device equipped with simple hardware. Further, the interrupting process according to external signals is not required, so that process and/or computation are performed based on the instructions of synchronizing control part. Therefore, all of process and/or computation are carried out within the predetermined term perfectly, without keeping intervals for interrupting procedure, resulting in the high reliability of control having very few dead time.

Figure 11:
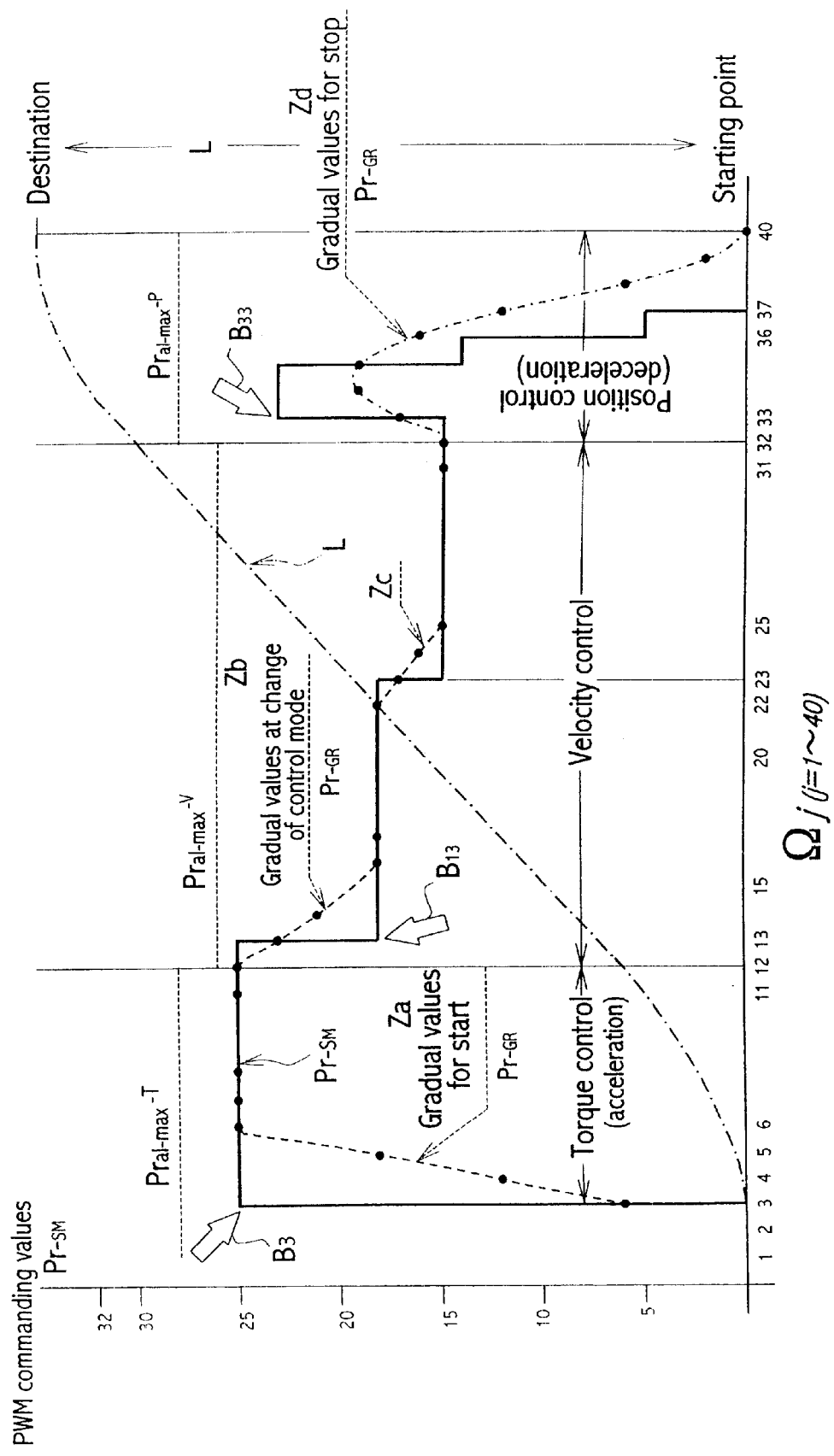
FIG. 11 is a graph showing the movement of motor from start to stop and control of motor therefor.
Figure 12:
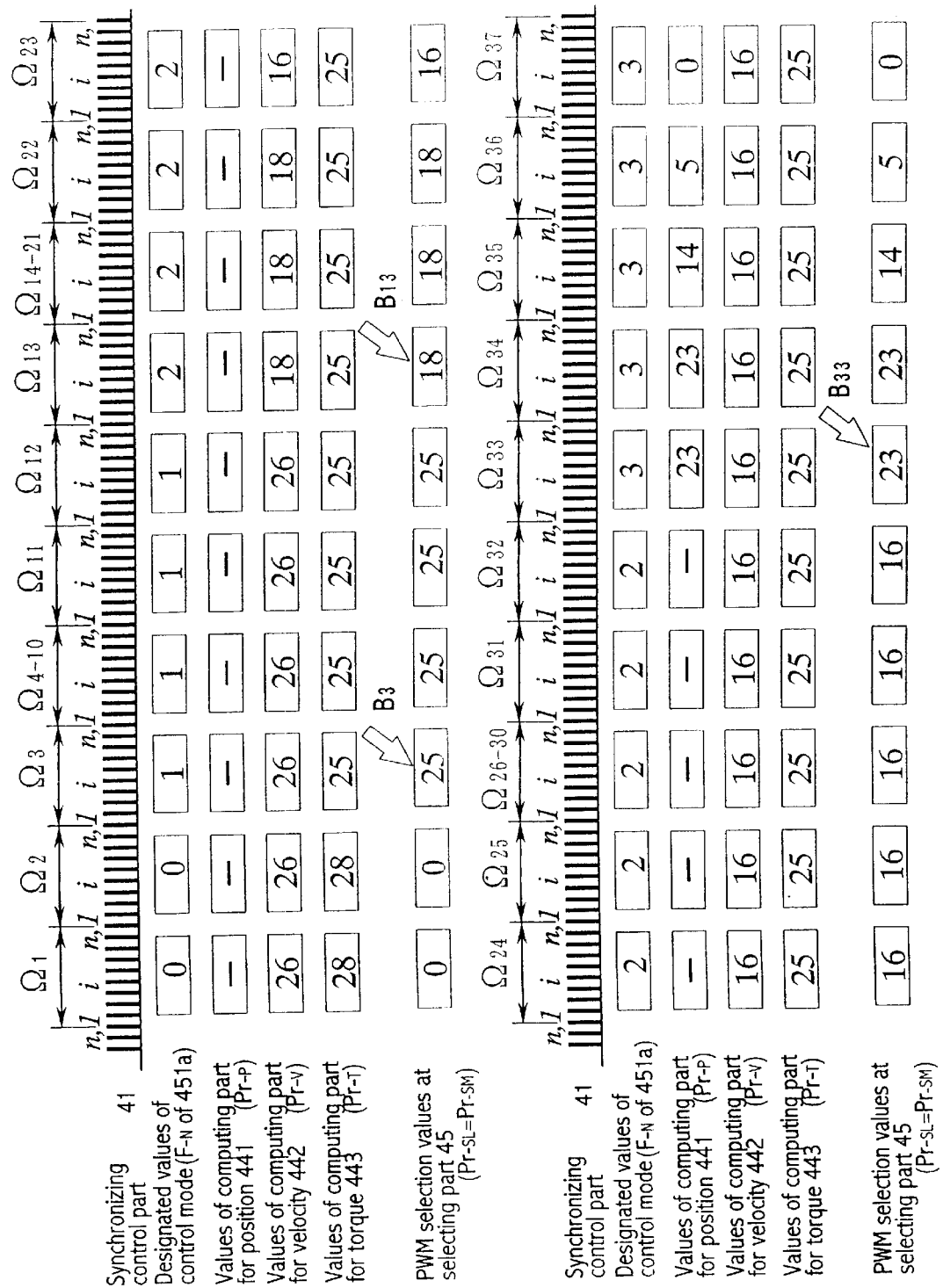
FIG. 12 is a list showing PWM target values computed on position, velocity and torque in parallel and PWM selection values selected according to control mode.
Figure 13:
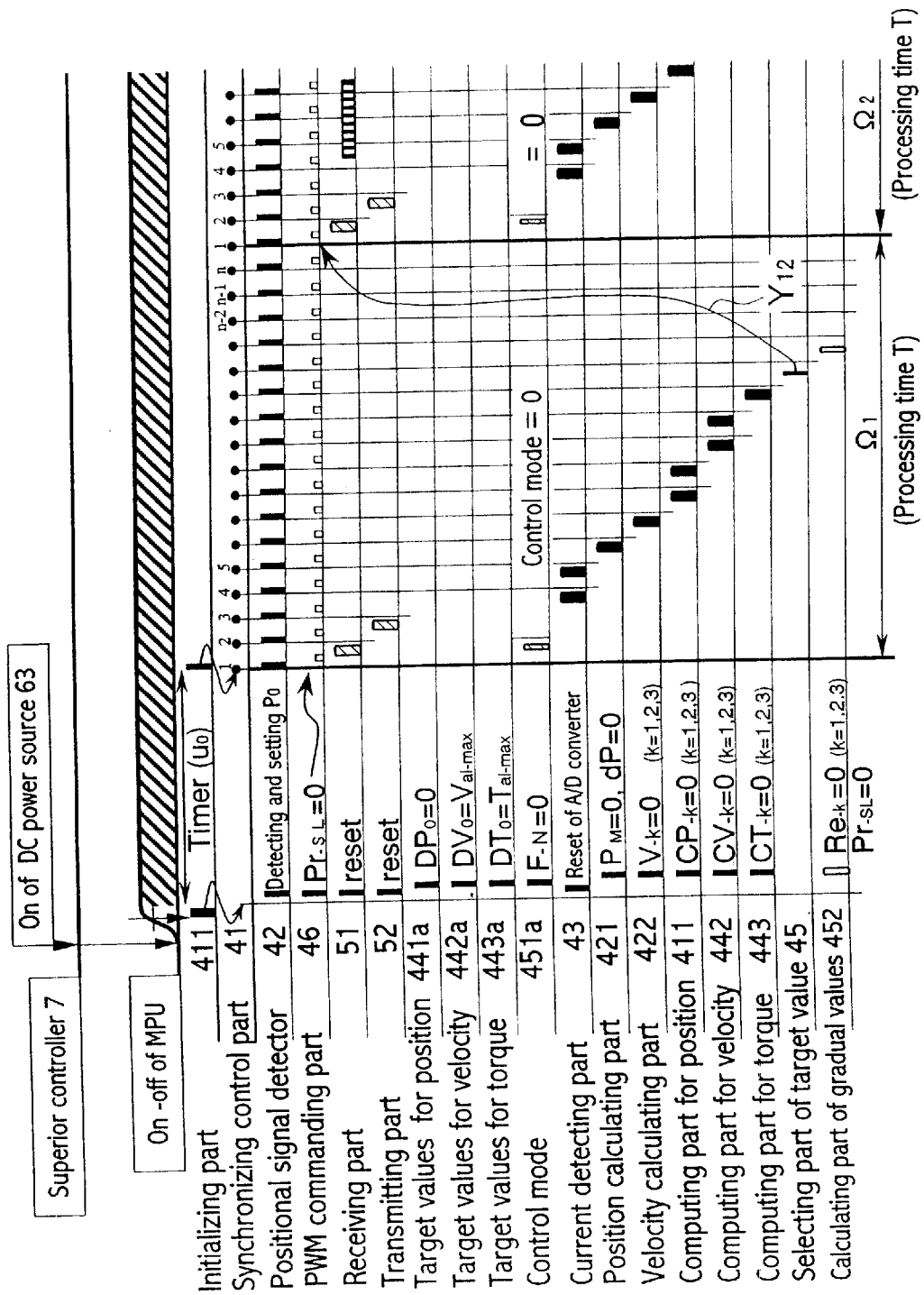
FIG. 13 is a timing chart showing the procedure for initialization at the beginning of servo-control.

The process and/or computation of servo-controlling device applied to the control of travelling truck, i.e., for, e.g., acceleration on flat surface, constant speed travel, deceleration and stop, are described below. In order to simplify the explanation, e.g., 37 processing terms are assumed to be spent for the whole operation of travelling truck from start to stop as shown in FIG. 11. This example shows the operation that terms $\Omega_3$ to $\Omega_{12}$ after initialization are allotted for the acceleration of travelling truck from starting point subjected to torque control, processing terms $\Omega_{13}$ to $\Omega_{32}$ for the travel subjected to velocity control and term $\Omega_{33}$ to $\Omega_{37}$ for deceleration and stop subjected to position control. For the sake of deepening your understanding of the control of travelling truck the control target value for velocity control is also changed on a processing term $Q_{23}$. PWM commanding values $Pr_{-SM}$ shown by solid lines correspond to the numerals on the section of $Pr_{-SM}$ in FIG. 12. The timing charts of FIGS. 13, 14, 15 and 16 correspond to FIG. 11. The infinitesimal intervals $\Phi_{14}$ to $\Phi_n$ shown in FIG. 13 are omitted in FIGS. 14, 15 and 16.

Figure 17:
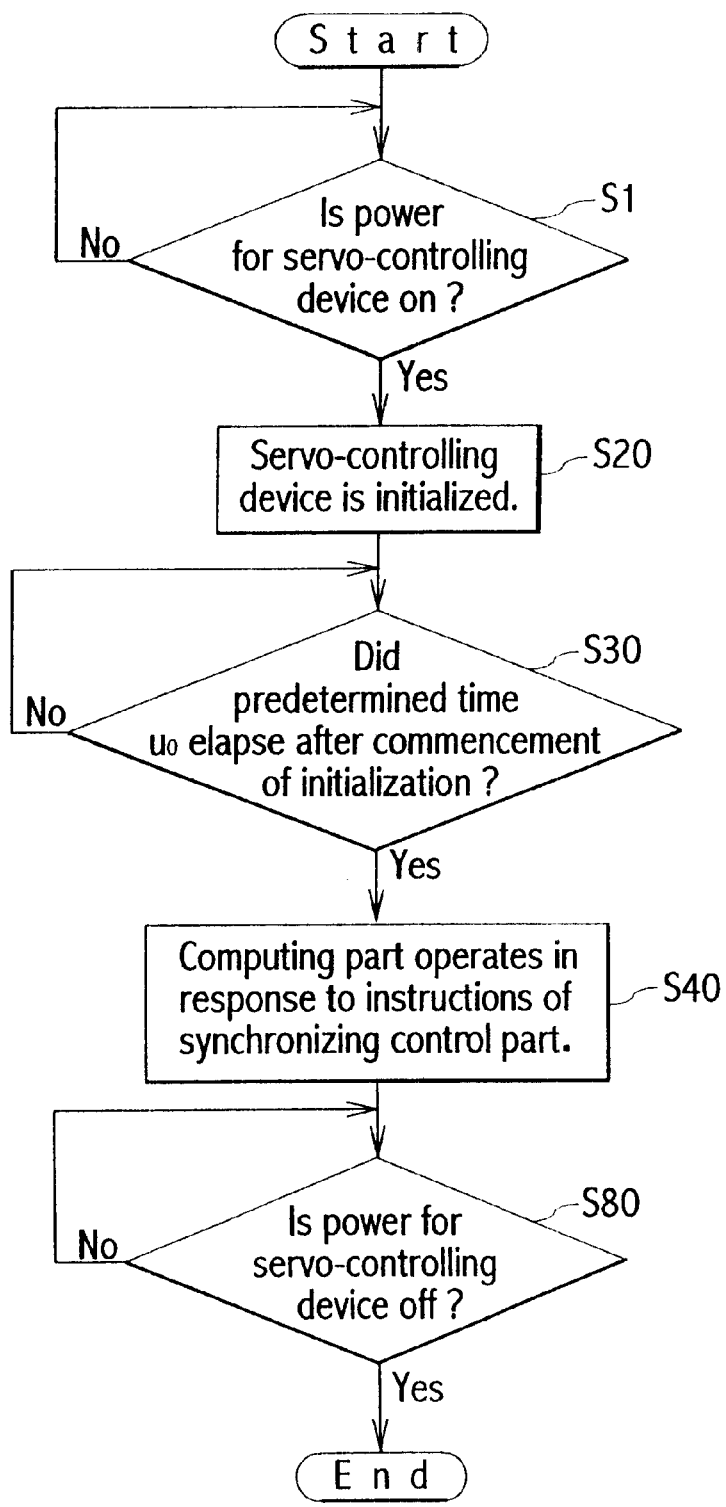
FIG. 17 is a flow chart showing the basic procedure of servo-controlling device under the operation from start to stop.

Referring to flow charts, too, the whole operation is as follows; FIG. 17 shows a schematic flow chart of control. Electric power is supplied to the micro processor unit, MPU, consisting of PWM control means 4 for servo-controlling DC motor 2 and information input/output part 5 through DC/DC converter 65 from power line 62 as soon as DC power source 63 is switched on by superior controller 7 shown in FIG. 3 (see step 1 in the flow chart, hereinafter referred to as S1). The initializing part 411 initializes both PWM control means 4 and information input/output part 5 (S20) in response to the power-on-reset due to voltage build-up of MPU as shown in the left upper part of FIG. 13. After spending time $u_0$ for initialization (S30), computing part 4B begins to operate in response to the command of process commanding part 4A of PWM control means 4 (S40). The synchronizing control part 41 of process commanding part 4A sends forth synchronizing triggers so as to repeat carrying out the predetermined process and/or computation till the electric power stops in response to the instructions of superior controller 7 (S80).

Figure 18:
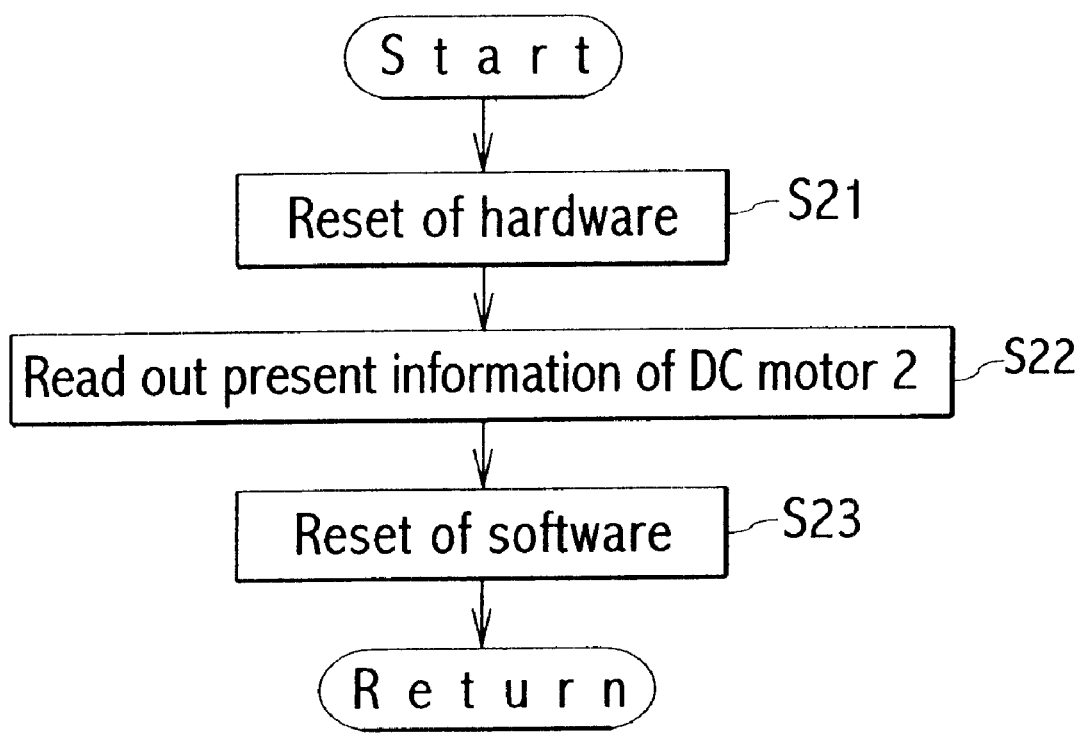
FIG. 18 is a flow chart showing the whole procedure for initialization of servo-controlling device.
Figure 19:
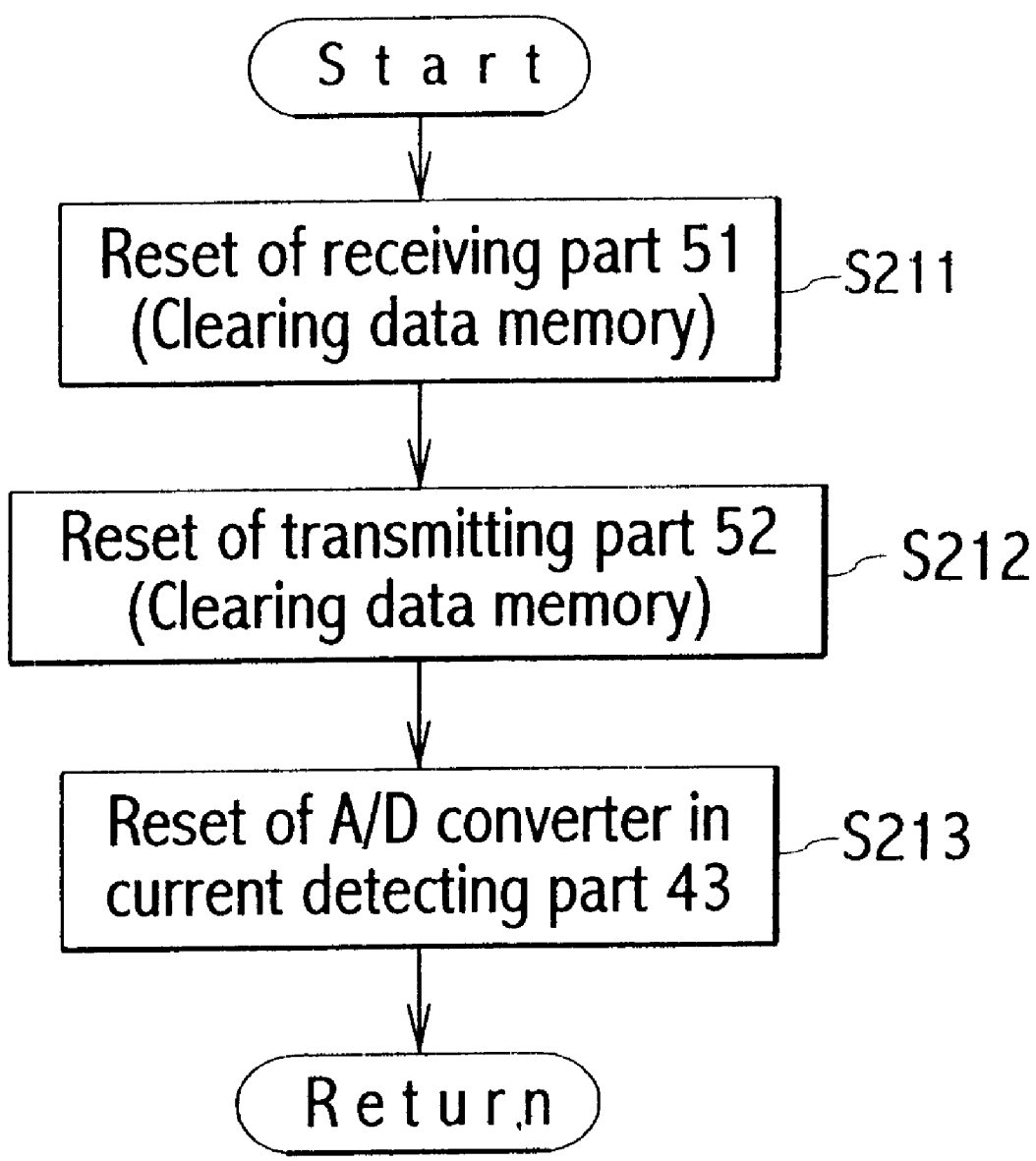
FIG. 19 is a flow chart showing the initialization of hardware.

FIG. 18 is a flow chart for initializing servo-controlling device 85. The initializing part 411 commands to reset the hardware of servo-controlling device 85 (S21). Such process, as shown in FIG. 19, is to clear the memory stored in receiving part 51 (S211) and to delete the data stored in transmitting part 52 (S212). Finally, A/D converter in current detecting part 43 is also reset (S213).

Figure 5:
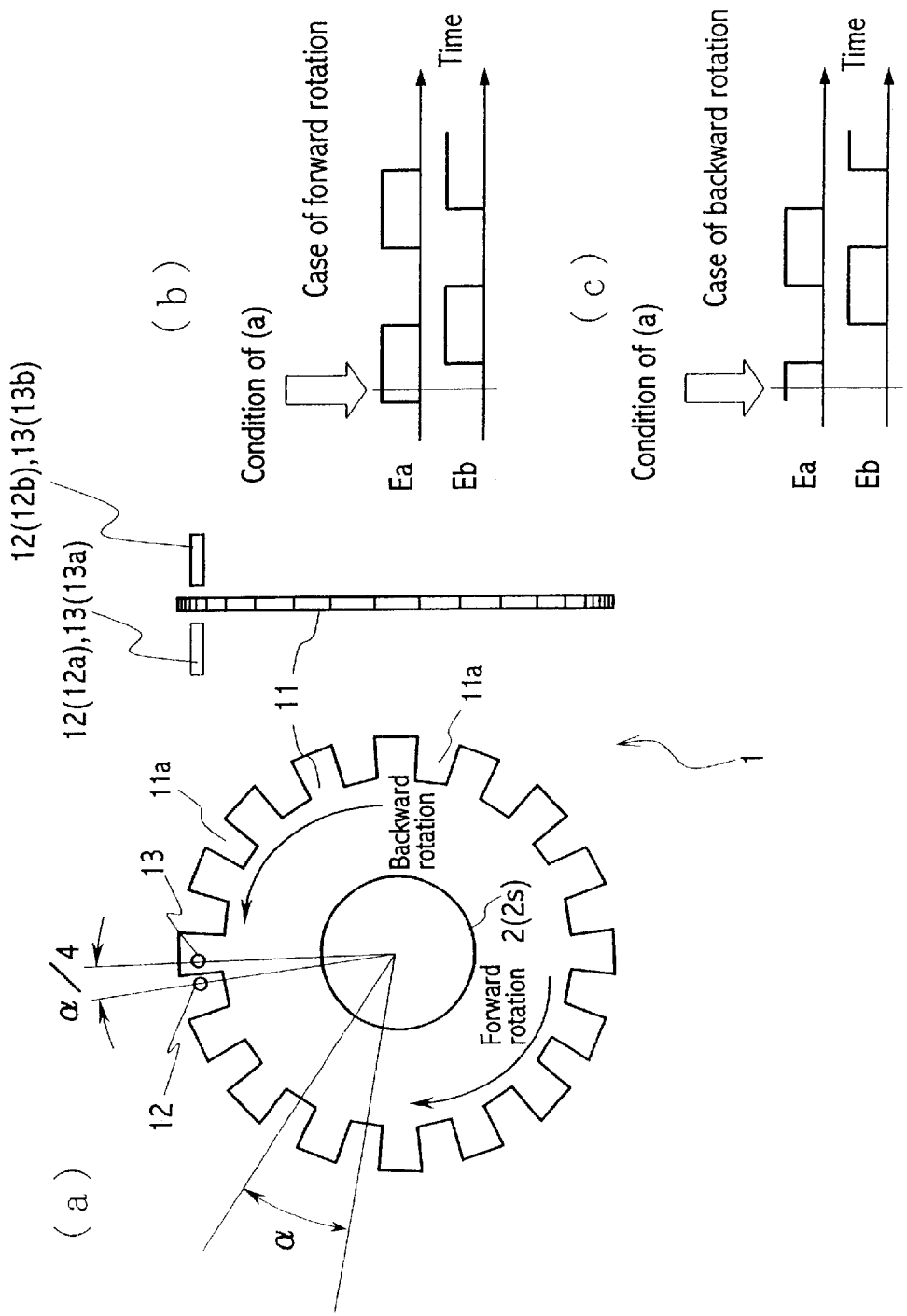
FIG. 5 shows an example of encoder as a position detector and a diagram for pulses detected thereby.
Figure 20:
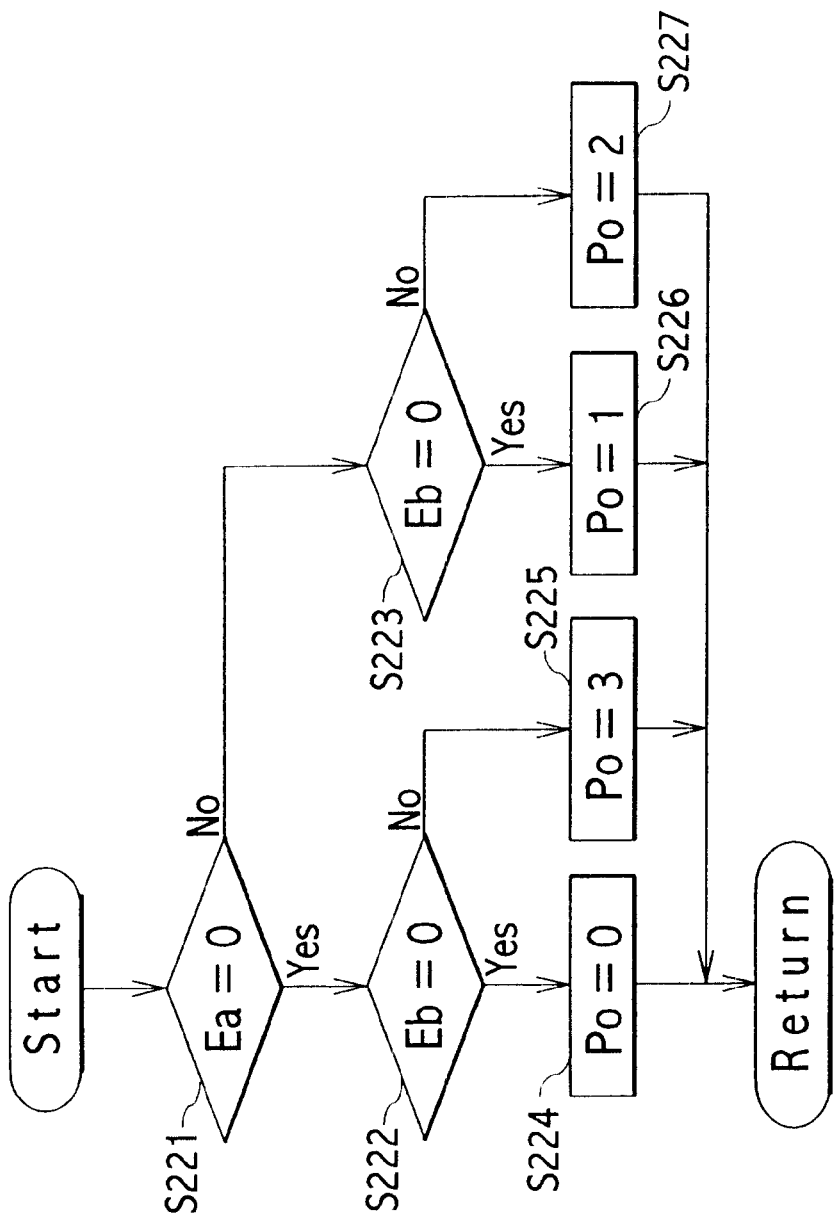
FIG. 20 is a flow chart showing the procedure for detecting the initial position of motor output shaft.

Referring to FIG. 18 the present condition of DC motor 2, being an object to be controlled, is picked up after the reset of hardware (S22), which is for memorizing the initial positional relation between sensors 12 and 13 and slits 11a of rotary disk 11 of encoder 1 shown in FIG. 5. Such an initial positional relation is detected through the process shown in FIG. 20, which is the same procedure as the behavior of the first half of FIG. 23 explaining the process of positional signal detector 42. The positional relation in FIG. 5(a) gives $P_01$ (S226) via steps 221 to 223 since Ea=1 and Eb=0. $P_0=1$ used in the computation of step 4408 in FIG. 23 described later is memorized in data memory for detecting position 42b (refer to FIG. 4(d)).

Figure 21:
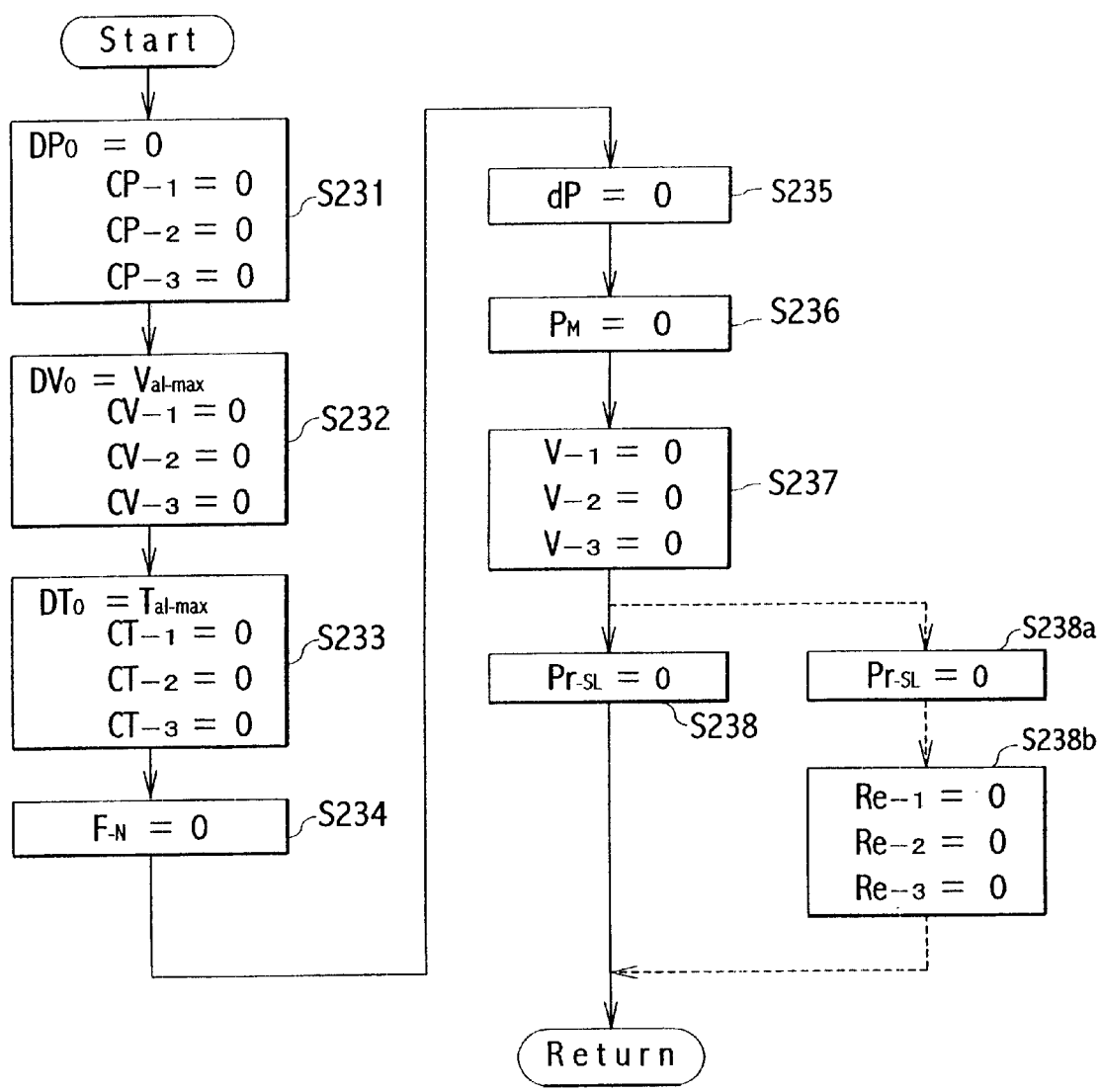
FIG. 21 is a flow chart showing the procedure for initialization of memorized values used in the computation.
Figure 24:
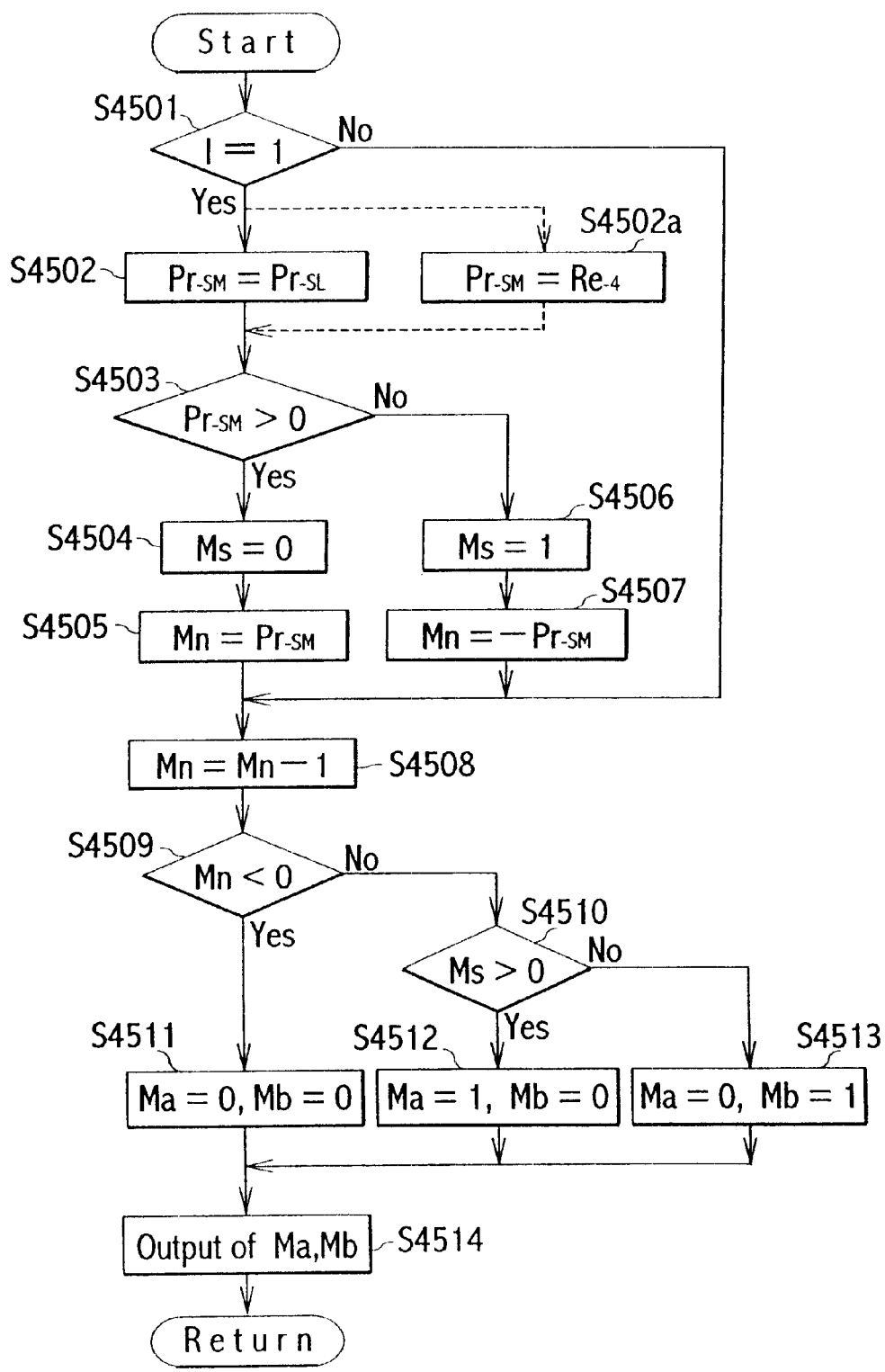
FIG. 24 is a flow chart showing the process of PWM commanding part.
Figure 29:
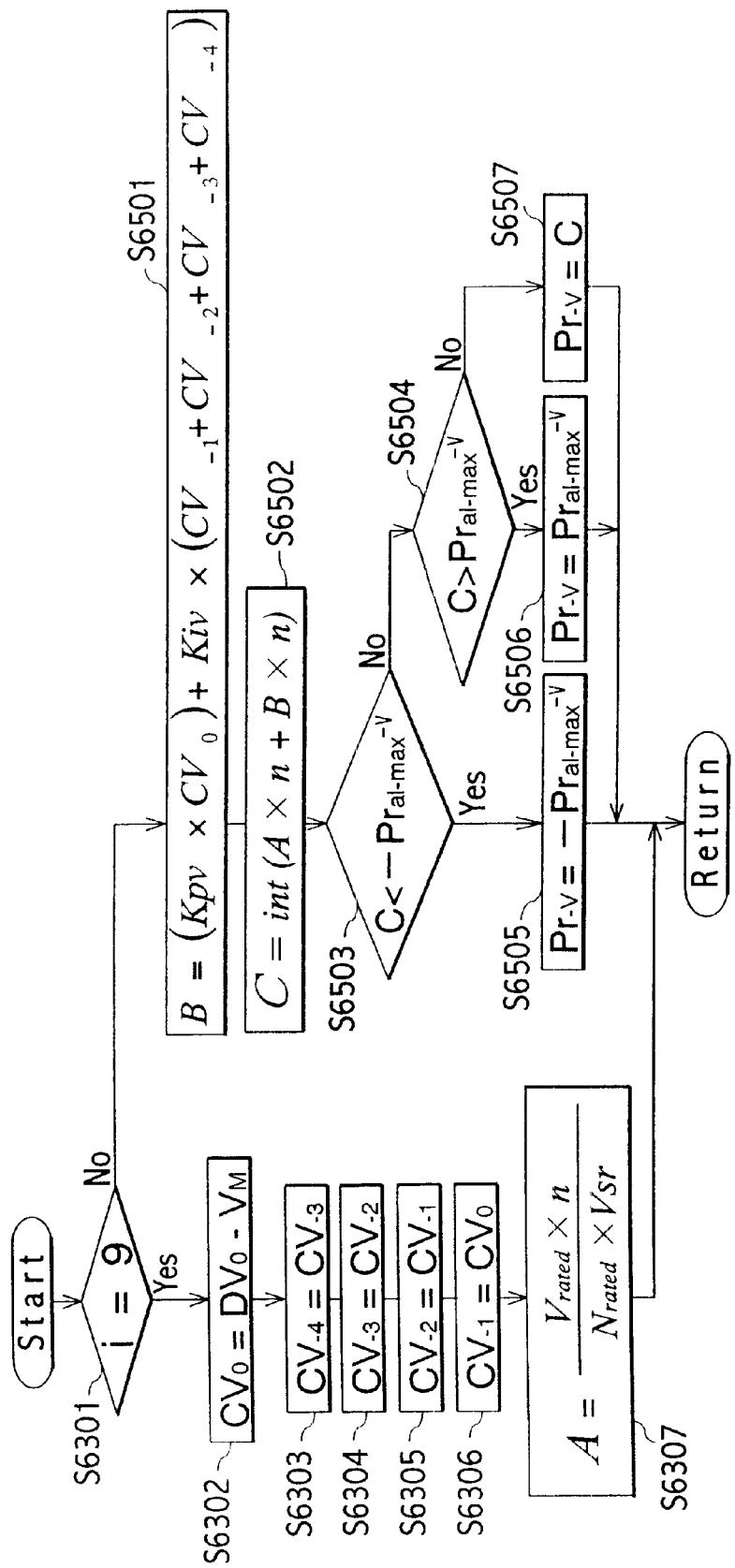
FIG. 29 is a flow chart showing the computation procedure of computing part of PWM target value for velocity.

Referring to FIG. 18 the reset of software of servo-controlling device 85 is commanded (S23) after reading out the present condition of DC motor 2. In FIG. 21 target value for controlling position $DP_0$ stored in storing part of target value for position 441a (see FIG. 4(d)) is set to 0, and the data of $CP_{-1}$, $CP_{-2}$ and $CP_{-3}$ used in the computation of computing part for controlling position 441 in FIG. 28 are also set to 0. The target value and the data are stored in data memory for computing position 441b (S231). The target value for controlling velocity $DV_0$ stored in storing part of target value for velocity 442a is set to maximum allowable velocity $V_{a1-max}$, e.g., 165 rps, and the data of $CV_{-1}$, $CV_{-2}$ and $CV_{-3}$ used in the computation of computing part for controlling velocity 442 in FIG. 29 are also set to 0. The target value and the data are stored in data memory for computing velocity 442b (S232). The target value for controlling torque $DT_0$ stored in storing part of target value for torque 443a is also set to maximum allowable torque $T_{a1-max}$, e.g., 2 kgf-cm (≈0.2 N·m), and the data of $CT_{-1}$, $CT_{-2}$ and $CT_{-3}$ used in the computation of computing part for controlling torque 443 in FIG. 30 are also set to 0. The target value and the data are stored in data memory for computing torque 443b (S233). Finally, $F_{-N}$ used for selection of target value in FIG. 31 are also set to 0, which is stored in storing part of designated control mode 451a (S234). According to the above setting and storing any control for position, velocity and torque is not carried out.

dP used for the computation at steps 4412 and 4413 in FIG. 23 is set to 0 (S235), and is stored in data memory for detecting position 42b. $P_M$ used for calculating position in FIG. 26 is also set to 0 and is stored in data memory for calculating position 421b (S236). Further, data of $V_{-1}$, $V_{-2}$ and $V_{-3}$ used for calculating velocity in FIG. 27(a) are also set to 0 and are stored in data memory for calculating velocity 422b (S237). PWM selection value $Pr_{-SL}$ used for the computation according to FIG. 24 is set to 0 and is stored in data memory for commanding PWM 46b (S238). In the case that calculating part of PWM gradual values 452, not being almost explained yet, is provided, PWM selection value $Pr_{-SL}$ and data of $Re_{-1}$, $Re_{-2}$ and $Re_{-3}$ used for the computation according to FIG. 44(a) are set to 0 and are stored in data memory for calculating gradual values 452b (S238a and S238b).

The process of initialization described above is shown in a timing chart of FIG. 13. A timer starts as soon as initializing part 411 begins to operate. The time set in the timer is allotted 500 µS enough for the completion of the initialization from step 21 to step 23 in FIG. 18. Referring to FIG. 17, after the predetermined lapse of $u_0$ (S30) the synchronizing control part 41 commands the computing part 4B to repeat the predetermined process and/or computation (S40).

DC motor 2 is servo-controlled according to the repetition of process and/or computation described below in response to the command of synchronizing control part 41. In FIG. 22 the counter i is replaced with 0 (S41). Such a counter i is added 1 to itself in turn till it becomes n (S42). The synchronizing control part 41 outputs synchronizing triggers every T/n=400/32=12.5 µS (S43) if n is 32 as mentioned above. According to such synchronizing triggers the predetermined process and/or computation are carried out.

The first synchronizing trigger makes positional signal detector 42 carry out the process according to FIG. 23 (S44). DC motor 2 does not rotate yet and remains at the condition of FIG. 5(a), i.e., Ea is on and Eb is off similarly to the process toward the step 226 of initialization in FIG. 20 for obtaining $P_0=1$. This is shown by an arrow $A_1$ (see left upper part of FIG. 8) at i=1 (infinitesimal interval $\Phi_1$) of processing term $\Omega_1$ ($=Q_{j-1}$) Pi is replaced with 1 (S4406) via steps 4401 to 4403 in FIG. 23. At the step 448 the difference $P_{i^{-0}}$ (see step 226 in FIG. 20) is calculated by using Pi just detected. After obtaining $P_{i^{-0}}=1-1=0$ at step 4409 the process of positional signal detector 42 is terminated. Therefore, the position of motor output shaft is regarded as invariable, accordingly, variate dP showing the increment or decrement of position is kept 0 since the step 235 (see FIG. 21) for the initialization.

At the step 45 in FIG. 22 just after the termination of the process of positional signal detector 42 the process of PWM commanding part 46 is carried out according to FIG. 24 in response to the command of synchronizing control part 41. $Pr_{-SM}$ is replaced with 0 (S4502) according to $Pr_{-SL}$ which was set to 0 at the initialization since it is now i=1 (S4501). Ms=1 at step 4506, Mn=0 at step 4507 and Mn=−1 at step 4508 are given via the step 4503 that $Pr_{-SM}$ is not larger than 0, and the value of Mn is memorized. Ma=0 and Mb=0 are chosen (S4511) via step 4509, which are output to electric power supplier 3 as PWM signals (S4514). Inputting Ma=0 and Mb=0 to electric power supplier 3 shown in FIG. 6 keeps the transistors of $Tr_1$, $Tr_2$, $Tr_3$ and $Tr_4$ off, in result, DC motor will not rotate. If the step 4514 has finished, synchronizing control part 41 commands the next process as shown in FIG. 22. Since i=1 is still kept (S46), the process of receiving part 51 is commenced (S47), however, the receiving part 51 keeps the condition itself reset at step 211 of FIG. 19 because of just after the initialization. No control target values and no control mode to be accepted makes the control return, leaving the temporal values given at the initialization in each storing part. After adding 1 to the counter (i=2) at step 42 in FIG. 22 the control waits for the next synchronizing trigger.

The appearance of the next synchronizing trigger after 12 $\mu S$ (S43) teaches the commencement of infinitesimal interval $\Phi_2$, and positional signal detector 42 operates according to FIG. 23 again (S44). Since the motor does not rotate, the process after step 4401 is same as the process during i=1. PWM commanding part 46 operates according to FIG. 24 (S45) shortly after the preceding step. Since it is now i=2, step 4501 teaches to directly jump into step 4508, thereby, Mn has −2 after subtracting 1 from −1 already memorized there. Ma=0 and Mb=0 are chosen (S4511) via step 4509, which are output to electric power supplier 3 as PWM signals (S4514). Inputting Ma=0 and Mb=0 to electric power supplier 3 shown in FIG. 6 means no supply of electric power to DC motor 2. Even if i is changed to 3, 4, . . . , 32, Mn increases negative value only, accordingly, DC motor 2 will not begin to rotate. The process of transmitting part 52 is commenced (S49) since it is now i=2 (see step 48 in FIG. 22). The transmitting part 52 keeps the condition reset at step 212 of FIG. 19 because of just after the initialization, so that any present information concerning position, velocity and current can not be set forth and the control returns. After adding 1 to the counter (i=3) at step 42 in FIG. 22 the control waits for the next synchronizing trigger.

Figure 25:
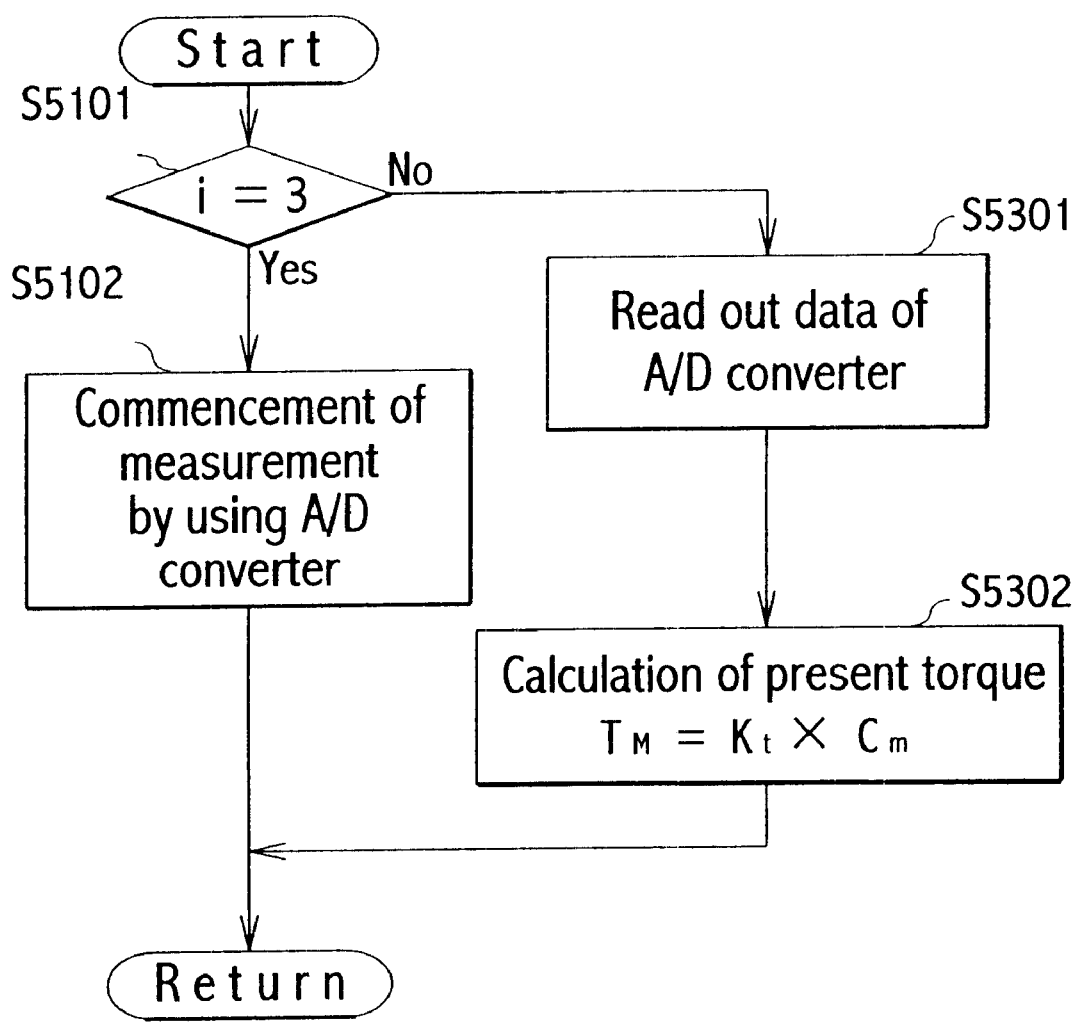
FIG. 25 is a flow chart showing the process of current detecting part.

The positional signal detector 42 operates according to FIG. 23 (S44) just after entering infinitesimal interval $\Phi_3$. Since the motor does not rotate, the process after step 4401 is same as the process during i=1. PWM commanding part 46 operates according to FIG. 24 (S45) shortly after the preceding step. Since i is not 1, the process after step 4501 is same as the process during i=2. Since it is now i=3 (S50), the process of the first half of current detecting part 43 is commenced (S51). Various values required for measurement at step 5102 in FIG. 25 are given to A/D converter, the control charged with measurable condition returns.

The positional signal detector 42 repeats the same as it operated during i=1 just after entering infinitesimal interval $\Phi_4$. Since it is now i=4 (S52), the process of the second half of current detecting part 43, i.e., steps 5301 and 5302 in FIG. 25, is commenced via step 5101. Since the motor, however, does not rotate, current Cm detected is 0, resulting in the present torque $T_M$ being equal to 0, and the control returns. The positional signal detector 42 repeats the same as it operated during i=1 and the PWM commanding part 46 repeats the same as it operated during i=2 just after entering infinitesimal interval $\Phi_5$. Since it is now i=5 (S54), the process of position calculating part 421 is commenced (S55). This is processed according to FIG. 26($a$). Since the present position $P_M$ of motor output shaft and variate dP are assigned to 0 at steps 236 and 235 in FIG. 21, $P_M$ comes to 0 at step 5501. And rotational velocity V is also replaced with 0 at step 5502. After ascertaining non-rotation of motor in this manner the control returns.

The positional signal detector 42 repeats the same as it operated during i=1 and the FWM commanding part 46 repeats the same as it operated during i=2 just after entering infinitesimal interval $\Phi_6$. Since it is now i=6 (S56), the process of velocity calculating part 422 is commenced (S57). This is processed according to FIG. 27($a$) Since the data of $V_{-1}$, $V_{-2}$ and $V_{-3}$ are already set to 0 at step 237 in FIG. 27 and V is also set to 0 at step 5502 in FIG. 26, all of $V_{-4}$, $V_{-3}$, $V_{-2}$ and $V_{-1}$ result in 0 at steps 5701 to 5704 in FIG. 27($a$). Accordingly, A=$\Sigma V_{-i}$ comes to 0 (S5705) and the rotational velocity $V_M$ of motor is kept 0 (S5706). After ascertaining non-rotation of motor in this manner the control returns.

The positional signal detector 42 repeats the same as it operated during i=1 and the PWM commanding part 46 repeats the same as it operated during i=2 just after entering infinitesimal interval $\Phi_7$. Since it is now i=7 (S58), the process of the first half of computing part for controlling position 441 is commenced (S59). This is processed according to FIG. 28. Since it is now i=7 (S5901), the process of steps 5902 to 5907 in FIG. 28 is commenced. Since $DP_0$ was given to 0 at step 231 in FIG. 21 and $P_M$ was calculated to 0 at step 5501 in FIG. 26($a$), $CP_0$=0 is given at step 5902 in FIG. 28. Since the data of $CP_{-1}$, $CP_{-2}$ and $CP_{-3}$ are already set to 0 at step 231 in FIG. 21, all of $CP_{-4}$, $CP_{-3}$, $CP_{-2}$ and $CP_{-1}$ result in 0 at steps 5903 to 5906 in FIG. 28. Accordingly, A=0 is given at step 5907.

The positional signal detector 42 repeats the same as it operated during i=1 and the PWM commanding part 46 repeats the same as it operated during i=2 just after entering infinitesimal interval $\Phi_8$ via the return of control. Since it is now i=8 (S60), the process of the second half of computing part for controlling position 441 is commenced (S61). B=0 is given at step 6001 in FIG. 28 and C calculated through PI computing results in 0 at step 6002. Therefore, PWM target values $Pr_{-P}$ comes to 0 (S6007) via steps 6003 and 6004.

The positional signal detector 42 repeats the same as it operated during i=1 and the PWM commanding part 46 repeats the same as it operated during i=2 just after entering infinitesimal interval $\Phi_9$. Since it is now i=9 (S62), the process of the first half of computing part for controlling velocity 442 is commenced (S63). This is processed according to FIG. 29. Since it is now i=9 (S6301), the process of steps 6302 to 6307 in FIG. 29 is commenced. Since $DV_0$ was given to $V_{a1-max}$ at step 232 in FIG. 21 and $V_M$=0 was given at step 5706 in FIG. 27($a$), $CV_0$=$V_{a1-max}$ is given at step 6302 in FIG. 29. Since the data of $CV_{-1}$, $CV_{-2}$ and $CV_{-3}$ are already set to 0 at step 232 in FIG. 21, $CV_{-4}$, $CV_{-3}$ and $CV_{-2}$ result in 0 and $CV_{-1}$=$V_{a1-max}$ is given at steps 6303 to 6306 in FIG. 29. Accordingly, A results in any value except 0 at step 6307.

The positional signal detector 42 repeats the same as it operated during i=1 and the PWM commanding part 46 repeats the same as it operated during i=2 just after entering infinitesimal interval $\Phi_{10}$. Since it is now i=10 (S64), the process of the second half of computing part for controlling velocity 442 is commenced (S65). B is given by any value except 0 at the computation of step 6501 in FIG. 29. C computed through PI computing at step 6502 is given by any $Pr_{-V}$ corresponding to step of 6505, 6506 or 6507.

The positional signal detector 42 repeats the same as it operated during i=1 and the PWM commanding part 46 repeats the same as it operated during i=2 just after entering infinitesimal interval $\Phi_{11}$. Since it is now i=11 (S66), the process of computing part for controlling torque 443 is commenced (S67). This is processed according to steps 6701 to 6713 of FIG. 30. $CT_0$=$T_{a1-max}$ is given at step 6701 in FIG. 30 since $DT_0$ was given by $T_{a1-max}$ at step 233 in FIG. 21 and $T_M$=0 was given at step 5302 in FIG. 25. Since the data of $CT_{-1}$, $CT_{-2}$ and $CT_{-3}$ are already set to 0 at step 233 in FIG. 21, $CT_{-4}$, $CV_{-3}$ and $CV_{-2}$ result in 0 and $CT_{-1}=T_{a1-max}$ is given at steps 6702 to 6705 in FIG. 30. Accordingly, A results in any value except 0 at step 6706. B is also given by any value except 0 at step 6707, and C computed through PI computing at step 6708 is given by any $Pr_{-T}$ corresponding to step of 6711, 6712 or 6713.

The positional signal detector 42 repeats the same as it operated during i=1 and the PWM commanding part 46 repeats the same as it operated during i=2 just after entering infinitesimal interval $\Phi_{12}$. Since it is now i=12 (S68), the process of selecting part of PWM target value 45 is commenced (S69). This is processed according to steps 6901 to 6907 of FIG. 31. Since $F_{-N}$ is already set to 0 at step 234 in FIG. 21, $Pr_{-SL}=0$ is selected (S6907) via steps 6901, 6902 and 6903 in FIG. 31. On the other hand, $Pr_{-SL}=0$ is already used for the purpose of giving $Pr_{-SM}=0$ at step 4502 in FIG. 24 prior to the process of FIG. 31. Since $Pr_{-SM}=0$ is not given through computation unless the step 6907 is performed, $Pr_{-SM}=0$ is previously set at step 238 in FIG. 21 to process the step 4502 in FIG. 24.

The positional signal detector 42 repeats the same as it operated during i=1 and the PWM commanding part 46 repeats the same as it operated during i=2 just after entering infinitesimal interval $\Phi_{13}$. Since it is now i=13 (S70), the process of calculating part of PWM gradual values 452 is commenced (S71). However, the explanation of step 71 is omitted since the example explained above does not include the process of calculating part of FWM gradual values 452.

The positional signal detector 42 repeats the same as it operated during i=1 and the PWM commanding part 46 repeats the same as it operated during i=2 just after entering infinitesimal interval $\Phi_{14}$. Since it is now i=14 (S72), the control returns as soon as i≠n (n=32) is found at step 72. The process in an interval $\Phi_{15}$ is also the same as that at i=14.

The process and/or computation on processing term $\Omega_1$ terminates via step 72 and step 73 replacing i with 0 (S73) after the last process of positional signal detector 42 and PWM commanding part 46 of term $\Omega_{32}$ is carried out. Returning to step 42, a series of process and/or computation of next term $\Omega_2$ are repeated as soon as the counter is replaced with 1 and synchronizing trigger appears.

The process and/or computation for controlling DC motor 2 in operation is quite similar to that required till $Pr_{-SL}$ (=$Pr_{-SM}$)=0 is obtained. Such process and/or computation is explained as follows referring to FIG. 13. The initialization in FIG. 21 is carried out before the commencement of processing term $\Omega_1$. As shown in the section of initializing part 411 (see FIG. 13), the initialization starts as soon as MPU rises up, and the process and/or computation of term $\Omega_1$ is commenced in response to the instructions of synchronizing control part 41 after the predetermined time $u_0$ lapses. The process and/or computation of processing term $\Omega_1$ was actually performed during black boxes only in FIG. 13 according to the sequence of FIG. 22. PWM signals Ma and Mb output from PWM commanding part 46 to electric power supplier 3 are off in all of infinitesimal intervals $\Phi_1$, $\Phi_2$, $\Phi_3$, ..., $\Phi_{31}$, $\Phi_{32}$ of term $\Omega_1$. Since $Pr_{-SL}$ selected at selecting part of PWM target value 45 during processing term $\Omega_1$ is also 0, PWM signals Ma and Mb output to electric power supplier 3 in the intervals $\Phi_1$, $\Phi_2$, $\Phi_3$, ... $\Phi_{31}$, $\Phi_{32}$ of term $\Omega_2$ results in off as shown by an arrow of $Y_{12}$. Accordingly, the motor is also kept immovable during term $\Omega_2$.

Figure 14:
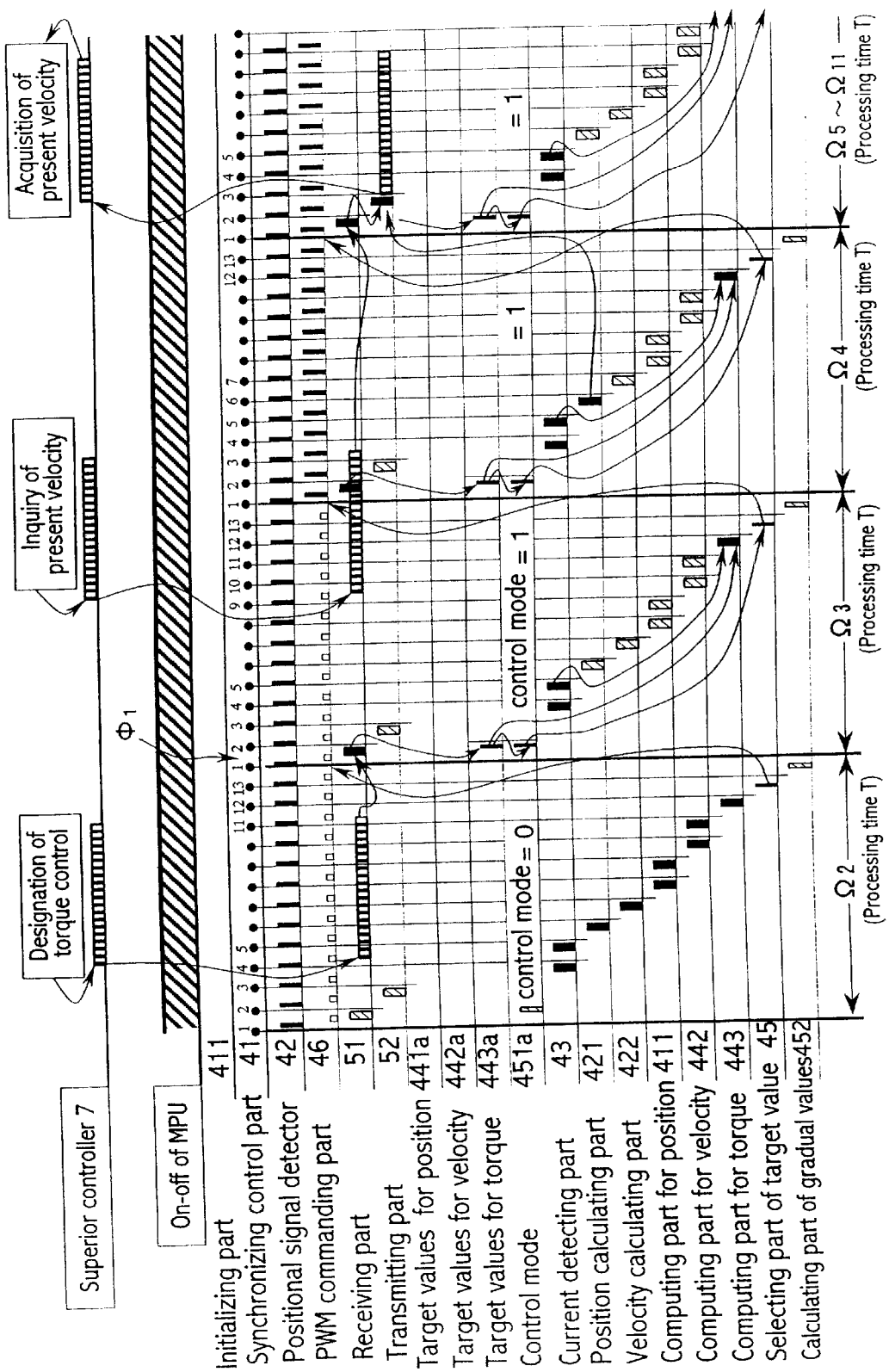
FIG. 14 is a timing chart continued from FIG. 13, showing torque control operated in response to synchronizing triggers after initialization.

As shown in processing term $\Omega_2$ of FIG. 14 the control input information concerning torque control sent forth from transmitting part 72 of superior controller 7 (see FIG. 3) is stored in the buffer inside the receiving part 51 of information input/output part 5 by spending, e.g., infinitesimal intervals $\Phi_4$ to $\Phi_{11}$. However, since the receiving part 51 in processing term $\Omega_2$ starts (i=1) prior to the commencement of storing control input information, no process is done at the receiving part 51. All of process and/or computation during term $\Omega_2$ are the same as those during term $Q\Omega_1$, resulting in the computation of PWM commanding value $Pr_{-SM}=0$ only. The process and/or computation of processing term $\Omega_3$ starts as soon as the counter is replaced with 1 after the termination of the process and/or computation of term $\Omega_2$. The synchronizing control part 41 commands to carry out the process and/or computation of positional signal detector 42 and PWM commanding part 46 every infinitesimal interval similarly to the case of processing term $\Omega_2$, however, the former detects non-rotation of motor again and the latter still outputs PWM signals Ma and Mb of off.

In the infinitesimal interval $\Phi_1$ the control input information stored in the buffer inside receiving part 51 is read out after the process and/or computation of positional signal detector 42 and PWM commanding part 46, thereafter, the receiving part 51 is reset. After the signals read out are decoded the control mode $F_{-N}=1$ is stored in storing part of designated control mode 451a shown in FIG. 4(a) and target value for controlling torque $DT_0$ is stored in storing part of the target value for torque 443a shown in FIG. 4(b), they are exchanged for their temporal values, respectively. But since no target values for controlling position and velocity are supplied, their temporal values given at the initialization are kept in the storing part of target value for position 441a and storing part of the target value for velocity 442a. Though the transmitting part 52 starts on the processing term $\Omega_2$, the control results in return because no inquiry of present information is required by superior controller 7 during i=2.

Figure 32:
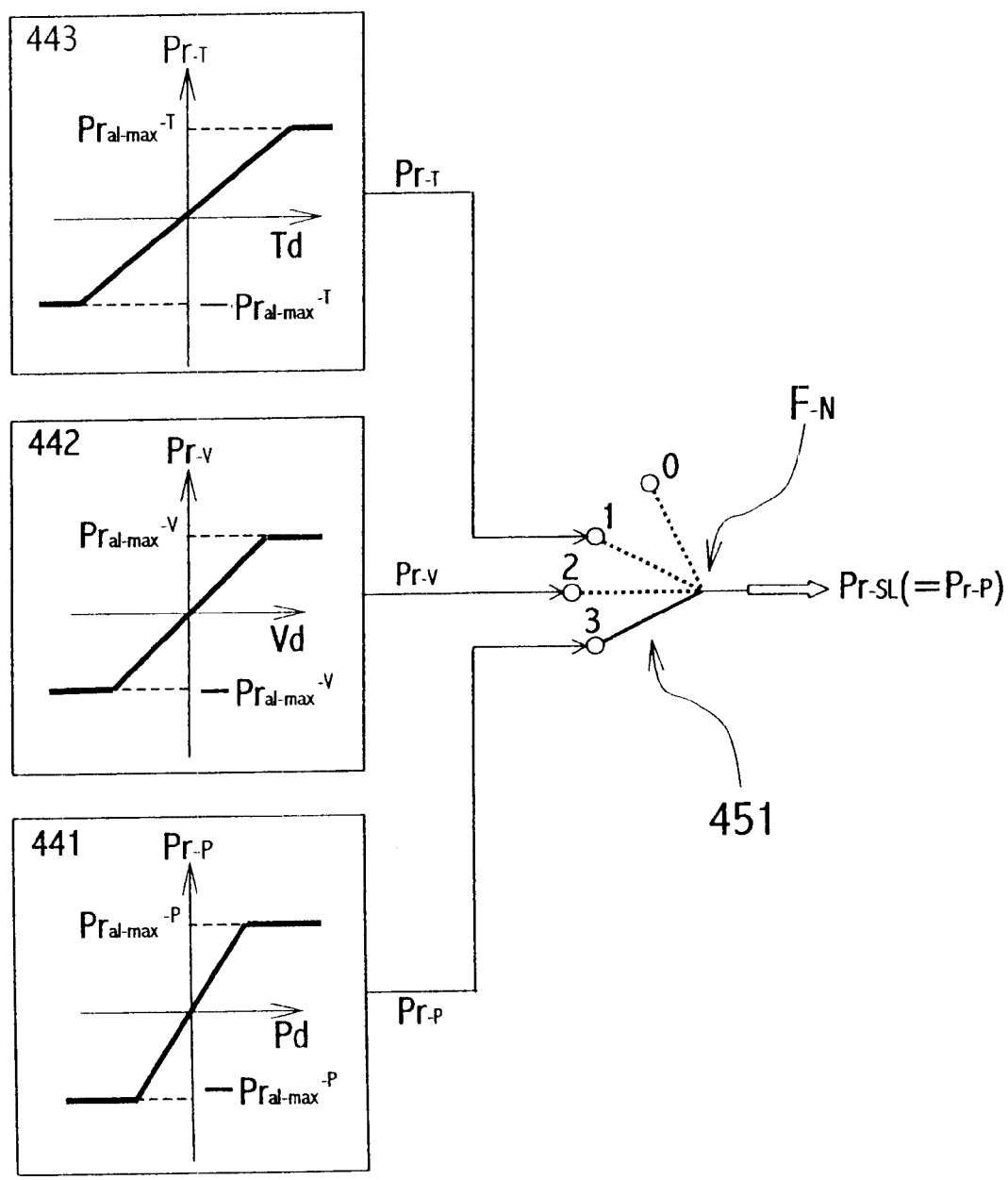
FIG. 32 is a block diagram visually teaching the operation for selection procedure of selecting part of target value for designated mode.

The motor current Cm measures 0 due to non-rotation of motor even if advancing to the infinitesimal intervals $\Phi_3$ and $\Phi_4$. In the intervals $\Phi_5$ to $\Phi_{10}$ the process and/or computation described above is repeated, resulting in the computation of $Pr_{-SL}=0$. $CT_0=DT_0$ is given at step 6701 of FIG. 30 when entering to the infinitesimal interval $\Phi_{11}$. At steps 6701 to 6705 $CT_{-4}=0$, $CT_{-3}=T_{a1-max}$, $CT_{-2}=T_{a1-max}$ and $CT_{-1}=DT_0$ are given because $CT_{-1}=T_{a1-max}$ is already given during processing term $\Omega_1$, $CT_{-2}=T_{a1-max}$ during $\Omega_2$ and $CT_{-3}$ memorized at the initialization is still 0. At steps 6706, 6707 and 6708A, B and C result in any value except 0. C is chosen after step 6709, therefore, PWM target values $Pr_{-T}$ for torque corresponding to C, i.e., values on thick lines in the upper box of FIG. 32, are output (S6711, 6712 and 6713). In the infinitesimal interval $\Phi_{12}$ PWM selection value $Pr_{-SL}$ selected through steps 6901 to 6907 of FIG. 31 is assigned to PWM target values $Pr_{-T}$ corresponding to control mode $F_{-N}=1$ (S6906).

Such a PWM selection value $Pr_{-SL}$ is treated as a PWM commanding value $Pr_{-SM}$ to be straight input in PWM commanding part 46. The arrow $B_3$ on processing term $\Omega_3$ of FIGS. 11 and 12 teaches that $Pr_{-SM}$ is 25 (duty ratio 25/32). FIG. 9 shows examples of duty ratio of 6/32 and 3/32. The signal Ma of on is output in the first 25 infinitesimal intervals $\Phi_1$, $\Phi_2$, ..., $\Phi_{25}$ and signal of off is output in the intervals $\Phi_{26}$, ..., $\Phi_{32}$ similarly to FIG. 9 if PWM commanding value $Pr_{-SM}$ is 25. Needless to say, the effective current specified by such 25 in pulse width flows through DC motor 2. PWM signals Ma and Mb output to electric power supplier 3 in an infinitesimal interval $\Phi_i$ are held till PWM signals Ma and Mb for the next interval $\Phi_{i+1}$ are output to electric power supplier 3 though it is not shown in FIG. 24.

Supplying electric power makes a motor accelerate by overcoming the load acted on mobile. Actual torque $T_M$ is measured in an individual infinitesimal interval $\Phi_4$ while the processing term advances to $\Omega_5, \Omega_6, \Omega_7, \ldots$, which is fed back as shown in FIG. 1 and at step 6701 of FIG. 30. In this manner the motor is controlled so as to realize the target value for controlling torque $DT_0$ instructed by superior controller 7. Also in the infinitesimal intervals $\Phi_1$ to $\Phi_{12}$ of term $\Omega_4, \Omega_5, \Omega_6, \ldots$, on which a motor is driven by such PWM signal Ma, the computation of position and velocity based on the initialized values is carried out similarly to the case of term $\Omega_3$.

During the maintenance of torque control the motor gets the rotational speed balancing with the torque based on torque control, but unfortunately, the motor speed balancing with the torque tends to be unstable. The superior controller 7 has the function for inquiring the present velocity of motor so that the torque control can be changed into velocity control after the motor has the desired speed due to torque control. Needless to say, velocity calculating part 422 always catches the present velocity of motor according to the procedure of FIG. 27(a) (S5706) since positional signal detector 42 operates during the whole of infinitesimal intervals $\Phi$ of each processing term $\Omega$. Referring to FIG. 14, the receiving part 51 happen to be inquired for the present velocity of motor from the interval $\Phi_9$ of term $\Phi_3$ to the interval $\Phi_3$ of term $\Omega_4$. Since such an inquiry can be called in the interval $\Phi_1$ of term $\Omega_5$, the velocity calculated in the interval $\Phi_6$ of term $\Omega_4$ results in being sent forth as soon as the transmitting part 52 starts in the interval $\Phi_2$ of term $\Omega_5$. In this manner, the superior controller 7 may obtain the velocity of motor through receiving part 71 on real time. Incidentally, even if the receiving part 51 operates in the interval $\Phi_1$ of term $\Omega_4$, it can not catch the inquiry information because the storage of the information has not finished yet, resulting in assigning the receipt of the inquiry information to the term $\Omega_5$.

Figure 15:
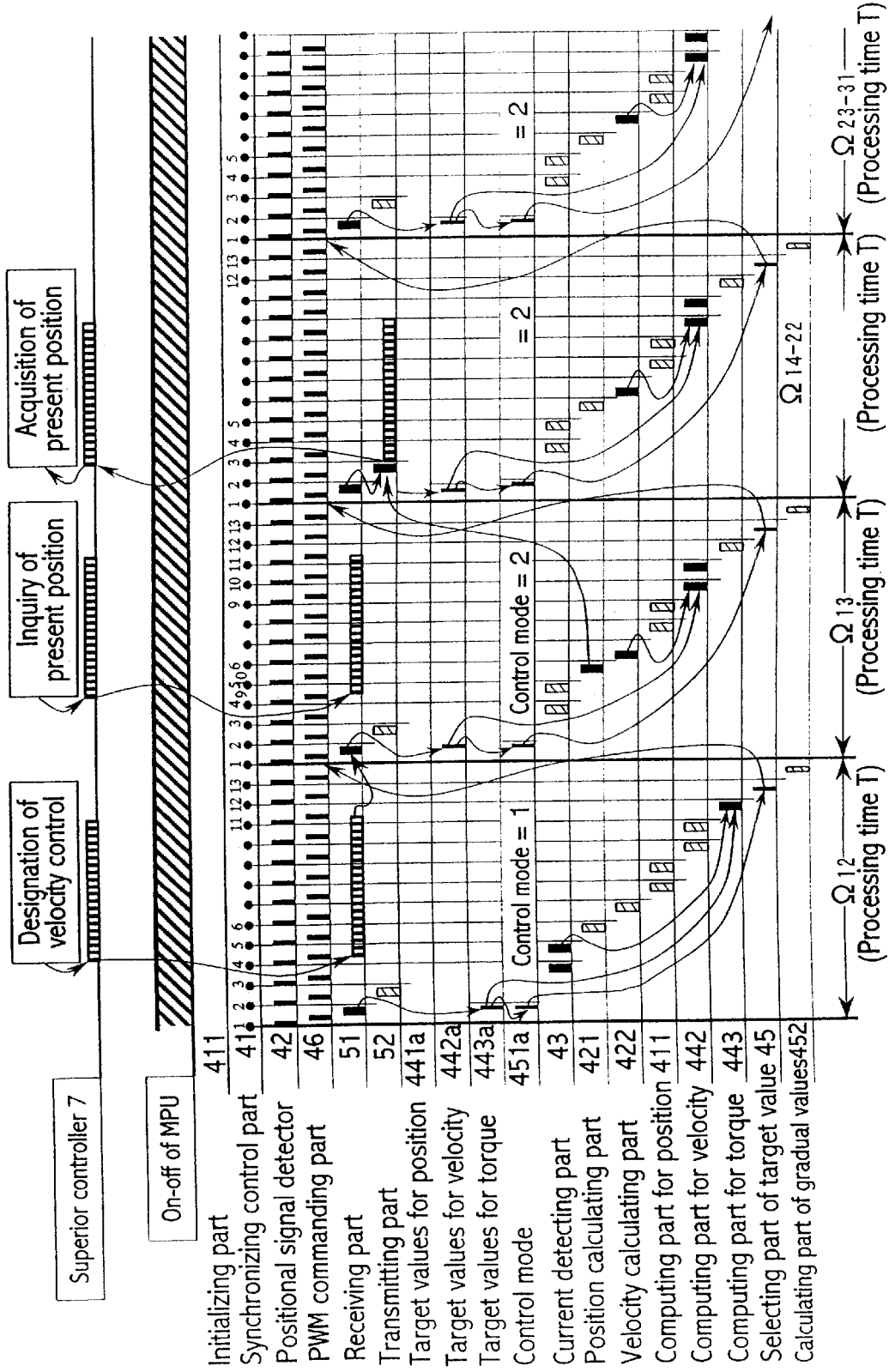
FIG. 15 is a timing chart continued from FIG. 14, showing velocity control operated in response to synchronizing triggers after torque control.

The superior controller 7 can always watch the motor speed during the repetition of both catching the inquiry by means of receiving part 51 and sending forth the present information by means of transmitting part 52. As soon as the desired speed of motor is detected, the superior controller 7 sends forth the control input information for velocity control by spending the infinitesimal intervals, e.g., $\Phi_4$ to $\Phi_{11}$ of processing term $\Omega_{12}$ as shown in FIG. 15. Since this information can be read out in an interval $\Phi_1$ of term $\Omega_{13}$, it is read out just after the process of positional signal detector 42 and PWM commanding part 46 at i=1. After the information read out is decoded the control mode $F_{-N}=2$ is stored in storing part of designated control mode 451a shown in FIG. 4(a) and target value for controlling velocity $DV_0$ is stored in storing part of the target value for velocity 442a shown in FIG. 4(c), they are exchanged for their values already stored, respectively. But the target value for controlling torque $DT_0$ is kept in the storing part of target value for torque 443a (see FIG. 4(b)).

PWM target values $Pr_{-V}$ on the thick lines inside the center box in FIG. 32 are computed according to the procedure of FIG. 29 by using the rotational velocity $V_M$ and the target value for controlling velocity $DV_0$ computed in an infinitesimal interval $\Phi_6$ to output in an interval $\Phi_9$ (S6505, S6506, S6507). As soon as entering interval $\Phi_{12}$ PWM selection value $Pr_{-SL}$ selected during steps 6901 to 6907 in FIG. 31 is assigned to PWM target values $Pr_{-V}$ corresponding to control mode $F_{-N}=2$ (S6905). Such PWM selection value $Pr_{-SL}$ is regarded as a PWM commanding value $Pr_{-SM}$ to be directly input to PWM commanding part 46. The arrow $B_{13}$ on processing term $\Omega_{13}$ of FIGS. 11 and 12 teaches that $Pr_{-SM}$ is 18.

The continuous velocity control makes the position of motor output shaft near the pulse counting number L (refer to FIG. 11) corresponding to the distance to the destination of travelling truck. The deceleration is naturally necessary for stopping truck, then, it is desired to stop at the objective position as accurate as possible. The superior controller 7 always inquires the present position of motor so that the velocity control can be changed into the position control when the velocity control gives the position approximate to the objective. Needless to say, since the positional signal detector 42 always operates in the whole of infinitesimal intervals $\Phi$ every processing term $\Omega$, the present position is caught by position calculating part 421 through the procedure according to FIG. 26(a) one after another (S5501). The count of variate dP during the segmented term of T was explained in FIG. 8. Referring to FIG. 15, the receiving part 51 happen to be inquired for the present position of motor from the interval $\Phi_4$ to $\Phi_{11}$ of term $\Omega_{13}$. Since such an inquiry can be called in the interval $\Phi_1$ of term $\Omega_{14}$, the information of present position calculated in the interval $\Phi_5$ of term $\Omega_{13}$ results in being sent forth as soon as the transmitting part 52 operates of in the interval $\Phi_2$. If the transmitting part 52 can reply against the inquiry in this manner as soon as possible after the term $\Omega_j$ when the superior controller 7 inquired, the superior controller 7 may obtain the present position of motor through receiving part 71 on real time.

Figure 16:
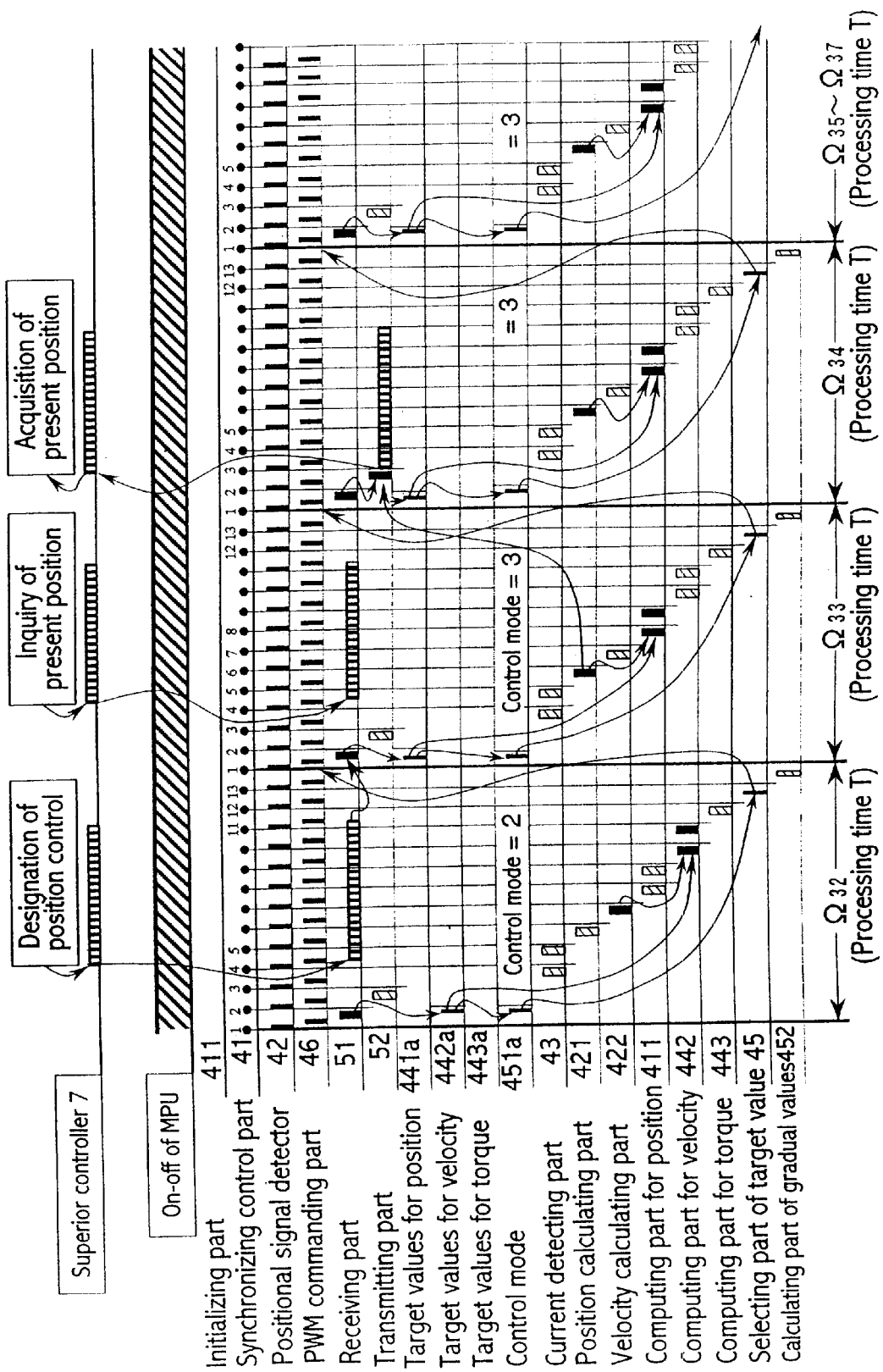
FIG. 16 is a timing chart continued from FIG. 15, showing position control operated in response to synchronizing triggers till stop.

The superior controller 7 can watch the position of motor output shaft one after another through receiving part 71 during the repetition of both receiving and transmitting information in this manner. As soon as the position approximate to stopping point of motor is detected, the superior controller 7 sends forth the control input information for position control by spending the infinitesimal intervals, e.g., $\Phi_4$ to $\Phi_{11}$ of processing term $\Omega_{32}$ as shown in FIG. 16. Since this information can be read out in an interval $\Phi_1$ of term $\Omega_{33}$, it is read out just after the process of positional signal detector 42 and PWM commanding part 46 at i=1. After the information read out is decoded the control mode $F_{-N}=3$ is stored in storing part of designated control mode 451a shown in FIG. 4(a) and target value for controlling position $DP_0$ is stored in storing part of the target value for position 441a shown in FIG. 4(d). But the target value for velocity $DV_0$ is kept in the storing part of target value for velocity 442a (see FIG. 4(c)) and the target value for controlling torque $DT_0$ is kept in the storing part of target value for torque 443a (see FIG. 4(b)).

PWM target values $Pr_{-P}$ on the thick lines inside the lower box in FIG. 32 are computed according to the procedure of FIG. 28 by using the present position $P_M$ and the target value for controlling position $DP_0$ computed in an infinitesimal interval $\Phi_5$ to output in an interval $\Phi_7$ of processing term $\Omega_{33}$ (S6005, S6006, S6007). As soon as entering interval $\Phi_{12}$ PWM selection value $Pr_{-SL}$ selected during steps 6901 to 6907 in FIG. 31 is assigned to PWM target values $Pr_{-P}$ corresponding to control mode $F_{-N}=3$ (S6904). Such PWM selection value $Pr_{-SL}$ is regarded as a PWM commanding value $Pr_{-SM}$ to be directly input to PWM commanding part 46. The arrow $B_{33}$ on term $\Omega_{33}$ of FIGS. 11 and 12 teaches that $Pr_{-SM}$ is 23.

In order to stop the motor the superior controller 7 always watches the present position to supply a new target value for controlling position $DP_0$ calculated based on the distance left to the stopping point (the rest of the pulse counting number) to receiving part 51. According to new ones the position control described above is repeated. As shown in FIG. 12 PWM target values $Pr_{-P}=14$ computed based on a new target value for controlling position $DP_0$ is used on processing term $\Omega_{35}$. The smaller the target value for controlling position is, the nearer the PWM target values $Pr_{-P}$ for stopping on term $\Omega_{37}$ is 0, finally, PWM commanding value $Pr_{-SM}$ also comes to 0. FIG. 11 shows PWM commanding value $Pr_{-SM}$ only, therefore, the current supplied to DC motor 2 according to PWM signals Ma and Mb results in flowing during the terms $\Omega_4$ to $\Omega_{38}$.

As described above in such a series of process and/or computation not only the the position calculating part 421 ($\Phi_5$) and the computing part for controlling position 441 ($\Phi_7$ and $\Phi_8$) painted with black but some parts except them are carried out on the processing term $\Omega_{33}$ of, e.g., FIG. 16. The velocity control continuously carried out till the term $\Omega_{32}$ is regarded applicable to the control on term $\Omega_{33}$, therefore, the calculation of velocity calculating part 422 is carried out in an infinitesimal interval $\Phi_6$ and the computation of computing part for controlling velocity 442 is carried out in intervals $\Phi_9$ and $\Phi_{10}$. Also in the intervals $\Phi_6$, $\Phi_9$ and $\Phi_{10}$ of term $\Omega_{34}$ the computation for velocity control is continuously carried out, by using the results of computation obtained on term $\Omega_{33}$.

Even if the control mode is changed into the position control in this manner, the continuation of computation for velocity control makes $CV_{-1}$ to $CV_{-4}$ memorized at steps 6303 to 6306 renew according to the computation at step 6302 in FIG. 29. If the change of control mode into velocity control and a new target value for controlling velocity are instructed by the superior controller 7 on the processing term $\Omega_{36}$ appearing after the term $\Omega_{34}$ charged with the position control, PWM selection value $Pr_{-SL}$ reflecting the present condition of motor is computed on term $\Omega_{36}$ by using the values renewed on terms $\Omega_{32}$, $\Omega_{33}$, $\Omega_{34}$ and $\Omega_{35}$. Accordingly, PWM signals Ma and Mb which reaches the target value for controlling velocity on the basis of the present velocity as soon as possible can be output on term $\Omega_{37}$. This is applicable to the case that intentionally makes the travelling truck pass through the predetermined stopping point at different speed from the speed generated just before stopping in spite that the servo-control was charged with position control to stop the motor.

The control input information supplied by superior controller 7 does not always include both control mode $F_{-N}$ and control target values. On the processing term $\Omega_{36}$ appearing after the term $\Omega_{34}$ charged with the position control, the superior controller 7 may instruct the change only of control mode into velocity control. This is applicable to the case that intentionally makes the travelling truck continue advancing at the speed generated just before stopping in spite that the servo-control was charged with position control to stop the motor.

The computation for torque control is still maintained on the processing terms $\Omega_{13}$, $\Omega_{14}$, $\Omega_{15}$, . . . , $\Omega_{32}$, $\Omega_{33}$, . . . and $\Omega_{36}$ appearing after the term $\Omega_{12}$ charged with the velocity control instead of the torque control. $CT_{-1}$ to $CT_{-4}$ memorized at steps 6702 to 6705 are renewed on the basis of the computation at step 6701 in FIG. 30. The computation for position control is still maintained even if the position control is replaced with velocity control or torque control, resulting in renewing $CP_{-1}$ to $CP_{-4}$ memorized at steps 5903 to 5906 on the basis of the computation at step 5902 in FIG. 28.

As explained above, the computation of computing part of PWM target value for position 441P, that of computing part of PWM target value for velocity 442V and that of computing part of PWM target value for torque 443T are mutually carried out in the different infinitesimal intervals, however, they are carried out in parallel every processing term $\Omega$ as long as watching a series of processing terms. Since the PWM target value for torque $Pr_{-T}$, PWM target value for velocity $Pr_{-V}$ and PWM target value for position $Pr_{-P}$ are given to the selecting part of target value for designated mode 451 as shown in FIG. 32, selecting part of target value for designated mode 451 may select PWM target value corresponding to the control mode designated as soon as the superior controller 7 instructs, therefore, the PWM commanding value $Pr_{-SM}$ is output without any time lag, resulting in transferring the operation charged with desired control mode.

Incidentally, computations for three PWM target values mentioned above can be also carried out without in parallel. For example, in the case that the computation for torque control is replaced with the computation for velocity control on processing term $\Omega_{13}$ in FIG. 15, the computation for velocity control only is carried out on term $\Omega_{13}$, while the computation for torque control is stopped after the term $\Omega_{12}$. Further, in the case that the computation for velocity control is replaced with the computation for position control on term $\Omega_{32}$ in FIG. 16, the computation for position control only is carried out on term $\Omega_{33}$, while the computation for velocity control is stopped after the term $\Omega_{32}$. Though the process and/or computation intended for three control modes are performable during one term $Q_j$ according to the procedure of FIG. 2, the above is characterized by omitting the process and/or computation for control mode which is not instructed by superior controller 7. In order to realize such a concept the system for the procedure of FIG. 28 has to comprise a comparator (not-shown), which advances to step 5901 when $F_{-N}$ is 3 and returns when not 3, prior to step 5901. The system for FIG. 29 has to comprise a comparator, which advances to step 6301 when $F_{-N}$ is 2 and returns when not 2, prior to step 6301. The system for FIG. 30 has to comprise a comparator, which advances to step 6701 when $F_{-N}$ is 1 and returns when not 1, prior to step 6701.

Figure 33:
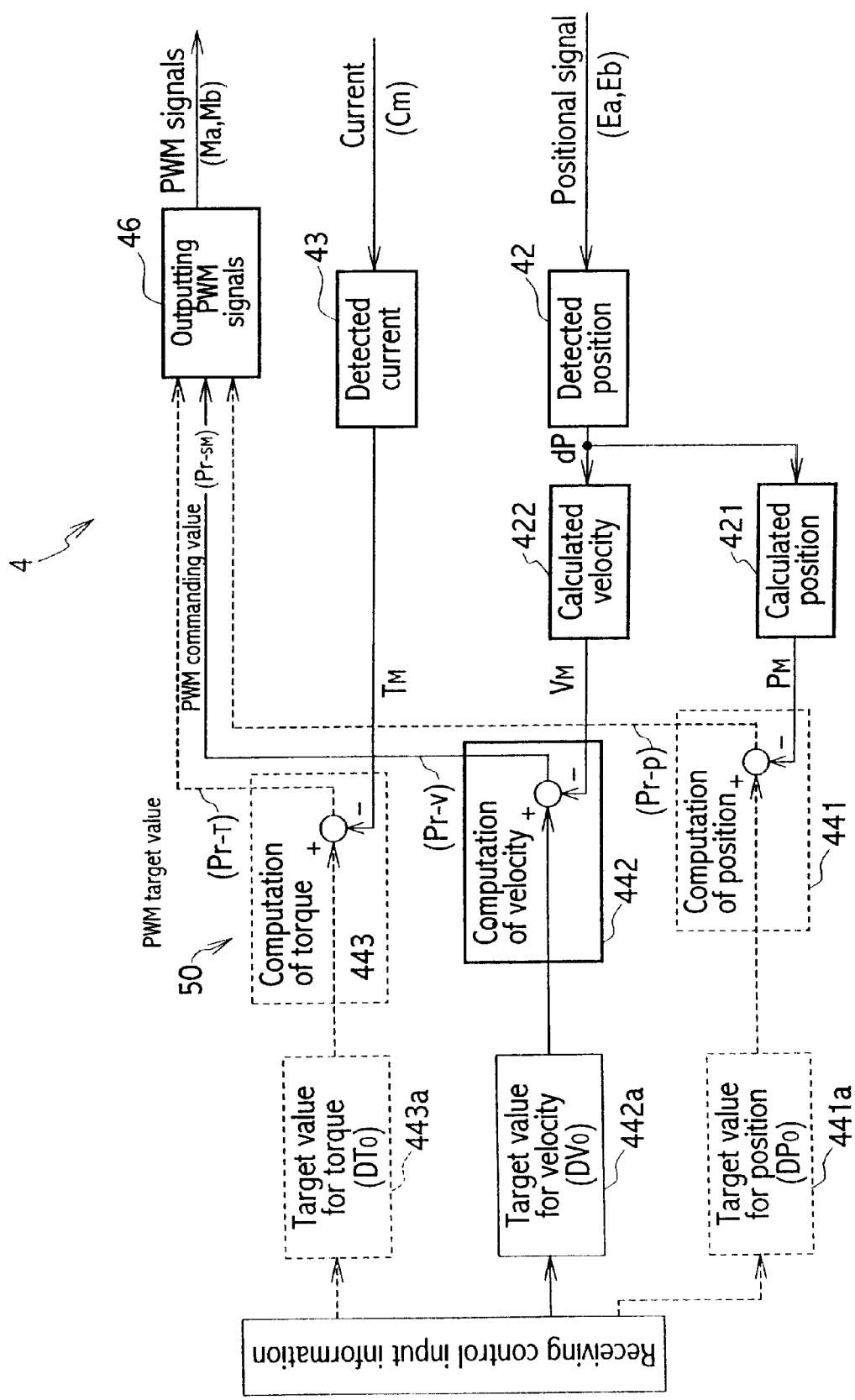
FIG. 33 is a block diagram showing the process and/or computation of PWM control part without selection procedure of selecting part of target value for designated mode.

Such a control is operable under the condition that the superior controller 7 always sends forth the control target values with control mode to information input/output part 5. Since the PWM computing part 50 always only performs the computation relating to one of the control modes, the selecting part of target value for designated mode 451 described above does not dare to be equipped. For example, the PWM target value $Pr_{-V}$ is computed corresponding to the control mode $F_{-N}=2$ and target value for controlling velocity 20 rps which the superior controller 7 has input to receiving part 51, and it is regarded as PWM commanding value $Pr_{-SM}$ to be directly output to PWM commanding part 46 as shown in a block diagram of FIG. 33.

The current detected on the present processing term $\Omega_j$ is used as the current information which is one of information detected from DC motor 2 for the embodiments described above. The current detected during the term $\Omega_{j-1}$ shortly previous to the present term is also usable instead of the above. The control mode $F_{-N}$ and control target values designated on the previous term $\Omega_{j-1}$ are adopted because it takes much time for receiving control input information as shown in the processing term, e.g., $\Omega_2$ of FIG. 5. However, if the process and/or computation performed during the infinitesimal intervals $\Psi_5$ to $\Phi_{12}$ are transferred to the intervals, e.g., $\Phi_{24}$ to $\Phi_{31}$, the control input information received during i=1 to 23 is processible within the present term $\Omega_j$. For example, FIG. 35 explained later teaches that the process and/or computation of selecting part of PWM target value 45 and calculating part of PWM gradual values 452 are performed during i=30 to 31.

At least the detection of positional signals Ea and Eb of motor output shaft 2s and the output of PWM signals Ma and Mb are carried out in all infinitesimal intervals $\Phi_1$, $\Phi_2$, $\Phi_3$, ..., $\Phi_{n-1}$, $\Phi_n$. The process for these two are carried out at the beginning of each interval $\Phi$ because they always have to be performed every 12.5 $\mu$S. It is noted that other process and/or computation performed after the process for the two are different every interval $\Phi$ as shown in FIG. 7, individually spending time enough for each process and/or computation. Since the time required for measuring positional signals and the time for outputting PWM signals Ma and Mb are constant, individually, the process for PWM commanding part 46 is performable prior to that for positional signal detector 42. Measuring positional signals Ea and Eb every constant time makes the count of variate dP accurate, while outputting PWM signals Ma and Mb every constant time generates the pulses with quite same width as long as the duty ratio is maintained constant.

Figure 34:
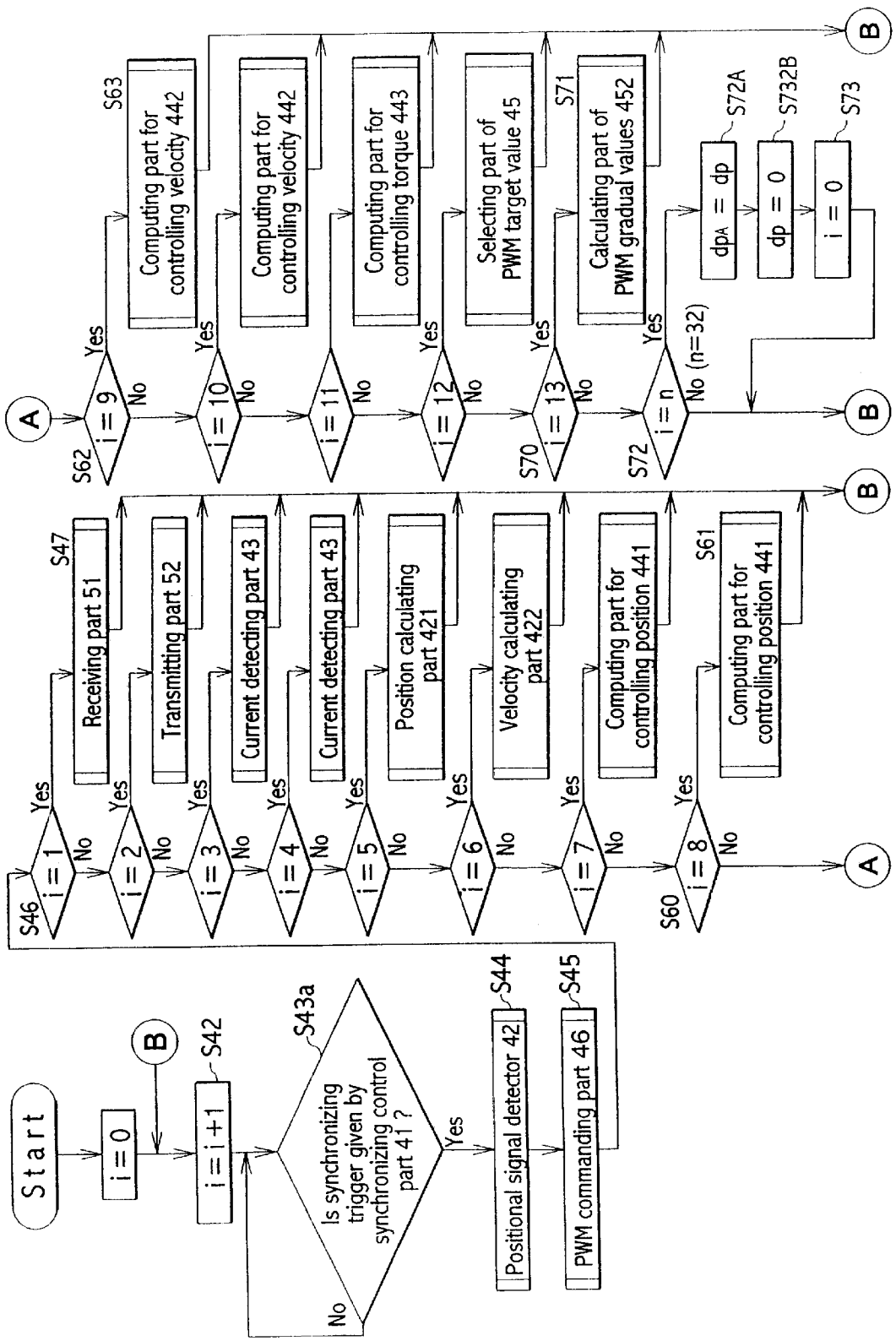
FIG. 34 is a flow chart showing the control instead of FIG. 22.

The computation of the present position of motor output shaft, as described in FIG. 23, is performed by counting the increment or the decrement obtained by cumulating the positional signals Ea and Eb which are detected during n infinitesimal intervals $\Phi_{h-1}$, $\Phi_{h-2}$, $\Phi_{h-3}$, ... included within time T shortly previous to the interval $\Phi_h$ computing the present position. And at step 5501 of FIG. 26(a) the present position is given by adding the variate to the positional information $P_M$ obtained before T in time, i.e., in the interval $\Phi_h$ of term $\Omega_{j-1}$ shortly previous to the present one. This is already taught by showing the variate dP=6 obtained during infinitesimal intervals from $\Omega_6$ of processing term $\Omega_{j-1}$ to $\Phi_5$ of $\Omega_j$ in FIG. 8. On the other hand, the present position is obtainable by adding the variate obtained through the cumulation of positional signals Ea and Eb which are detected during all infinitesimal intervals $\Phi_1$, $\Phi_2$, $\Phi_3$, ..., $\Phi_{n-1}$, $\Phi_n$ of processing term $\Omega_{j-1}$ shortly before the present term to the positional information $P_M$ obtained on term $Q_{j-2}$, 2 periods before. Such process and/or computation are carried out through the flow chart of FIG. 34 instead of the procedure of FIG. 22.

The step 72 appearing after the finish of the procedure till i=n (n=32) similarly to that in FIG. 22 leads a next step replacing the variate dP (see step 4412 or 4413 in FIG. 23) detected by positional signal detector 42 during infinitesimal intervals from i=1 to 32 with $dP_A$ (S72A). In this case, the succeeding processing term $\Omega_{j+1}$ is commenced at step 42 via step 72B resetting dP to 0 and step 73. Since dP is reset to 0, the variate dP cumulated during the processing term $\Omega_j$ starting from infinitesimal interval $\Phi_1$ is used in the process of positional signal detector 42 carried out on the succeeding processing term $\Omega_{j+1}$. The position calculating part 421 computes the position of motor output shaft (S5501a) according to the procedure of FIG. 26(b) at i=5, i.e., adding $dp_A$ cumulated during processing term $\Omega_{j-1}$ to the previous position $P_M$. The value obtained through the addition mentioned above is used as $P_M$ at step 5902 in FIG. 28. Though it is older than that obtained according to the flow chart of FIG. 22 by t×5(=62.5 $\mu$S), the accuracy of control is secured without question. In this case the procedure of velocity calculating part 422 is assigned to the flow chart of FIG. 27(b) instead of (a).

Figure 35:
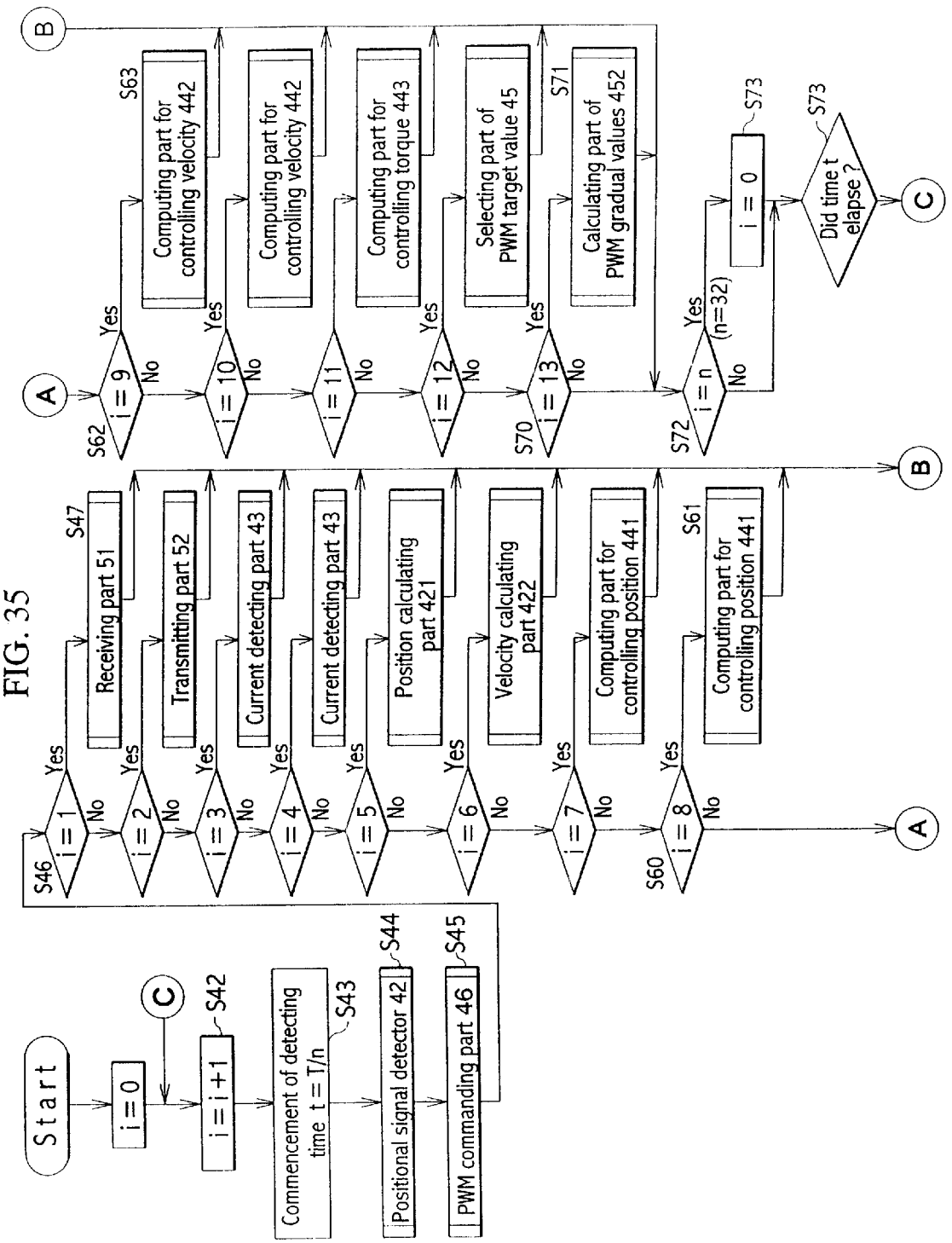
FIG. 35 is a flow chart showing another control instead of FIG. 22.

Further, the procedure of flow chart in FIG. 35 is also usable instead of that of FIG. 22, in which a timer directly operates instead of synchronizing triggers. The process and/or computation every infinitesimal interval $\Phi$ are performed without question provided that i of counter is renewed every t (=T/n=12.5 $\mu$S). Needless to say, the idea of FIG. 35 is also applicable to the flow chart of FIG. 34.

It is already described in the block diagram of FIG. 4(a) that the selecting part of target value for designated mode 451 is replaceable with the selecting part of target value for automatically changing control mode 451b. The selecting part 451b replaces the target value selected from among PWM target values $Pr_{-P}$, $Pr_{-V}$, $Pr_{-T}$ computed based on each of control target values $DP_0$, $DV_0$, $DT_0$ as a PWM target value for the control mode $F_{-N}$ designated by the control input information with one of the PWM target values for other control modes $F_{-N}$, which is less than PWM maximum allowable value under other control modes in order to get PWM selection value $Pr_{-SL}$, in the case that the target value selected from among PWM target values is more than PWM maximum allowable value P r al-ax corresponding to the maximum allowable current for the motor 2 in order to get PWM selection value $Pr_{-SL}$.

Figure 36:
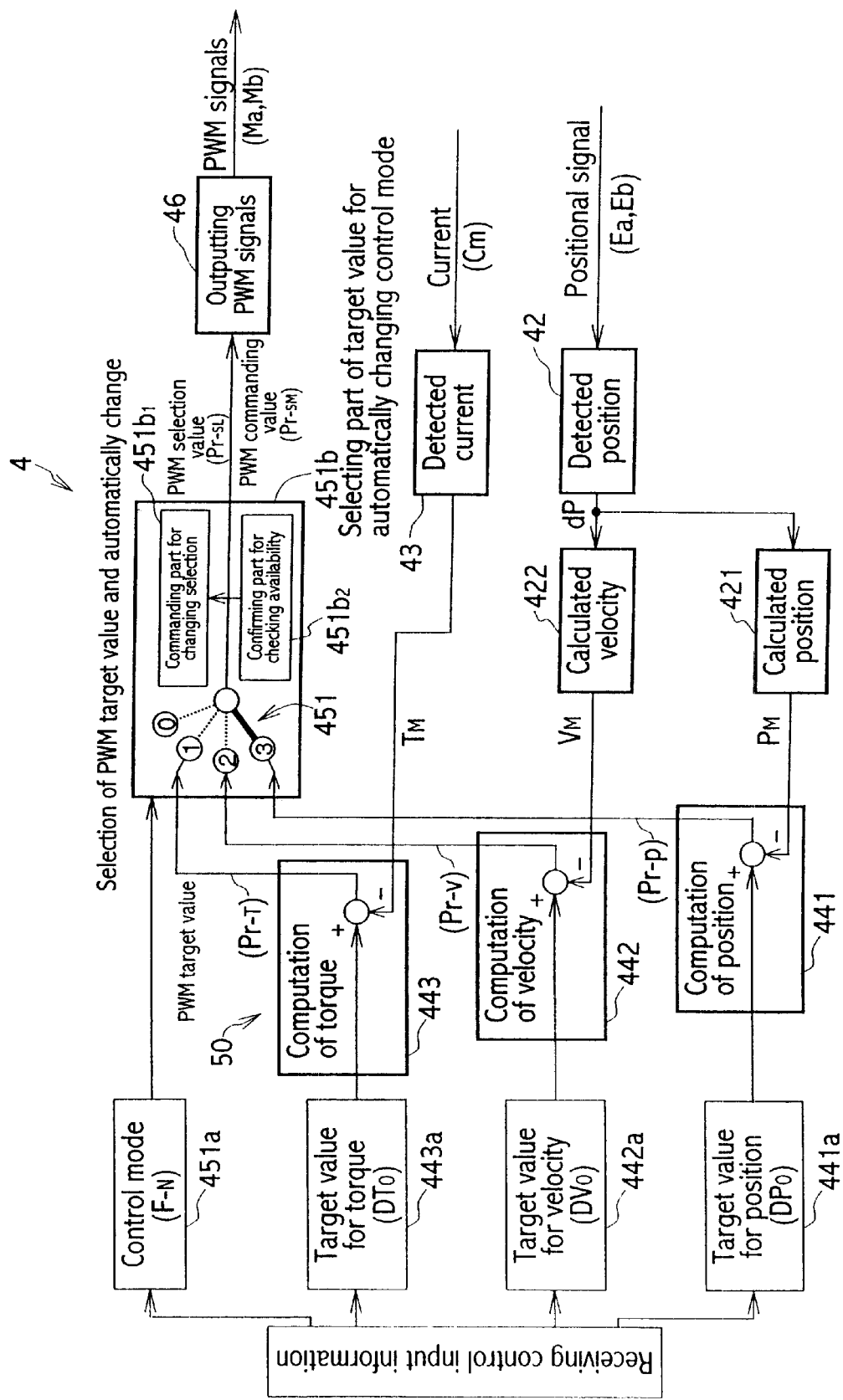
FIG. 36 is a block diagram showing the process and/or computation of PWM control part with selecting part of target value for automatically changing control mode.
Figure 37:
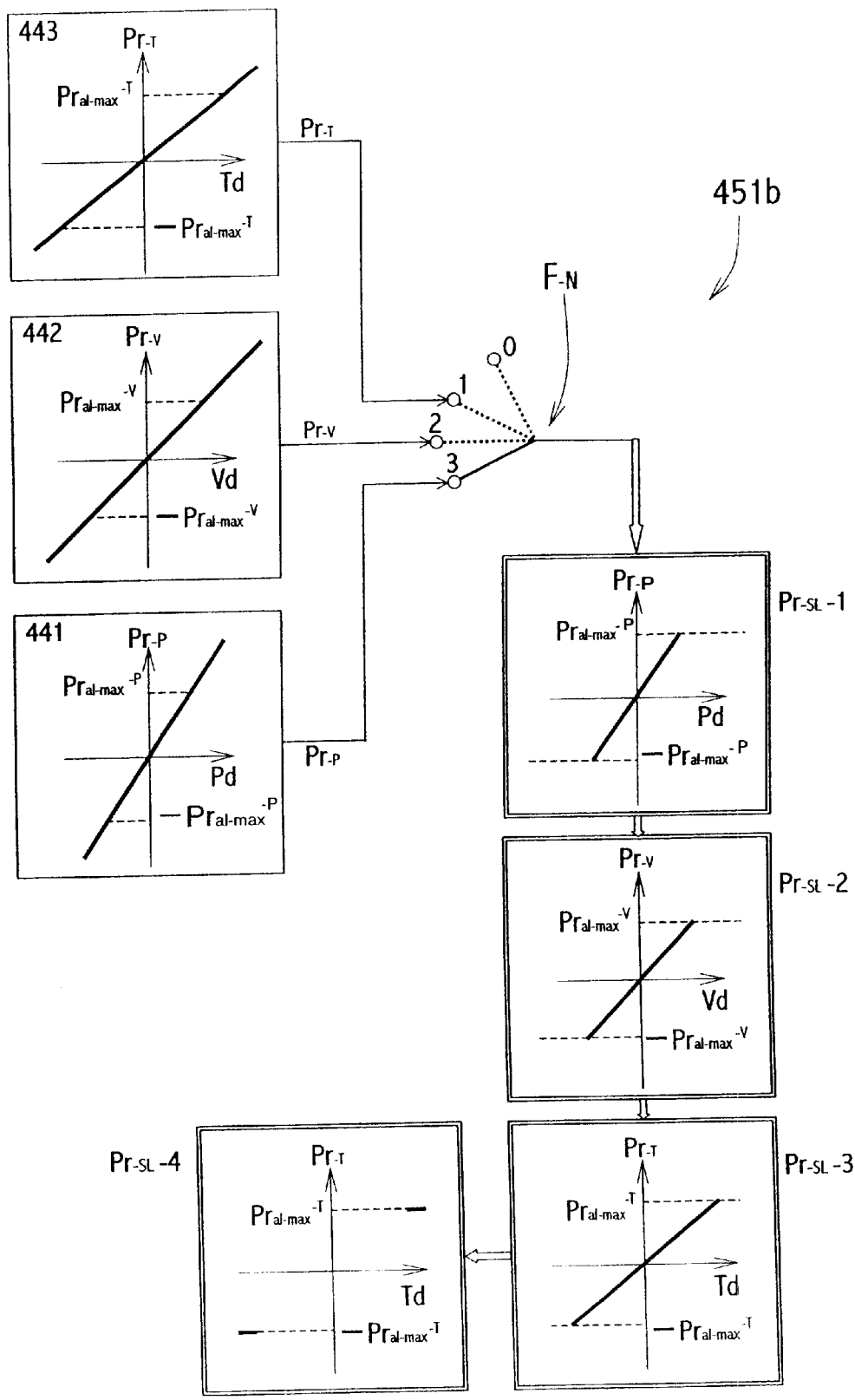
FIG. 37 is a block diagram visually teaching the operation for selecting part of target value for automatically changing control mode.
Figure 41:
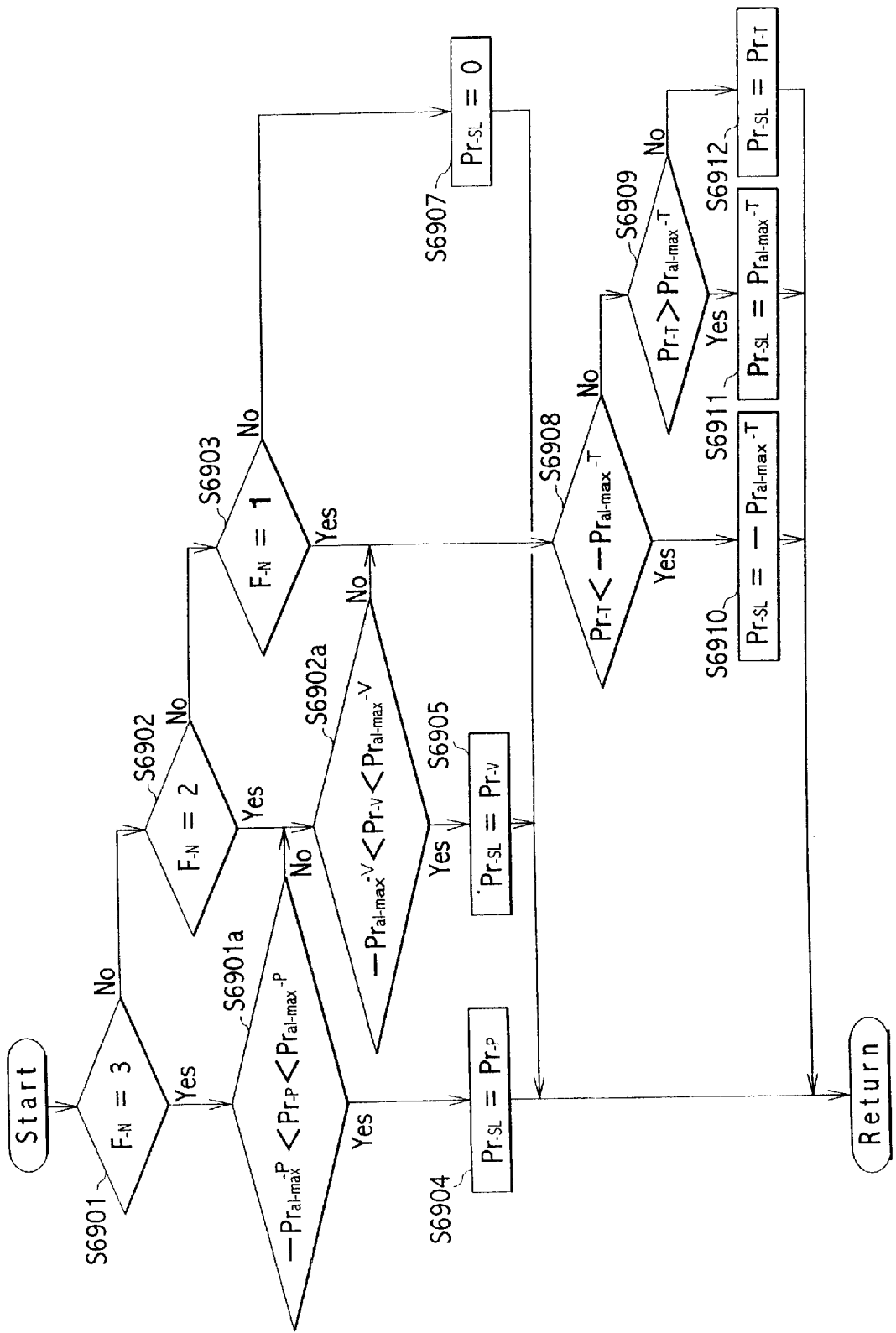
FIG. 41 is a flow chart of the selection procedure in selecting part of target value for automatically changing control mode.

The composition described above is visually shown in FIG. 36 which the commanding part for changing selection $451b_1$ and the confirming part for checking availability $451b_2$ are added to the selecting part of target value for designated mode 451. The latter has the function for ascertaining whether the PWM target value selected is less than the maximum allowable value according to the control mode. If it is less than the maximum, it is output as PWM selection value $Pr_{-SL}$, being regarded as PWM commanding value $Pr_{-SM}$ sent forth to PWM commanding part 46. If it is not less than the maximum, the command for changing selection appears to select one of PWM target values corresponding to other control modes which are not designated by the superior controller 7, thereby, and each of them is ascertained to be less than the maximum allowable value corresponding to its control mode or not. FIG. 37 teaches that position, velocity and torque are generally checked in turn to get a suitable PWM target value, the procedure of which is shown in the flow chart of FIG. 41.

Figure 38:
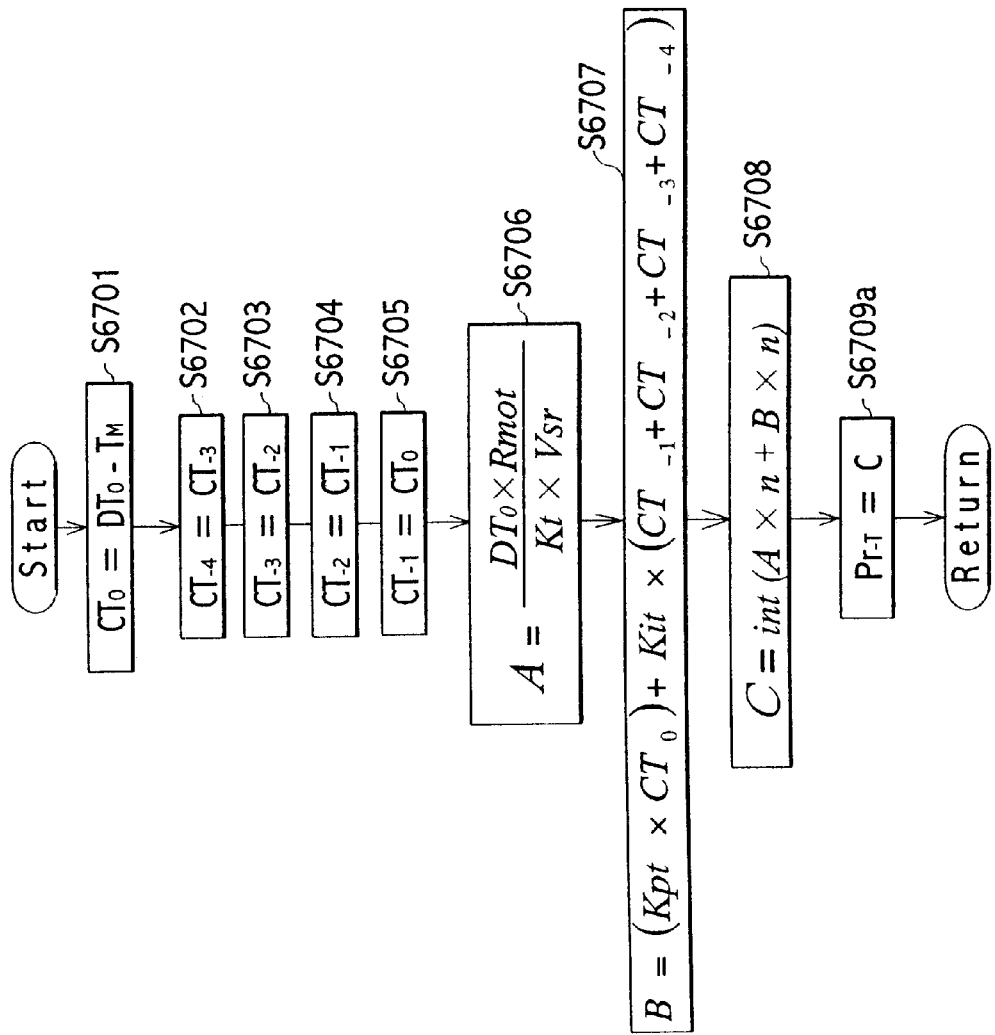
FIG. 38 is a flow chart for computing PWM target values of torque output to selecting part of target value for automatically changing control mode.
Figure 39:
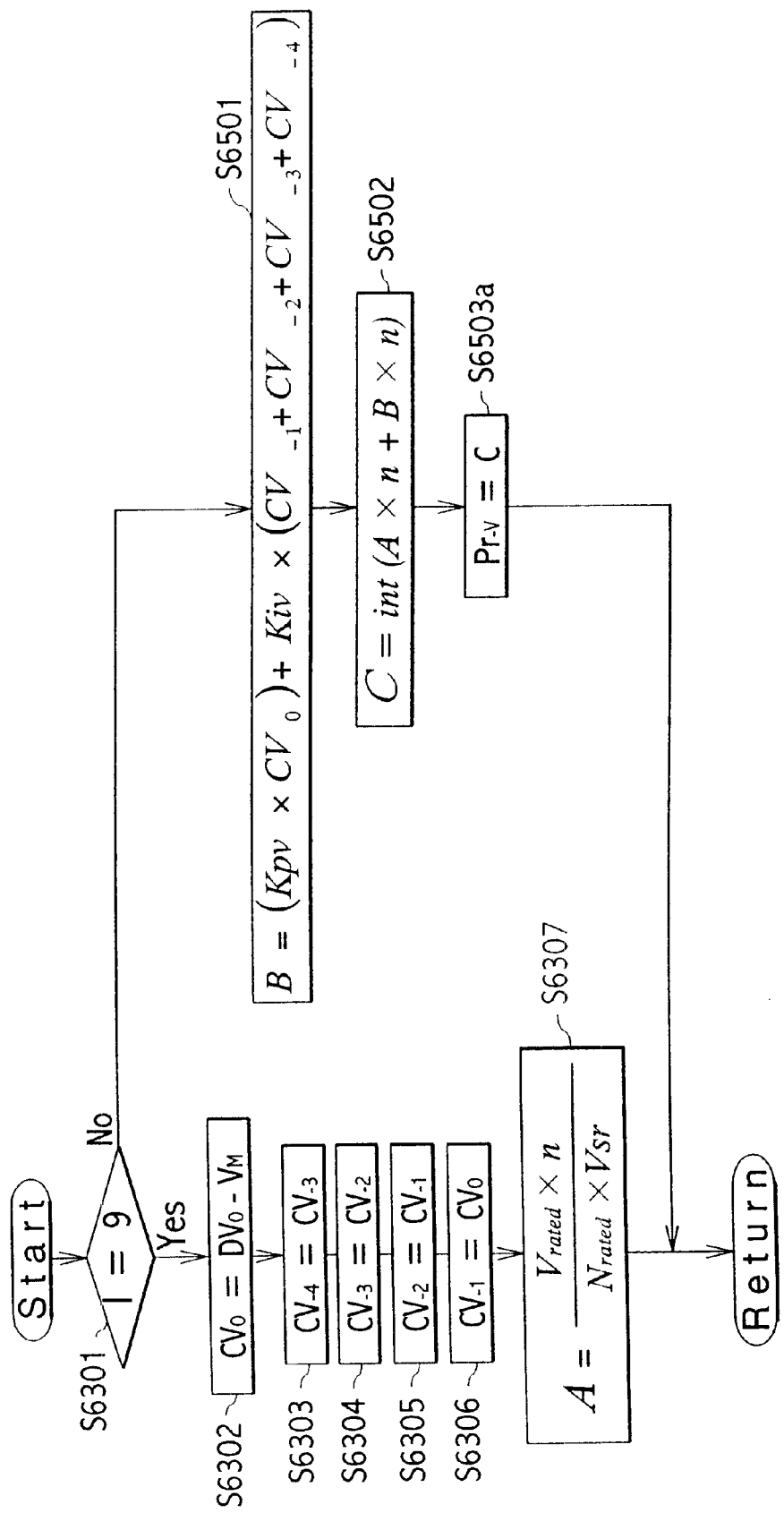
FIG. 39 is a flow chart for computing PWM target values of velocity output to selecting part of target value for automatically changing control mode.
Figure 40:
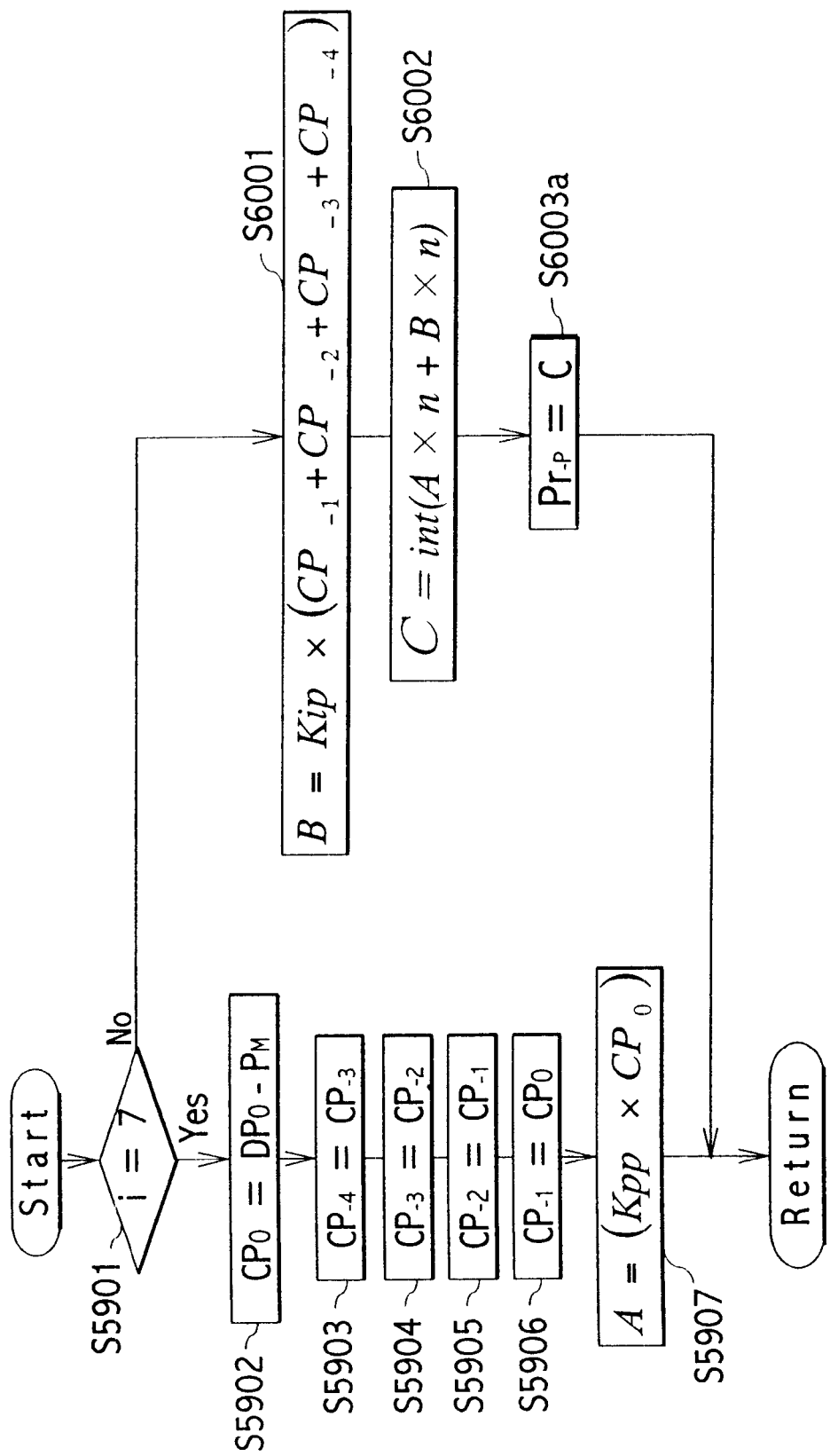
FIG. 40 is a flow chart for computing PWM target values of position output to selecting part of target value for automatically changing control mode.
Figure 42:
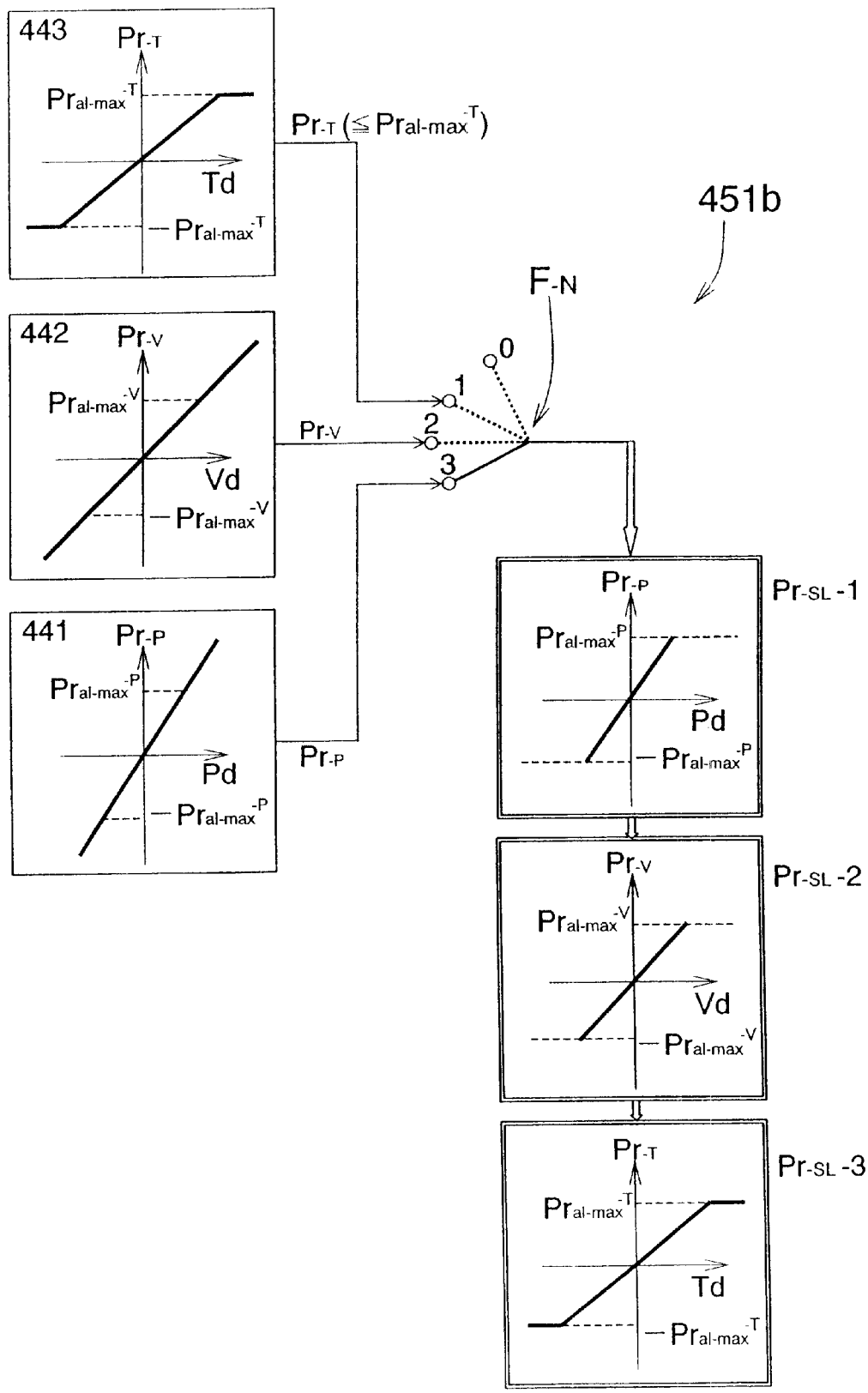
FIG. 42 is a block diagram visually teaching another operation for selecting part of target value for automatically changing control mode.

As shown in the three blocks of FIG. 37 the computing part of FWM target value for position, the computing part of PWM target value for velocity and the computing part of PWM target value for torque are not required to output the PWM target value being limited to the maximum allowable value for itself or less. Therefore, the computations according to computing parts 441, 442 and 443 are subject to the flow charts of FIGS. 38, 39 and 40. In any flow charts no comparator is provided, being completely different from steps 6709, 6710, 6503, 6504, 6003 and 6004 in FIGS. 30, 29 and 28. In this case maximum allowable value for torque is adopted to avoid the inoperable control (see steps 6908 and 6909 in FIG. 41) since it often happened that every PWM target value comes to more than maximum allowable value for itself. FIG. 42 shows an example that the PWM target value being less than the maximum allowable value can be output concerning torque only from computing part for controlling torque 443. In other words, PWM target values $Pr_{-P}$ and $Pr_{-V}$ concerning position and velocity are not limited, while PWM target value $Pr_{-T}$ for torque is limited up to the PWM maximum allowable value $Pr_{a1-max}^{-T}$ corresponding to the maximum allowable current of motor 2 at the selecting part of target value for automatically changing control mode 451b.

Such process is applicable to the travelling truck moving for a far destination because the computed value $Pr_{-P}$ based on position control for the long distance travelling results in requiring excessive current corresponding to more than maximum allowable value $Pr_{a1-max}^{-P}$, being unusable for control. Therefore, the selecting part of target value for automatically changing control mode 451b automatically changes the position control into the velocity control in order to maintain the constant speed within an linear region less than maximum allowable value $Pr_{a1-max}^{-V}$ by using the computed value $Pr^{-V}$ according to velocity control.

In the case that the computed value $Pr_{-V}$ based on velocity control comes to more than maximum allowable value $Pr_{a1-max}^{-V}$ it is automatically replaced with the computed value $Pr_{-T}$ based on torque control. Such process happens at the beginning of the operation of the travelling truck under the position control. For the sake of the long distance travelling the computed value $Pr_{-P}$ based on position control comes to more than maximum allowable value $Pr_{a1-max}^{-P}$. Even if the position control is replaced with the velocity control, the computed value $Pr_{-V}$ based on velocity control also comes to more than maximum allowable value $Pr_{a1-max}^{-V}$ due to slow travelling speed, then, the control is replaced with the torque control. If the computed value $Pr_{-T}$ based on torque control is more than maximum allowable value $Pr_{a1-max}^{-T}$ the target value is limited to maximum allowable value $Pr_{a1-max}^{-T}$. In this case the position control is automatically changed into the torque control by selecting part of target value for automatically changing control mode 451b in spite that the position control is designated by superior controller 7. The increase of the speed of travelling truck according to torque control sends the computed value $Pr_{-V}$ based on velocity control into the linear region within the maximum allowable value $Pr_{a1-max}^{-V}$. The selecting part of target value for automatically changing control mode 451b automatically changes the torque control into the velocity control, resulting in moving the travelling truck at a constant speed. The approximation to the objective sends the computed value $Pr_{-P}$ based on position control into the linear region within the maximum allowable value $Pr_{a1-max}^{-P}$. The selecting part of target value for automatically changing control mode 451b automatically changes the velocity control into the position control, resulting in stopping at the predetermined point with high accuracy.

Figure 43:
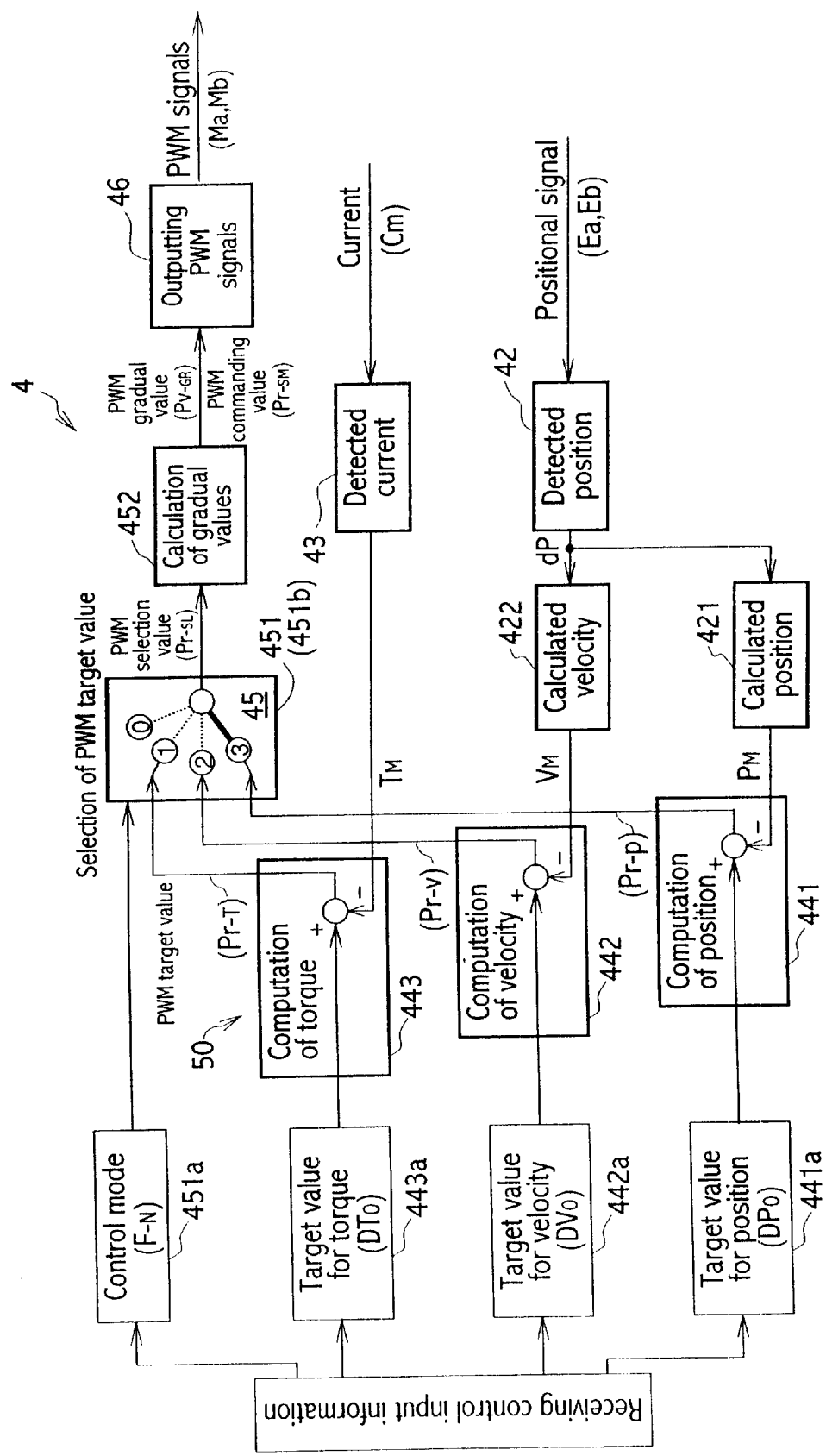
FIG. 43 is a block diagram showing the process and/or computation of PWM control part with calculating part of PWM gradual values.

FIG. 43 shows a block diagram of the processing system equipping with the calculating part of PWM gradual values 452. Such calculating part of PWM gradual values 452 is disposed just before PWM commanding part 46 as shown in block diagrams of FIGS. 2 and 4(a), which varies PWM selection value $Pr_{-SL}$ gradually, i.e., computes PWM gradual values $Pr_{-GR}$ for gradually getting close to a new PWM selection value $Pr_{-SL}$ by spending the succeeding several processing terms $\Omega_{j+1}, Q_{j+2}, \ldots$ appearing after processing term $\Omega_j$ charged with a new control mode $F_{-N}$ in the case that the PWM selection value $Pr_{-SL}$ obtained based on the new control mode $F_{-N}$ designated by control input information is different from the PWM selection value $Pr_{-SL}$ according to proceeding control mode $F_{-N}$. Therefore, the PWM selection value $Pr_{-SL}$ output from selecting part of PWM target value 45 is replaced with PWM gradual values $Pr_{-GR}$, being regarded as PWM commanding value $Pr_{-SM}$ sent forth to PWM commanding part 46, thereby, the control mode $F_{-N}$ of motor 2 is changeable without shock.

Figure 44:
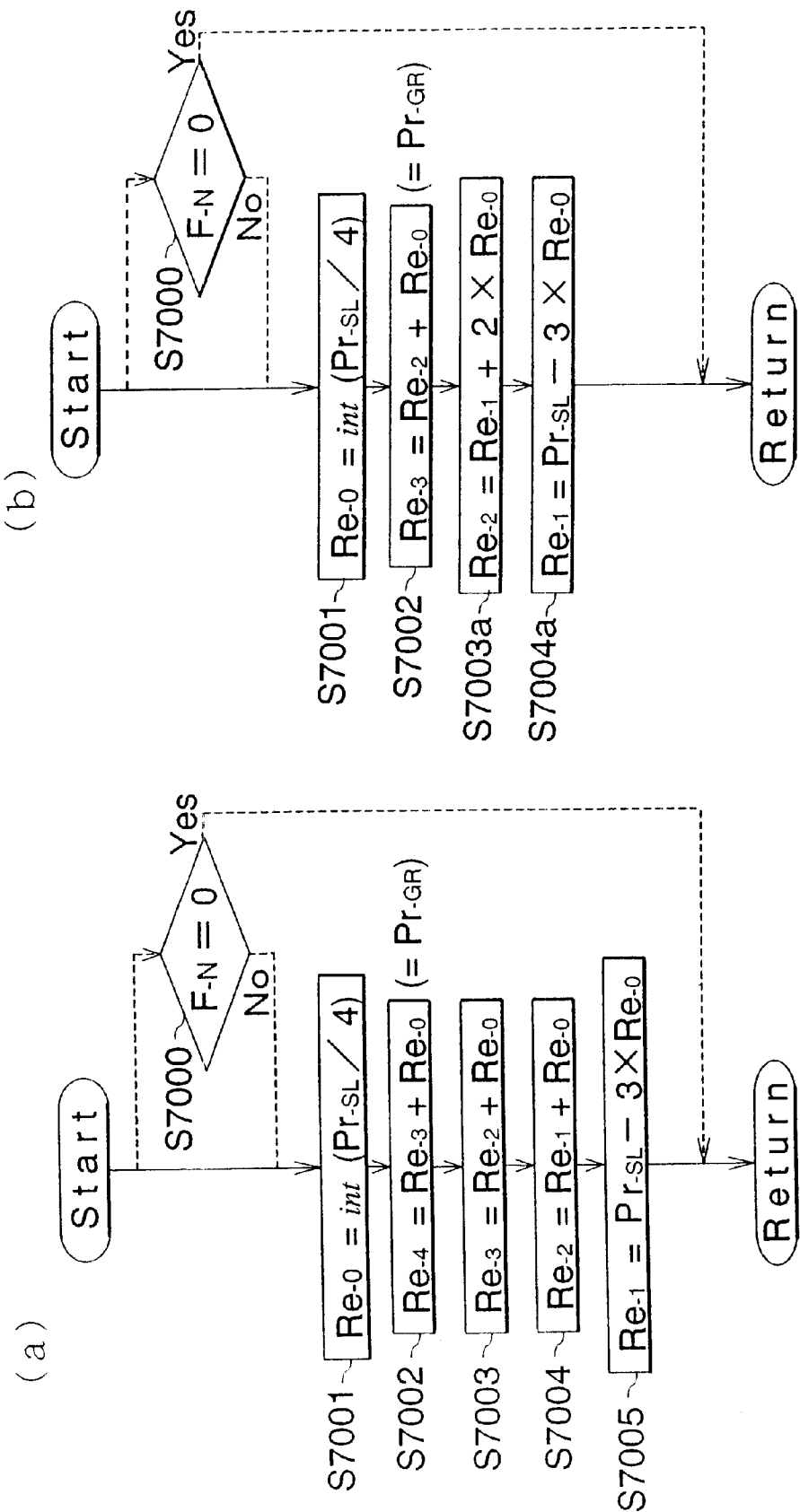
FIG. 44 shows the procedure of calculating part of PWM gradual values; (a) is a chart having 4 stages for gradual change, and (b) a chart having 3.

The process of calculating part of PWM gradual values 452 is subject to the flow chart of FIG. 44. In FIG. 11 the solid lines showing FWM commanding value $Pr_{-SM}$ are quickly changing on the processing terms $\Omega_3, \Omega_{13}, \Omega_{23}, \Omega_{33}, \Omega_{35}, \Omega_{36}$ and $\Omega_{37}$. These values are shown on the section of $Pr_{-SM}$ in FIG. 12. Outputting PWM signals Ma and Mb corresponding to $Pr_{-SM}$, being quickly changing, from PWM commanding part 46 also makes the current flowed through the motor quickly change. Accordingly, the quick change of revolution and/or torque of motor output shaft on the basis of change of control mode shocks the mobile driven by motors. The purpose in calculating the gradual values is to get the smooth change of PWM commanding values $Pr_{-SM}$ so as to decrease shock as shown by broken lines in FIG. 11.

In the calculating part of PWM gradual values 452 the number of stages for smoothly changing PWM selection value $Pr_{-SL}$ output from selecting part of target value for designated mode 451 is determined in consideration of the velocity decreasing shock so as to display the desired transient characteristic against the machinery system containing both motors and mobile. If the torque response is supposed to approx. 4 mS in the case that the period T for control is, e.g., 400 µS, the number of stages which is determined to decrease the shock due to the change quicker than the torque response is assigned to 10 which 4 mS divided by control period T gives.

If such calculating part of PWM gradual values 452 is provided, $Pr_{-SL}=0$ is input to data memory for calculating gradual values 452b at step 238a instead of inputting $Pr_{-SL}=0$ to data memory for commanding PWM 46b at step 238 when resetting software of FIG. 21. In addition, the memorized values $Re_{-1}, Re_{-2}$ and $Re_{-3}$ necessary for the computation of FIG. 44(a) are replaced with 0 at step 238b, being also stored in data memory for calculating gradual values 452b. Not only other terms to be initialized in FIG. 21 but the flow charts in FIGS. 23 to 31 and 38 to 41 are effective.

The positional signal detector 42 repeats the same as it operated during i=1 and the PWM commanding part 46 repeats the same as it operated during i=2 just after entering i=13 (infinitesimal interval $\Phi_{13}$) of the flow chart of FIG. 22. The process of calculating part of FWM gradual values 452 is commenced (S71) after step 70. Referring to FIG. 44(a), since $Pr_{-SL}$ used at step 7001 is already calculated in the process of selecting part of target value for designated mode 451 (see FIGS. 31 and 41) of i=12, $Re_{-0}$ is assigned to the part of integer of the value divided by 4. Since $Re_{-1}, Re_{-2}$ and $Re_{-3}$ are already set to 0, $Re_{-4}, Re_{-3}, Re_{-2}$ and $Re_{-1}$ are calculated through steps 7002 to 7005. Though $Re_{-4}, Re_{-3}, Re_{-2}$ and $Re_{-1}$ have no physical meaning in particular, $Re_{-4}$ ($=Pr_{-GR}$) only is applied to the correction of $Pr_{-SL}$.

Figure 45:
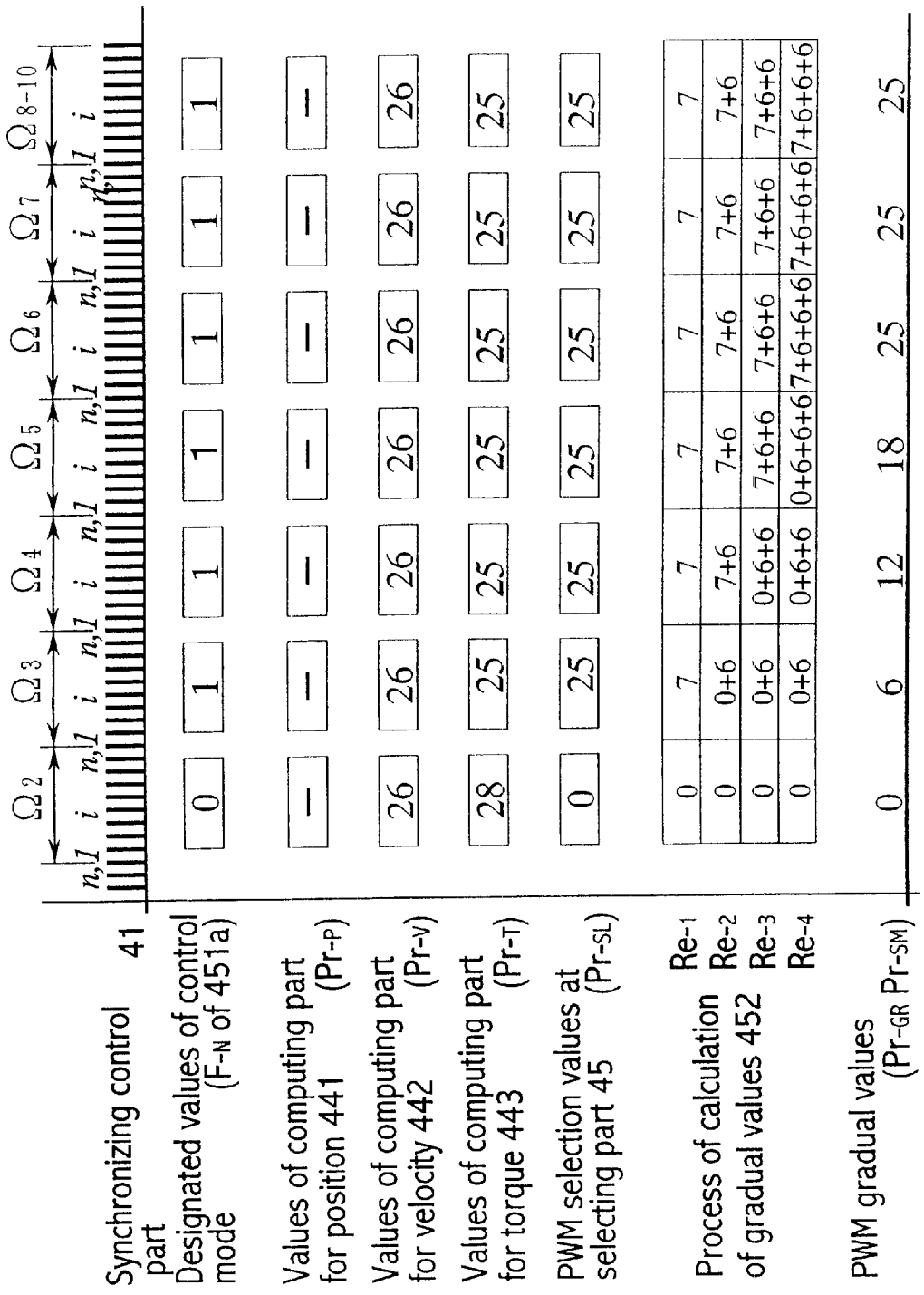
FIG. 45 is a list showing the gradual values at the start according to torque control.
Figure 47:
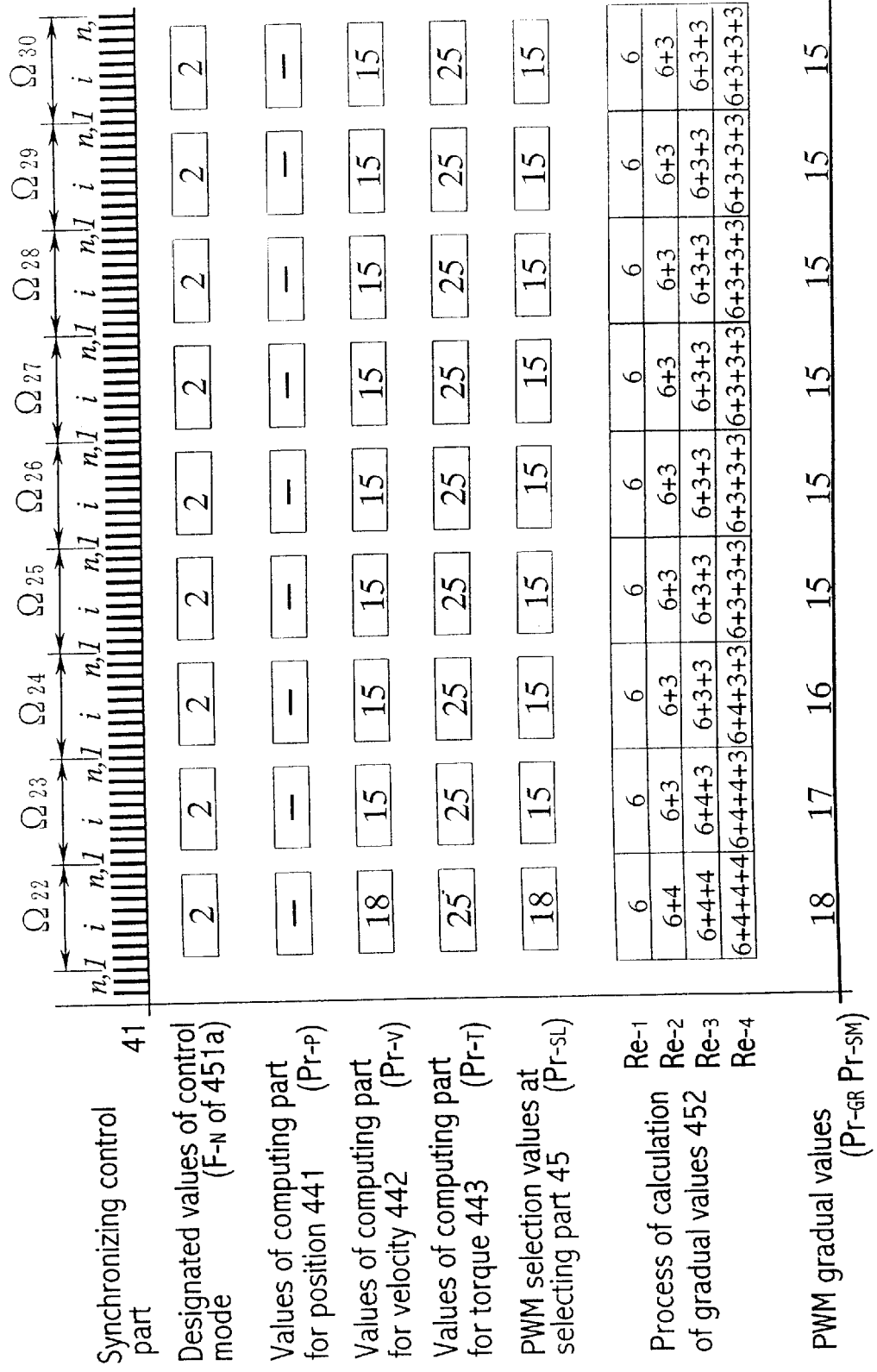
FIG. 47 is a list showing the gradual values at the change of target value for controlling velocity during velocity control.

Referring to the section of FWM selection value $Pr_{-SL}$ of FIG. 45, an example that $Pr_{-SL}$ having 0 during processing term $\Omega_2$ is changed into 25 on processing term $\Omega_3$ is described below. $Re_{-4}, Re_{-3}, Re_{-2}$ and $Re_{-1}$ are calculated during steps 7002 to 7005 in FIG. 44(a). The repetition of such computation during some processing terms $\Omega$ increases $Re_{-4}$ of step 7002 slowly. $Re_{-4}=6$ is given on processing term $\Omega_3$, $Re_{-4}=12$ on $\Omega_4$ and $Re_{-4}=25$ on $\Omega_6$. 6, 12 and 18 as $Re_{-4}$ corresponds to gradual values for start $Pr_{-GR}$ at the part Za in FIG. 11, being regarded as PWM commanding value $Pr_{-SM}$ directly sent forth to PWM commanding part 46. FIG. 46 shows an example that $Pr_{-SL}$ having 25 for torque control during processing term $\Omega_{12}$ is changed into 18 for velocity control on processing term $\Omega_{13}$. FIG. 47 shows an example that $Pr_{-SL}$ having 18 for velocity control during processing term $\Omega_{22}$ is changed into 15 for velocity control on processing term $\Omega_{23}$. In this case, keeping the control mode $F_{-N}=2$ means the travel with other speed after the change. FIG. 48 shows an example that $Pr_{-SL}$ having 15 for velocity control during processing term $\Omega_{32}$ is changed into 23 for position control on processing term $\Omega_{33}$. The selection value is changed into 14 on processing term $\Omega_{35}$, 5 on $\Omega_{36}$ and 0 on $\Omega_{37}$. The change of PWM gradual values $Pr_{-GR}$ shown in the lowest section of FIGS. 46, 47 and 48 are drawn at the parts of Zb, Zc and Zd in FIG. 11 being regarded as PWM commanding value $Pr_{-SM}$. Another example of equations for calculating gradual values is shown in FIG. 44(b). The number of stage for gradualness is three. First, PWM selection value $Pr_{-SL}$ is divided by 4 which is made of 1 added to the number of stage. The quotient is distributed to the equation of each stage with a different weight.

Figure 49:
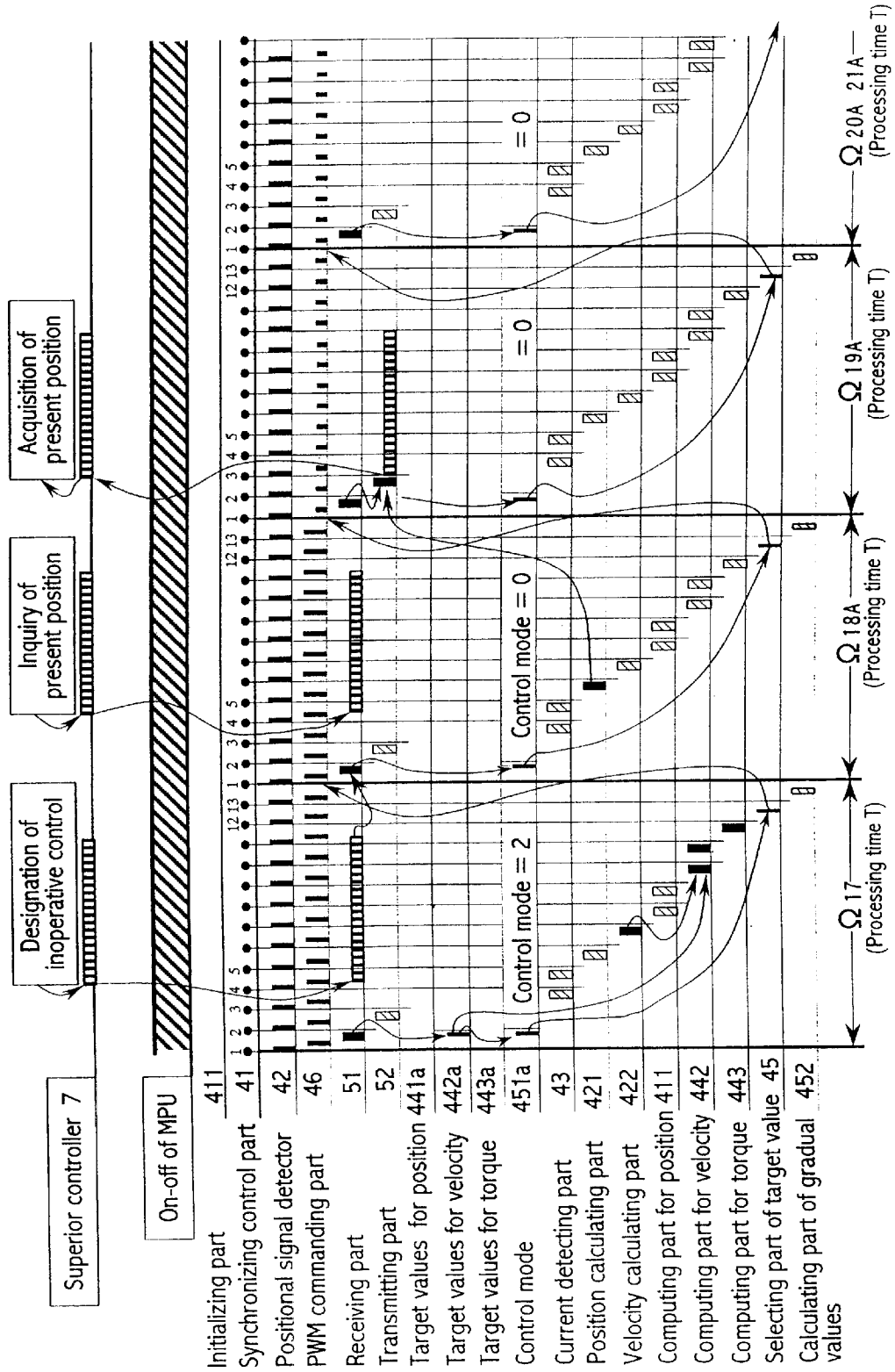
FIG. 49 is a timing chart showing the travel due to inertia after velocity control.
Figure 50:
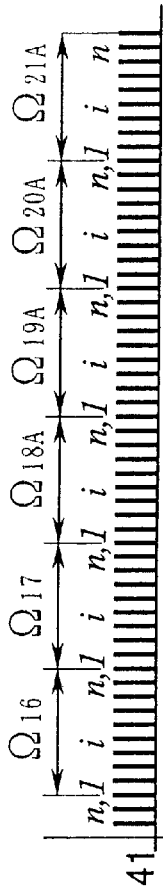
FIG. 50 is a list showing the selection values on each processing term during the travel due to inertia after velocity control.

FIGS. 49 and 50 show an example that control mode $F_{-N}=0$ is supplied by superior controller 7 during velocity control. The PWM selection value $Pr_{-SL}$ being, e.g., 18 on processing term $\Omega_{17}$ is changed into nothing on processing term $\Omega_{18A}$. In the case that $Pr_{-SL}$ has nothing none of control for position, velocity and torque is performed. Though the motor is driven based on velocity control till the processing term $\Omega_{18A}$ when the PWM signals Ma and Mb corresponding to PWM selection value $Pr_{-SL}=18$ are output, all of transistors Tr shown in FIG. 6 become off on and after processing term $\Omega_{19A}$, resulting in the revolution due to inertia only of motor output shaft. In spite that control mode $F_{-N}$ is 0 the computation according to PWM computing part 50 is also maintained on and after processing term $\Omega_{18A}$ except the case of FIG. 33. If receiving $F_{-N}=2$ or receiving $F_{-N}=2$ and $DV_0$ of target value for controlling velocity, the velocity control is commenced again on the basis of the speed computed in consideration of the present velocity during its travel by inertia. If equipping calculating part of PWM gradual values 452, step 7000 is provided before step 7001 in FIG. 44(a) so as not to process $Pr_{-SL}$ having nothing. An example that superior controller 7 supplies 0 of control mode $F_{-N}$ during such a velocity control is applied to the case that the motor is kept free to brake a truck during its travel. Of course if superior controller 7 inquires position or velocity even in $F_{-N}=0$, they are sent forth to superior controller 7 from receiving part 51 on and after the succeeding processing term, similarly to the example described above. Such a calculating part of PWM gradual values 452 is also applicable to the servo-control in FIGS. 33 and 36.

FIG. 51 is a block diagram of motor-driving device 89 for controlling plural DC motors in association with one superior controller 7 according to the present invention. Plural information input/output parts 5 having own proper number, individually, are connected by a serial communication line 61 with each other. Any of position, velocity or torque control for DC motor 2 equipped corresponding to individual information input/output part 5 may be instructed or changed through serial communication line 61. Such a device is applied to the robotic arm 75a as shown in FIG., e.g., 52. The robotic arm drawn in the figure shows a human arm with 5 joints which are provided with five DC motors 2 for moving itself, individually. Each motor equips with servo-controlling device 85 comprising encoder 1, electric power supplier 3, PWM control means 4 and information input/output part 5, and can operates in response to the command of superior controller 7 through serial communication line 61, similarly to FIG. 11.

The transmission of information between superior controller 7 and each DC motor 2 is operable by giving ID number each information input/output part 5. In spite of plural motors not only the command against all motors can be realized through one line only in turn but the present information of position, velocity or toque can be sent forth to superior controller 7 therethrough. Needless to say, the motor with ID number $53_1$ assigned to numeral '1' obeys 'Motion-1' of the first joint. The behavior is explained as follows; Each PWM control means 4 is assigned to ID number for itself and information input/output part 5 thereof holds the ID number 53. The superior controller 7 performs the predetermined communication after PWM control means 4 finished the initialization commenced in response to making DC power source 63. Referring to FIGS. 51 and 52, the command with ID=1 for controlling position is supplied to every information input/output part 5 through transmitting part 72 in the case that e.g., the position control is required for the motor $1_1$ with ID number $53_1$ of '1'. Though the information input/output parts 5 corresponding to every motor catch the command at the same time, an only information input/output part $5_1$ with the same ID number as the command holds prepares the computation for position control at FWM control means 41 in response to the command. The information input/output parts of other motors not holding the same ID number neglect the command. The command with ID=2 for controlling velocity is supplied to every information input/output part 5. An only information input/output part $5_2$ with the same ID number as the command holds prepares the computation for velocity control at PWM control means $4_2$ in response to the command. Similarly, when the command with ID=k for controlling velocity is supplied to the information input/output parts 5 corresponding to every motor, an only information input/output part $5_k$ with the same ID number as the command holds prepares the computation for velocity control at PWM control means $4_k$ in response to the command. The control input information stored in the buffer inside receiving part 51 of each information input/output part 5 is read out in the infinitesimal interval $\Phi_1$ of each processing term $\Omega_j$ of PWM computing part 50 and is utilized for the control on and after infinitesimal interval $\Phi_2$.

Figure 54:
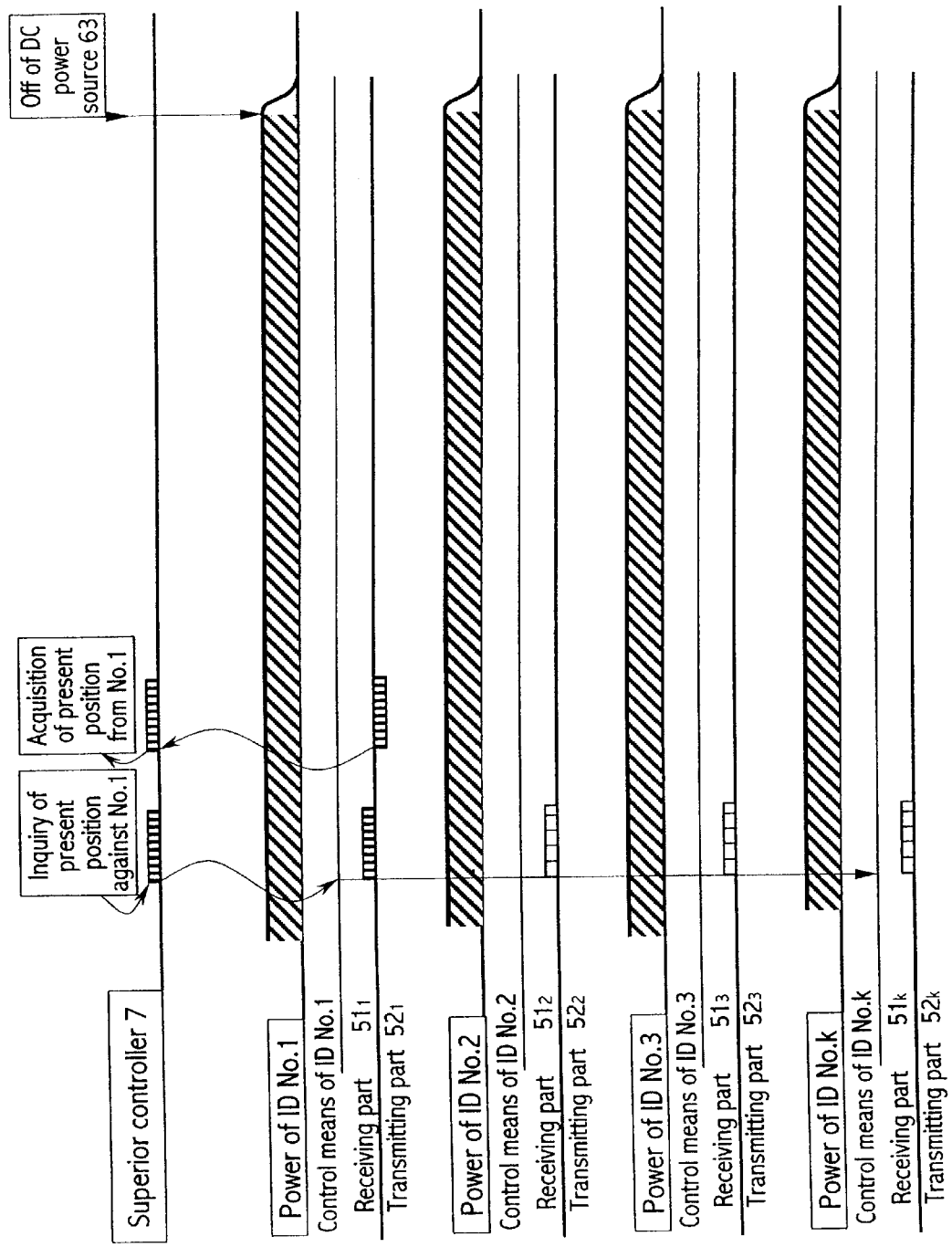
FIG. 54 is a timing chart showing the transmission of present information with ID number from information input/output part belong to each motor to superior controller.

In the synchronization among k motors, strictly speaking, the occurrence of deviation of time T×k is unavoidable. However, equipping the calculating part of PWM gradual values 452 (see the flow chart in FIG. 44) allows a time lag based on such deviation if T×k is shorter than the time enough for getting the desired transient characteristic. FIG. 54 shows an example of the inquiry of information against the PWM control means 4 of each motor. In the case of the inquiry of present position of motor $2_1$ with ID number $53_1$ of '1' the command with ID=1 for inquiring position is supplied to every information input/output part 5 of all motors. Though the information input/output parts 5 of all motors catch the command at the same time, an only information input/output part $5_1$ with the same ID number as the command holds prepares the reply from PWM control means $4_1$ in response to the command. The information input/output parts of other motors not holding the same ID number neglect the command. In the PWM control means $4_1$ the reply of position calculated in the infinitesimal interval $\Phi_5$ of a previous processing term $\Omega_{j-1}$ is sent forth to the receiving part 71 of superior controller 7 with ID number 73 assigned to numeral '0' (see FIG. 51) from transmitting part 52 on the infinitesimal interval $\Phi_2$ of present processing term $\Omega_j$ after charging with ID=0.

As mentioned above, DC motor 2, together with information input/output part 5, PWM control means 4 and electric power supplier 3, is installed in the mobile 75, and the mobile 75 equipped with plural motors 2 is connected to the main controller 76 provided with superior controller 7 through serial communication line 61 and power line for servo motor 62. In this manner, fixing electric power supplier 3 to the mobile 75a (see FIG. 52) promotes to air-cool the transistors by the movement of the movable member as described before, resulting in stabilizing the operation of electric power supplier 3. Since both PWM control means 4 and information input/output part 5 are assembled in one MFU, positional signals Ea and Eb output from encoder 1 and current signal Cm output from ammeter 31 can be directly input to MPU, moreover, PWM signals Ma and Mb can be directly output to electric power supplier 3. Further, MPU and superior controller 7 can be directly communicate each other. Accordingly, wireless devices are unnecessary for communicating, and directly transmitting and receiving through serial communication line 61 gives the control system with high reliability in low price. The serial communication decreases the number of wires and makes the rig of mobile with thin harness easy, similarly to power line for servo motor 62.

Figure 55:
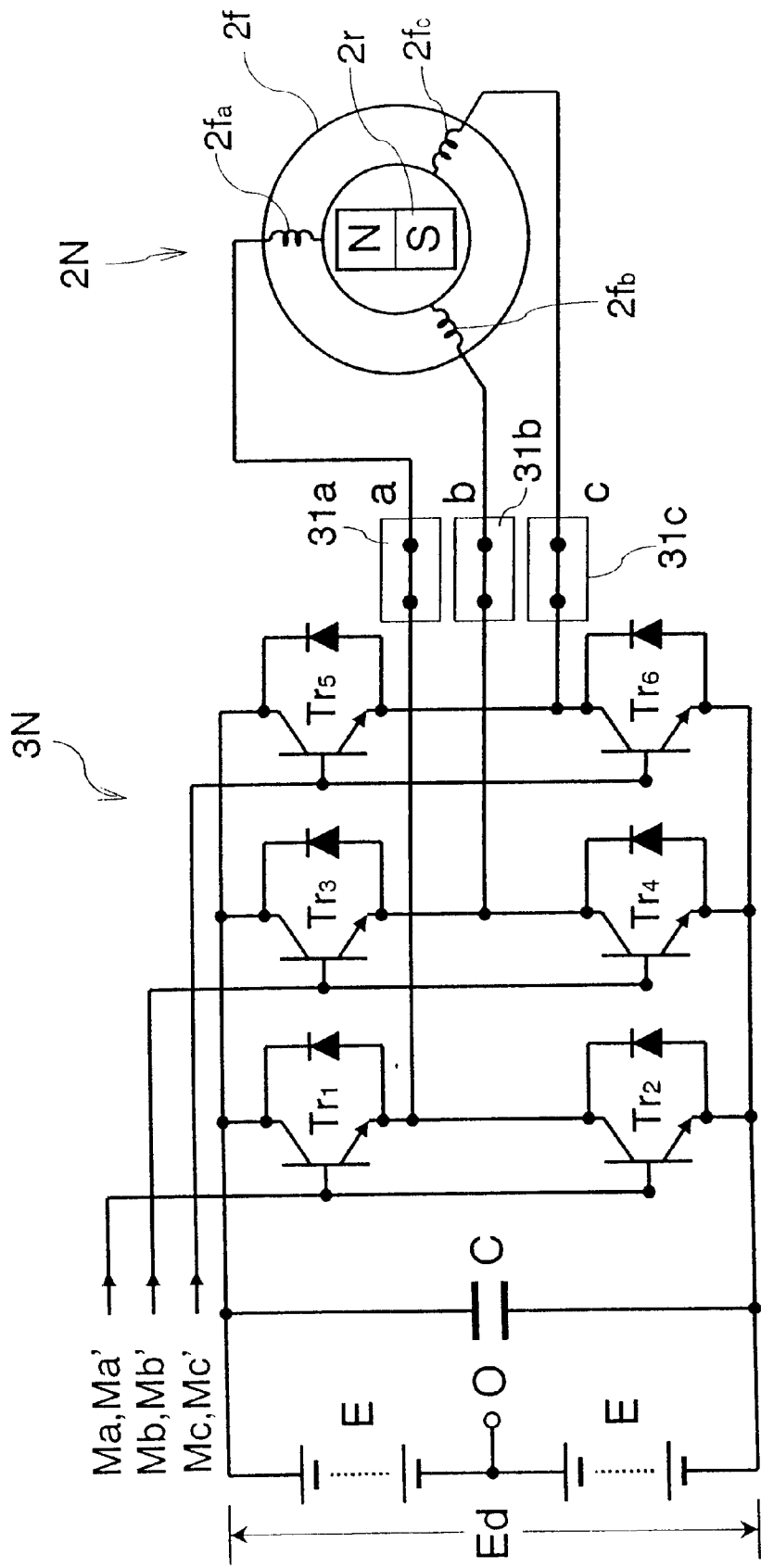
FIG. 55 shows a main circuit diagram of voltage-type inverter for brushless-type DC motor.

FIG. 55 shows a brushless-type DC motor 2N according to the present invention and electric power supplier 3N supplying electric power thereto. A brushless-type DC motor 2N used for servo-control mainly comprises three-phase winding $2f$ generating rotating magnetic field around the motor shaft by charge of three-phase alternating current and rotor $2r$ consisting of permanent magnet. The rotor $2r$ rotates synchronizing with the rotation of rotating magnetic field by the power based on magnetic attraction force according to the interaction of the magnetic field generated by permanent magnet and rotating magnetic field.

Figure 56:
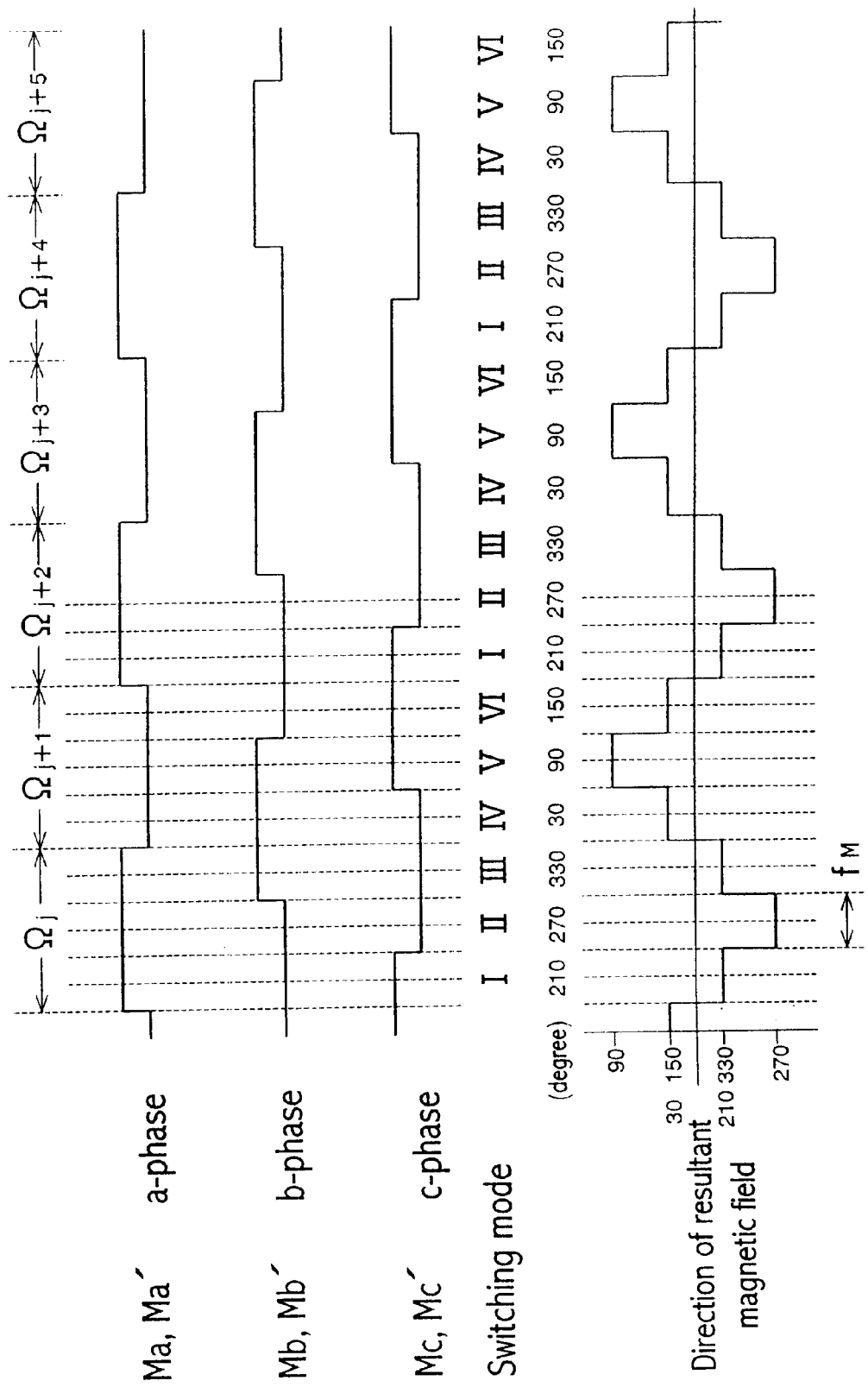
FIG. 56 shows the switching patterns for inverter control and a timing chart teaching the change of the direction of resultant magnetic field generated thereby.

The basic principle for driving a brushless-type DC motor 2N by using the inverter for transforming direct current to alternating current is described below; FIG. 55 shows one of the example of a main circuit of voltage-type inverter and FIG. 56 teaches both the switching patters for inverter-control and the change of the directions of resultant magnetic field generated thereby. Ma is a switch commanding signal against switching element $Tr_1$ and Ma' a commanding signal against element $Tr_2$. In order to simplify the explanation we assume that Ma' is off while Ma is on and Ma' is on while Ma is off. The relation between Mb and Mb' and that between Mc and Mc' are also the same. As shown in FIG. 56 the each switch repeats on and off every 180 degrees, and phases a, b and c operate switching every 120 degrees each other, thereby, the number of switching modes of phase a is six of I to VI as well as phases b and c.

FIG. 57(a) shows the operation of switching element in the case of switching mode of I. The switching elements $Tr_1$, $Tr_4$ and $Tr_5$ of on makes the current of phases a and c flow into winding $2f_a$ and $2f_c$ and makes the current of phase b flow out of winding $2f_b$. In this case the direction of resultant magnetic field made of phase currents coincides with that of phase b (210 degrees). FIG. 57(b) shows that the switching element $Tr_5$ is off and $Tr_6$ is on in the case of switching mode of II. Since the current of phase c also flows out of the winding, the direction of resultant magnetic field results in being diametrically opposite against phase a (270 degrees), which advances 60 degrees more than that in the case of switching mode of I. Similarly, the change of switching mode in turn makes the vector of resultant magnetic field advance by 60 degrees as shown in the lower section of FIG. 56. The magnetic field is induced so as to rotate itself by the repetition of such switching modes, and its wave form of phase voltage results in being similar to a diagram of the direction of resultant magnetic field. The torque generated by brushless-type DC motor is determined on the basis of the interaction between the magnetic field due to rotating magnetic field and magnetic field of rotor consists of permanent magnet.

The wave form of phase voltage given to motor changes step-formedly due to such switching patterns as well as the current. The switch commanding signals Ma, Ma', etc., shown in FIG. 56 correspond to the PWM signals of which the duty ratio is 1. The width of signal M a drawn in the Figure corresponds to one processing term Q j and that of Ma' to the succeeding term $\Omega_{j+1}$. Accordingly, in spite that the PWM commanding value $Pr_{-SM}$ generating switch commanding signal Ma is computed on the present processing term Q it is output by PWM commanding part 46 as PWM signal Ma on the processing term $\Omega_{j+2}$ after the succeeding term as well as other switch commanding signals M a', Mb, Mb', Mc and Mc'.

Figure 58:
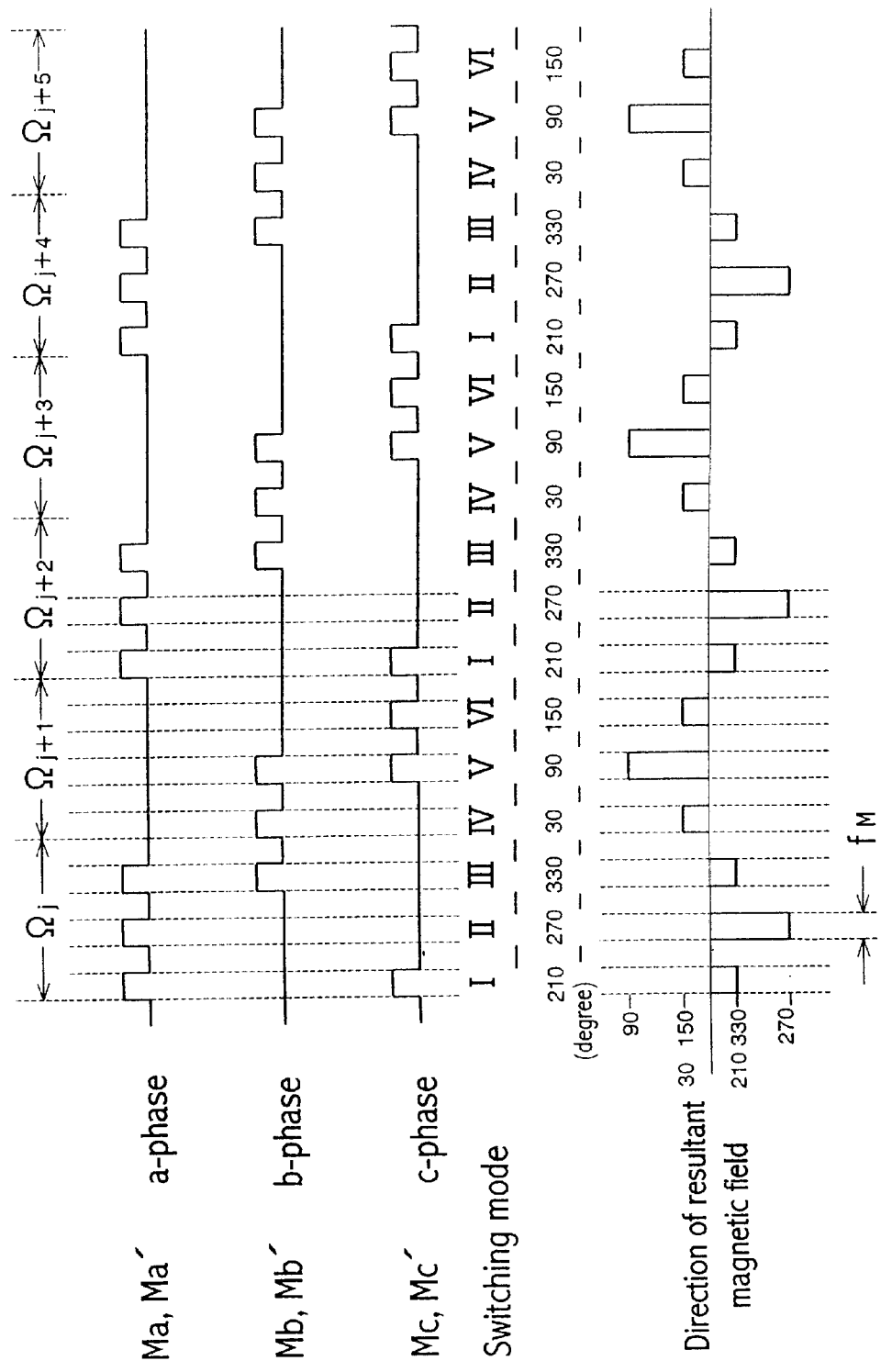
FIG. 58 shows the switching patterns for inverter control according to the present invention and a timing chart teaching the change of the direction of resultant magnetic field generated thereby.

For the sake of servo-control of brushless-type DC motor the change of the width of switch commanding signals Ma, Mb and Mc is required during one processing term $\Omega$. Making the width of signals small means to make the duty ratio small. Since the processing term $\Omega$ is divided into n infinitesimal intervals $\Phi$ in the present invention, we will have not only 16 (=32×0.50) infinitesimal intervals of on in series but several intermittent infinitesimal intervals $\Phi$ as shown in FIG. 58 in the case that the duty ratio is 50%. The width $f_M$ of the individual step-formed wave indicating the direction of resultant magnetic field teaches the strength of magnetic field. Needless to say, the strength of rotating magnetic field in FIG. 58 corresponds to a half of that in FIG. 56, being equal to the duty ratio.

The procedure for generating PWM commanding value $Pr_{-SM}$ is basically the same as that in the case of brush-type DC motor. Even if the duty ratio is changed due to the change of control target values and/or control mode, the shock due to the change of rotational velocity and/or torque can be almost suppressed under the operation of calculating part of PWM gradual values 452, similarly to the case of brush-type DC motor. The process and/or computation in association with brushless-type DC motor except those shown in FIG. 7 are allottable all or a part of infinitesimal intervals $\Phi_{14}$ to $\Phi_{32}$ of each processing term $\Omega$. Further, if a part of the process and/or computation in association with brushless-type DC motor are inserted between infinitesimal intervals, e.g., $\Phi_6$ and $\Phi_7$, those on and after the infinitesimal intervals $\Phi_8$ can be postponed within the present processing term. The process and/or computation different from the above is as follows; In the case of brush-type DC motor the process and/or computation at, e.g., i=7 is commenced after those for synchronizing control part 41, positional signal detector 42, PWM commanding part 46 (output of Ma and Mb) and velocity calculating part 422 are carried out at i=6 as shown in FIG. 22. In the case of brushless-type DC motor the process and/or computation at, e.g., i=7 is commenced after those for synchronizing control part 41, positional signal detector 42, PWM commanding part 46 (output of Ma and Ma') and velocity calculating part 422 are carried out at i=$6_1$,those for synchronizing control part 41 and PWM commanding part 46 (output of Mb and Mb') at i=$6_2$ and those for synchronizing control part 41 and PWM commanding part 46 (output of Mc and Mc') at i=$6_3$.

As mentioned above, since the torque generated is determined on the basis of the interaction between the magnetic field due to rotating magnetic field and magnetic field of rotor consists of permanent magnet, it is necessary to measure the strength of magnetic field due to the rotating magnetic field and the permanent magnet in the case of brushless-type DC motor. The strength of rotating magnetic field is indirectly detectable through the detection of current every phase by means of ammeters 31a, 31b and 31c shown in FIG. 55. The position of rotor $2r$ is also detected by encoder 1, and both the detection of present information by means of motor information detector 35 and the process and/or computation thereafter assisted by synchronizing control part 41 are also the same as those in the case of brush-type DC motor.

What is claimed is:

1. Method for servo-controlling DC motor, controlling the electric power supplied to the motor according to PWM signals corresponding to PWM target values computed on the basis of both the motor information detected at the present time and the control input information including control target values, comprising;

to compute PWM target value corresponding to the control mode designated by said control input information without lapping the computation of PWM target values corresponding to other control modes, spending one or plural infinitesimal intervals obtained by dividing a processing term of period T, when PWM signals regulating the electric power supplied to the motor are allotted, into n equal parts, to select one PWM target value according to the control mode designated by said control input information from among PWM target values computed every control mode during the present processing term, to output PWM signals corresponding to PWM selection values, which are selected at the processing term shortly previous to the present term, every infinitesimal interval of the present processing term, and to carry out the process and/or computation allotted every infinitesimal interval in the timing scheduled in one processing term and to terminate the process and/or computation within the present processing term.

2. Method for servo-controlling DC motor according to claim 1, wherein:
said PWM selection value is replaced with one of the PWM value for other control modes, which is less than PWM maximum allowable value under said other control modes, in the case that the PWM target value for the control mode designated by the control input information is more than FWM maximum allowable value corresponding to the maximum allowable current for the motor when PWM selection value is selected from among PWM target values.

3. Method for servo-controlling DC motor according to claim 1, wherein:
PWM gradual values for gradually getting close to a new PWM selection value by spending the succeeding several processing terms are computed in the case that said new PWM selection value is different from the previous PWM selection value, and PWM signals corresponding to said PWM gradual values are output so as not to shock the motor.

4. Method for servo-controlling DC motor according to claim 1, wherein:
said control target values are at least two chosen among three targets for controlling position, velocity and torque.

5. Method for servo-controlling DC motor according to claim 1, wherein:
all the control target values to be computed and a control mode to be designated are assigned to temporary values before carrying out the process and/or computation on the initial processing term of servo-control of motor, and the process and/or computation on the initial processing term are carried out after the predetermined lapse from the commencement of the servo-control.

6. Method for servo-controlling DC motor according to claim 1, wherein:
the positional information of a motor is generated by adding the increment or decrement obtained by cumulating the positional signals of motor output shaft, which are detected during n infinitesimal intervals shortly previous to the infinitesimal interval computing the present position of output shaft, to the positional information obtained in the infinitesimal interval of T in time before.

7. Method for servo-controlling DC motor according to claim 1, wherein:
the positional information of a motor is generated by adding the increment or the decrement obtained by cumulating the positional signals of motor output shaft, which are detected during all of infinitesimal intervals of the processing term shortly previous to the present term, to the positional information obtained on the processing term of 2 periods before.

8. A method for servo-controlling DC motor according to claim 6, wherein:
the velocity information of a motor is assigned to the increment or the decrement of the positional signals of motor output shaft.

9. Method for servo-controlling DC motor according to claim 1, wherein:
said every infinitesimal interval is charged with at least both detecting positional signals of motor output shaft and outputtting PWM signals.

10. Method for servo-controlling DC motor according to claim 9, wherein:
either detection of positional signals of motor output shaft or output of PWM signals is carried out at the beginning of the infinitesimal interval, and the rest is done just after the termination of the preceded.

11. Method for servo-controlling DC motor according to claim 7, wherein:
the velocity information of a motor is assigned to the increment or the decrement of the positional signals of motor output shaft.

12. Method for servo-controlling DC motor, controlling the electric power supplied to the motor according to PWM signals corresponding to PWM target values computed on the basis of both the motor information detected at the present time and the control input information including control target values, comprising;

to keep one or plural infinitesimal intervals obtained by dividing the processing term of period T, when PWM signals regulating the electric power supplied to the motor are allotted, into n equal parts in order to enable to individually compute plural PWM target values, to compute PWM target value according to the control mode only designated by said control input information for the present processing term, to output PWM signals corresponding to PWM target values, which are computed on the processing term shortly previous to the present term, every infinitesimal interval of the present processing term, and to carry out the process and/or computation allotted every infinitesimal interval in the timing scheduled in one processing term and to terminate the process and/or computation for getting PWM target values according to control mode designated within the processing term.

13. Method for servo-controlling DC motor according to claim 12, wherein:
PWM gradual values for gradually getting close to a new PWM target value by spending the succeeding several processing terms are computed in the case that said new PWM target value is different from the previous PWM target value, and PWM signals corresponding to said PWM gradual values are output so as not to shock the motor.

14. Method for servo-controlling DC motor according to claim 12, wherein:
said control target values are at least two chosen among three targets for controlling position, velocity and torque.

15. Method for servo-controlling DC motor according to claim 12, wherein:
all of control target values to be computed and a control mode to be designated are assigned to temporary values before carrying out the process and/or computation on the initial processing term of servo-control of motor, and the process and/or computation on the initial processing term are carried out after the predetermined lapse from the commencement of the servo-control.

16. Method for servo-controlling DC motor according to claim 12, wherein:
the positional information of a motor is generated by adding the increment or decrement obtained by cumulating the positional signals of motor output shaft, which are detected during n infinitesimal intervals shortly previous to the infinitesimal interval computing the present position of output shaft, to the positional information obtained in the infinitesimal interval of T in time before.

17. Method for servo-controlling DC motor according to claim 12, wherein:
the positional information of a motor is generated by adding the increment or the decrement obtained by cumulating the positional signals of motor output shaft, which are detected during all of infinitesimal intervals of the processing term shortly previous to the present term, to the positional information obtained on the processing term of 2 periods before.

18. Method for servo-controlling DC motor according to claim 12, wherein:
said every infinitesimal interval is charged with at least both detecting positional signals of motor output shaft and outputtting PWM signals.

19. Device for servo-controlling DC motor, equipping PWM controlling means 4 which computes PWM target values on the basis of both the present information detected by a motor information detector and the control input information, including control target values, commanded by a superior controller 7, and outputs PWM signals corresponding to said PWM target values to electric power supplier 3, said PWM control means 4, comprising;
synchronizing control part 41 for instructing the commencement of the process and/or computation allotted to some of the infinitesimal intervals obtained by dividing processing term of period T, when FWM signals regulating the electric power supplied to the motor are allotted, into n equal parts, and for terminating one cycle for a series of the process and/or computation predetermined within said one processing term,
selecting part of PWM target value 45 for selecting one PWM target value among the PWM target values computed every control mode within the present processing term, and
PWM commanding part 46 for receiving PWM selection value selected on the processing term shortly previous to the present term as a PWM commanding value, and for outputting the PWM signals corresponding to said PWM commanding value every infinitesimal interval of present processing term.

20. Device for servo-controlling DC motor according to claim 19, wherein:
said selecting part of PWM target value 45 is a selecting part of target value for designated mode 451 for selecting PWM target value corresponding to the control mode designated in the control input information as a PWM selection value from among PWM target values individually computed based on each of control target values.

21. Device for servo-controlling DC motor according to claim 20, wherein:
all of the PWM target values input to selecting part of target value for designated mode 451 are limited to PWM maximum allowable value corresponding to the maximum allowable current of the motor or less.

22. Device for servo-controlling DC motor according to claim 19, wherein:
said selecting part of PWM target value 45 is a selecting part of target value for automatically changing control mode 451b for replacing the target value selected from among PWM target values computed based on each of control target values as a PWM target value for the control mode designated by the control input information with one of the PWM target values for other control modes, which is less than PWM maximum allowable value under said other control modes, in the case that said target value selected from among PWM target values is more than PWM maximum allowable value corresponding to the maximum allowable current for the motor for getting PWM selection value.

23. Device for servo-controlling DC motor according to claim 22, wherein:
PWM target value computed in association with at least torque out of PWM target values input to selecting part of target value for automatically changing control mode 451b is limited to PWM maximum allowable value corresponding to the maximum allowable current of the motor under the torque control or less.

24. Device for servo-controlling DC motor according to claim 19, wherein:
calculating part of PWM gradual values 452 for computing PWM gradual values for gradually getting close to a new PWM selection value by spending the succeeding several processing terms in the case that said new PWM selection value is different from the previous PWM selection value, and for outputting said PWM gradual values to PWM commanding part 46 as a PWM commanding value $Pr_{-Sm}$ is provided between said selecting part of PWM target value 45 and PWM commanding part 46 so as to output PWM signals which does not shock the motor.

25. Device for servo-controlling DC motor according to claim 19, wherein:
said PWM computing part 50 is provided with at least two computing parts out of computing part of PWM target value for position 441P, computing part of PWM target value for velocity 442V and computing part of PWM target for torque 443T.

26. Device for servo-controlling DC motor according to claim 25, wherein:
said computing part of PWM target value for position 441P comprises position calculating part 421, which calculates the present position of motor output shaft based on the information measured by positional signal detector 42, and computing part for controlling position 441, which computes the position to be achieved based on both information obtained by said position calculating part 421 and target value for controlling position $DP_0$ and computes PWM target value corresponding to said position to be achieved.

27. Device for servo-controlling DC motor according to claim 25, wherein:

said computing part of PWM target value for velocity 442V comprises velocity calculating part 422, which calculates the present velocity of motor based on the information measured by positional signal detector 42, and computing part for controlling velocity 442, which computes the velocity to be achieved based on both information obtained by said velocity calculating part 422 and target value for controlling velocity $DV_0$ and computes PWM target value corresponding to said velocity to be achieved.

28. Device for servo-controlling DC motor according to claim 25, wherein:

said computing part of PWM target value for torque 443T comprises computing part for controlling torque 443, which computes the target to be achieved based on both information obtained by current detecting part 43 and target value for controlling torque $DT_0$ and computes PWM target value corresponding to said torque to be achieved.

29. Device for servo-controlling DC motor according to claim 19, wherein:

information input/output part 5 is provided for transmitting information between the PWM controlling means 4 and the superior controller 7, which has the receiving part 51 for receiving control input information including control target values and control modes from superior controller 7 in response to the instructions of said synchronizing control part 41 and for transferring said control input information to the proper storing part belong to said PWM computing Dart 50, individually.

30. Device for servo-controlling DC motor according to claim 19, wherein:

every information input/output part 5 having its own proper (ID) number 53 are connected by a serial communication line 61 with each other so that any of position, velocity or torque control for DC motor 2 equipped corresponding to individual information input/output part 5 may be instructed or charged (by said superior controller 7) through said serial communication line 61.

31. Device for servo-controlling DC motor according to claim 30, wherein:

said superior controller 7, PWM controlling means 4 and electric power supplier 3 are arranged near said DC motor 2, the mobile 75 providing with plural DC motors 2 and main controller 76 comprising said superior controller 7 are connected by a serial communication line 61 and power lines for servo motors 62.

32. Device for servo-controlling DC motor according to claim 19, wherein:

said PWM controlling means 4 and information input/output part 5 are assembled into one chip of MPU, to which both positional signal Ea, Eb output from an encoder 1 and current signals output from an ammeter 31 are directly input and from which PWM signals are directly output to electric power supplier 3, so that the chip can directly communicate with said superior controller 7.

33. Device for servo-controlling DC motor to claim 19, wherein:

said motor is a brushless-type DC motor 2N.

34. Device for servo-controlling DC motor, equipping PWM controlling means 4 which computes PWM target values on the basis of both the present information detected by a motor information detector and the control input information, including control target values, commanded by a superior controller 7, and outputs PWM signals corresponding to said PWM target values to electric power supplier 3, said PWM control means 4, comprising;

synchronizing control part 41 for instructing the commencement of the process and/or computation allotted to some of the infinitesimal intervals obtained by dividing processing term of period T, when PWM signals regulating the electric power supplied to the motor are allotted, into n equal parts, and for terminating one cycle for a series of the process and/or computation predetermined within said one processing term, PWM computing part 50 for computing each of PWM target values independently spending one or plural infinitesimal intervals and for computing PWM target value only according to control mode designated by said control input information during the present processing term, and PWM commanding part 46 for receiving PWM target value computed on the processing term shortly previous to the present term as a PWM commanding value, and for outputting the PWM signals corresponding to said PWM commanding value every infinitesimal interval of present processing term.

35. Device for servo-controlling DC motor according to claim 34, wherein:

PWM target values output from PWM computing part 50 are limited to PWM maximum allowable value corresponding to the maximum allowable current of the motor or less.

36. Device for servo-controlling DC motor according to claim 34, wherein:

calculating part of PWM gradual values 452 for computing PWM gradual values for gradually getting close to a new PWM selection value by spending the succeeding several processing terms in the case that said new PWM selection value is different from the previous PWM selection value, and for outputting said PWM gradual values to PWM commanding part 46 as a PWM commanding value $Pr_{-SM}$ is provided between said PWM computing part 50 and PWM commanding part 46 so as to output PWM signals which does not shock the motor.

37. Device for servo-controlling DC motor according to claim 34, wherein:

said PWM computing part 50 is provided with at least two computing parts out of computing part of PWM target value for position 441P, computing part of PWIVI target value for velocity 442V and computing part of PWM target for torque 443T.

38. Device for servo-controlling DC motor according to claim 34, wherein:

information input/output part 5 is provided for transmitting information between the PWM controlling means 4 and the superior controller 7, which has the receiving part 51 for receiving control input information including control target values and control modes from superior controller 7 in response to the instructions of said synchronizing control part 41 and for transferring said control input information to the proper storing part belong to said PWM computing part 50, individually.

39. Device for servo-controlling DC motor according to claim 34, wherein:

every information input/output part 5 having its own proper (ID) number 53 are connected by a serial communication line 61 with each other so that any of position, velocity or torque control for DC motor 2 equipped corresponding to individual information input/output part 5 may be instructed or charged (by said superior controller 7) through said serial communication line 61.

40. Device for servo-controlling DC motor according to claim 34, wherein:

said PWM controlling means 4 and information input/output part 5 are assembled into one chip of MPU, to which both positional signal Ea, Eb output from an encoder 1 and current signals output from an ammeter 31 are directly input and from which PWM signals are directly output to electric power supplier 3, 50 that the chip can directly communicate with said superior controller 7.

41. Device for servo-controlling DC, motor to claim 34, wherein:

said motor is a brushless-type DC motor 2N.

42. Device for servo-controlling DC motor according to claim 29, wherein:

said information input/output part 5 has the transmitting part 52 for replying the present data of position, velocity or torque inquired through said receiving part 51 to said superior controller 7 in response to the instructions of said synchronizing control part 41.

43. Device for servo-controlling DC motor according to claim 42, wherein:

transistors used in said electric power supplier 3 are fixed to the movable member of mobile 75 equipping with DC motor 2, being air-cooled due to the behavior of said movable member, thereby, promoting the heat-radiation of the transistors.

* * * * *